US010975319B2

(12) United States Patent
 Price et al.

(10) Patent No.: US 10,975,319 B2
(45) Date of Patent: Apr. 13, 2021

(54) FUEL FORMULATION

(71) Applicant: SHELL OIL COMPANY, Houston, TX (US)

(72) Inventors: Richard John Price, Manchester (GB); Paul George Blommel, Madison, WI (US)

(73) Assignee: Shell Oil Company, Houston, TX (US)

( * ) Notice: Subject to any disclaimer, the term of this patent is extended or adjusted under 35 U.S.C. 154(b) by 81 days.

(21) Appl. No.: 15/751,556

(22) PCT Filed: Aug. 11, 2016

(86) PCT No.: PCT/EP2016/069178
§ 371 (c)(1),
(2) Date: Feb. 9, 2018

(87) PCT Pub. No.: WO2017/025612
PCT Pub. Date: Feb. 16, 2017

(65) Prior Publication Data
US 2018/0230391 A1    Aug. 16, 2018

Related U.S. Application Data

(60) Provisional application No. 62/204,531, filed on Aug. 13, 2015.

(51) Int. Cl.
*C10L 1/02*    (2006.01)
*C10L 1/06*    (2006.01)
(Continued)

(52) U.S. Cl.
CPC ............... *C10L 1/023* (2013.01); *C10G 3/42* (2013.01); *C10L 1/06* (2013.01); *C10G 35/04* (2013.01);
(Continued)

(58) Field of Classification Search
CPC combination set(s) only.
See application file for complete search history.

(56) References Cited

U.S. PATENT DOCUMENTS 5,015,356 A    5/1991    Talbert
5,855,629 A    1/1999    Grundy et al.
(Continued)

FOREIGN PATENT DOCUMENTS

CN    102112589 A    6/2011
EP    1287095 A2    3/2003

OTHER PUBLICATIONS

Pikunas et al., "Influence of Composition of Gasoline—Ethanol Blends on Parameters of Internal Combustion Engines", Journal of KONES Internal Combustion Engines, vol. 10, Jan. 1, 2003, 7 pages, XP055317033.
(Continued)

*Primary Examiner* — Ellen M McAvoy
*Assistant Examiner* — Chantel L Graham

(57) ABSTRACT

A gasoline fuel formulation which contains 60% v/v or more of a combination of (a) a biologically-derived alcohol and (b) a mixture of $C_4$ to $C_{12}$ hydrocarbon fuel components, all of which hydrocarbon fuel components have been derived, whether directly or indirectly, from catalytic conversion of a biologically-derived oxygenate component, wherein the concentration of the alcohol (a) in the formulation is from 0.1 to 30% v/v.

13 Claims, 2 Drawing Sheets

(51) Int. Cl.
*C10G 3/00* (2006.01)
*C10G 35/04* (2006.01)

(52) U.S. Cl.
CPC .............................. *C10G 2300/305* (2013.01); *C10L 2200/0423* (2013.01); *C10L 2200/0469* (2013.01); *C10L 2270/023* (2013.01); *C10L 2290/24* (2013.01); *Y02P 30/20* (2015.11)

(56) References Cited

U.S. PATENT DOCUMENTS

| | | |
|---|---|---|
| 2007/0002010 A1 | 1/2007 | De Samber et al. |
| 2008/0216391 A1 | 9/2008 | Cortright et al. |
| 2008/0300434 A1 | 12/2008 | Cortright et al. |
| 2008/0300435 A1 | 12/2008 | Cortright et al. |
| 2010/0076233 A1 | 3/2010 | Cortright et al. |
| 2010/0077655 A1 | 4/2010 | Bauldreay et al. |
| 2010/0218417 A1 | 9/2010 | Bauldreay et al. |
| 2011/0245542 A1 | 10/2011 | Cortright et al. |
| 2011/0245543 A1 | 10/2011 | Cortright et al. |
| 2011/0257416 A1 | 10/2011 | Cortright et al. |
| 2011/0257448 A1 | 10/2011 | Cortright et al. |
| 2011/0319683 A1 | 12/2011 | Abhari et al. |
| 2012/0198760 A1 | 8/2012 | Blommel et al. |
| 2013/0036660 A1 | 2/2013 | Woods et al. |
| 2013/0055626 A1 | 3/2013 | Bauldreay et al. |
| 2013/0185992 A1 | 7/2013 | Cortright et al. |
| 2013/0263498 A1 | 10/2013 | Kania et al. |
| 2014/0046103 A1* | 2/2014 | Abhari ..................... C10G 3/50 585/25 |
| 2015/0315475 A1* | 11/2015 | Rogers ..................... C05F 3/02 585/16 |

OTHER PUBLICATIONS

Morley, "A Fundamentally Based Correlation Between Alkane Structure and Octane Number", Combustion Science and Technology, vol. 55, Issue No. 4-6, 1987, pp. 115-123.

Kirsch et al., "A Fundamentally Based Model of Knock in the Gasoline Engine", Symposium (International) on Combustion, vol. 16, Issue No. 1, 1976, pp. 233-244.

International Search Report and Written Opinion received for PCT Patent Application No. PCT/EP2016/069178, dated Dec. 21, 2016, 10 pages.

* cited by examiner

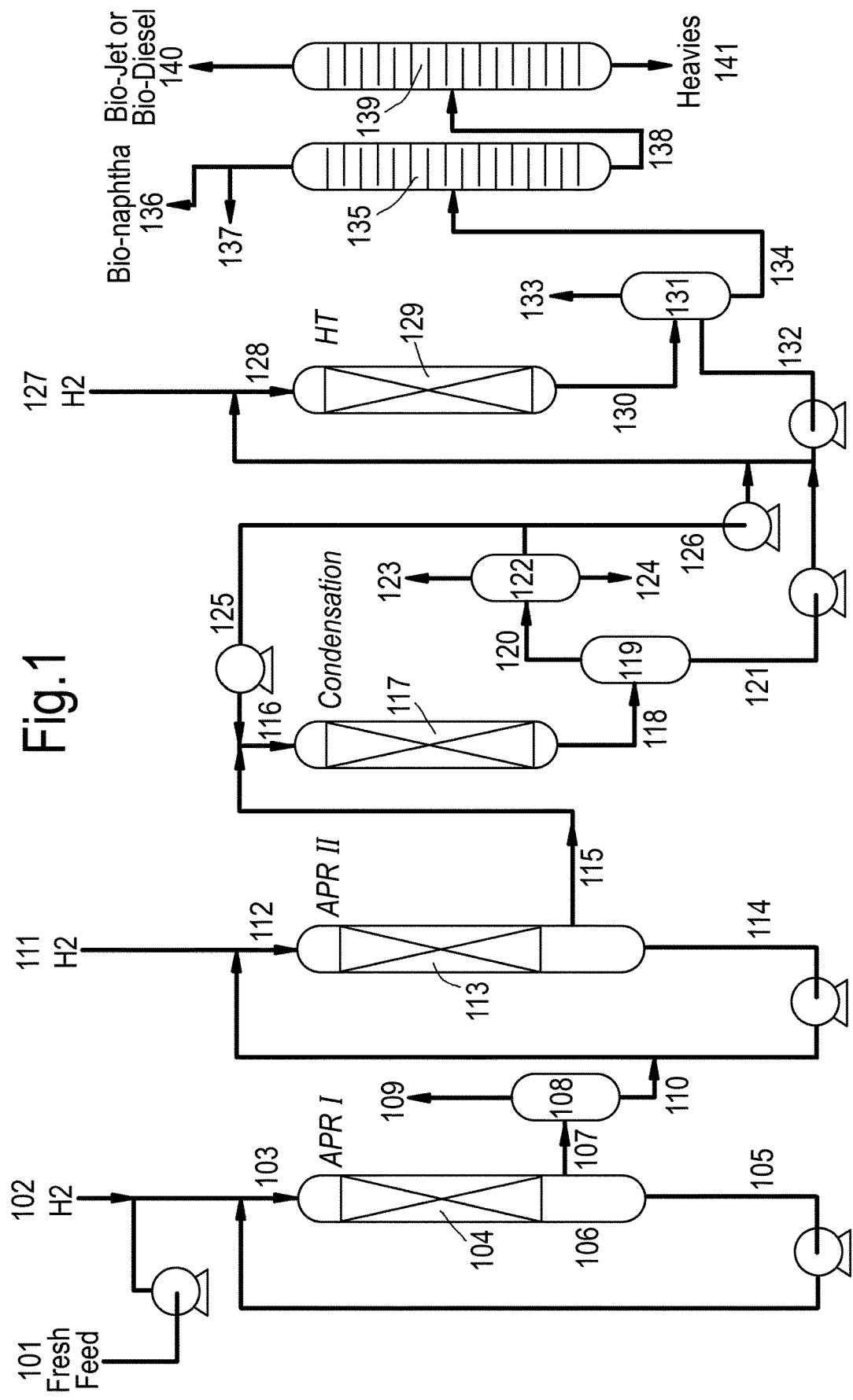

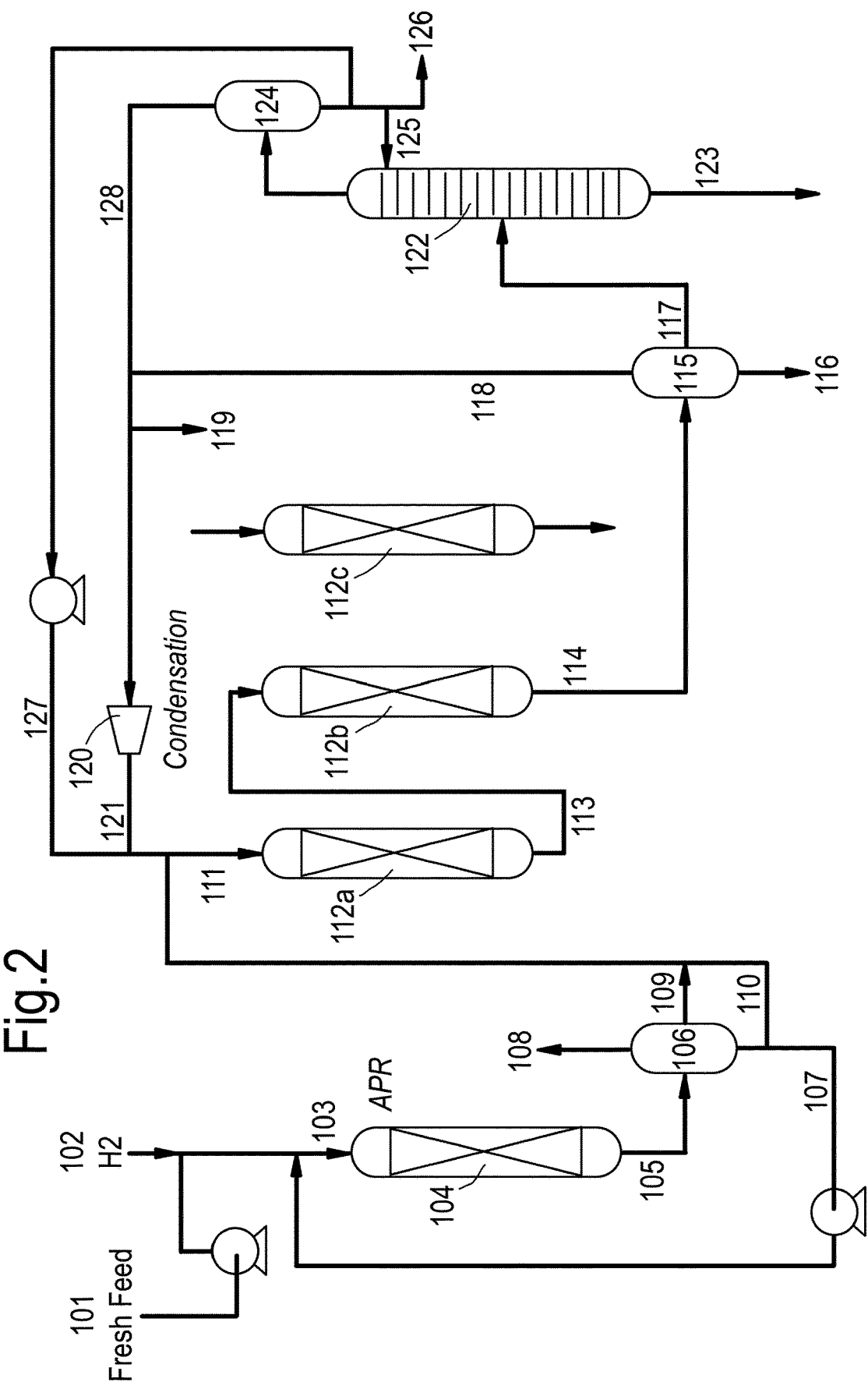

FUEL FORMULATION

PRIORITY CLAIM

The present application is the National Stage (§ 371) of International Application No. PCT/EP2016/069178, filed Aug. 11, 2016, which claims priority from US Provisional Application No. 62/204,531, filed Aug. 13, 2015 incorporated herein by reference.

FIELD OF THE INVENTION

This invention relates to a gasoline fuel formulation, its production and its use, and to a basestock fuel component mixture for use in a gasoline fuel formulation.

BACKGROUND TO THE INVENTION

In the interests of the environment, and to comply with increasingly stringent regulatory demands, it is desirable to increase the amount of biofuels used in automotive fuel formulations.

Biofuels are combustible fuels derived from biological sources, which result in a reduction in "well-to-wheels" (i.e. from source to combustion) greenhouse gas emissions. In gasoline fuels for use in spark ignition (petrol) engines, the most common biofuels are biologically-derived alcohols, in particular ethanol.

As a result of recent legislation, European and North American gasoline transportation fuels contain 10% v/v of ethanol (i.e. so-called "E10" fuels). The Renewable Fuel Standard (RFS) in the US requires 10% v/v biofuel in all gasoline grades, increasing to 20% v/v in 2022. Further, the European Union's Renewable Energy Directive (RED) will require 10% of all energy used in transportation to be renewable by 2020.

E10 fuels are currently available in a number of markets: they are compatible with existing fuel specifications, vehicle technology and distribution systems. The future availability of cellulosic ethanol may drive a transition to higher concentration ethanol blends in the future. However, E10 gasoline alone will not be sufficient to meet the requirements of the RED and RFS.

Whilst it would be desirable to be able to increase yet further the proportions of fuels from renewable sources, this is likely to be less than straightforward to achieve. It is in theory possible to run existing vehicle engines on E15 fuels (fuels containing 15% v/v ethanol), but a waiver of existing legislation would be necessary in order to do so. Meanwhile the use of fuels with higher ethanol contents would require specially adapted engines, which would increase supply chain complexity and also lower fuel economy. Although there is recognition from engine manufacturers that E20 fuels may be required in the future, the relevant regulations provide no incentive for mutually compatible vehicles and fuels.

Other so-called alternative fuels, for example biogas, can be derived completely from biological sources, but again can only be used in modified engines and are not well suited to existing fuel distribution systems.

It is known to produce liquid hydrocarbon fuel components from biomass, for instance using an aqueous phase reforming (APR) process such as is described in US20110257416. However, such components still need to be blended with conventional, petroleum-derived gasoline fuel components in order to achieve an overall fuel formulation which complies with regulatory standards (for example, EN 228 for European automotive gasoline fuels) and is therefore suitable for use in unmodified vehicle engines.

Consequently, there remains a need for high biofuel content fuels that comply with the existing specifications for unleaded gasoline. It is an aim of the present invention to provide alternative gasoline fuel formulations that contain higher proportions of biofuel components than are presently feasible and yet are still able to meet current fuel specifications and engine requirements.

STATEMENTS OF THE INVENTION

According to a first aspect of the present invention there is provided a gasoline fuel formulation which contains 60% v/v or more of a combination of (a) a biologically-derived alcohol and (b) a mixture of $C_4$ to $C_{12}$ hydrocarbon fuel components, all of which hydrocarbon fuel components have been derived, whether directly or indirectly, from catalytic conversion of a biologically-derived oxygenate component, wherein the concentration of the alcohol (a) in the formulation is from 0.1 to 30% v/v.

It has surprisingly been found that by combining specific types of hydrocarbon fuel components, derived from the catalytic processing of biologically-derived oxygenates, with a biologically-derived alcohol, it is possible to formulate a gasoline fuel that is not only almost entirely biologically derived, but also compliant with current industry specifications (and therefore suitable for use in existing engines). It is not necessary to blend such a formulation with other, non-biologically-derived, fuel components. Nor is it necessary to use unduly high levels of the alcohol in order to meet current octane specifications.

Suitably, as described in more detail below, the fuel formulation can be prepared by blending together two or more different hydrocarbon components that, as a result of the processes to which they have been subjected, contain different types of hydrocarbons and thus have different physical properties. This allows the formulation to be tailored to have for example an octane number, vapour pressure and/or aromatics content within a desired range, and/or distillation properties of a desired nature. In an embodiment, these hydrocarbon components can all be obtained, indirectly, from the same biologically-derived starting material.

In an embodiment, the fuel formulation contains 70% v/v or more of the combination of the alcohol (a) and the hydrocarbon mixture (b). In an embodiment, it contains 80 or 90% v/v or more of the combination. In an embodiment, it consists essentially of the combination, by which is meant that the combination represents suitably 95% v/v or more of, in particular 98% v/v or more of, more particularly 99 or 99.5% v/v or more of, the overall fuel formulation. The formulation may additionally contain small amounts of other fuel components (which however are still suitably biologically-derived) and/or additives, as described in more detail below.

Suitably, the formulation contains less than 30% v/v of, or less than 20 or 10% v/v of, non-biologically-derived fuel components, in particular non-biologically-derived hydrocarbon fuel components. It may contain less than 5% v/v of, or less than 2.5 or 1% v/v of, such non-biologically-derived components. More suitably, it contains no non-biologically-derived fuel components, in particular no non-biologically-derived hydrocarbon fuel components.

A fuel formulation according to the invention can be prepared by blending a suitable basestock fuel component mixture with a biologically-derived alcohol. Such a basestock mixture may for instance contain 80% v/v or more of a mixture of $C_4$ to $C_{12}$ hydrocarbon fuel components, all of which hydrocarbon fuel components have been derived, whether directly or indirectly, from the catalytic conversion of a biologically-derived oxygenate component. It may contain 85% v/v or more of the mixture of $C_4$ to $C_{12}$ hydrocarbon fuel components, or 90% v/v or more. In an embodiment, it consists essentially of the hydrocarbon mixture, by which is meant that the hydrocarbon mixture represents suitably 95% v/v or more of, in particular 98% v/v or more of, more particularly 99 or 99.5% v/v or more of, the overall basestock mixture.

Suitably, such a basestock mixture contains less than 20% v/v of, or less than 15 or 10% v/v of, non-biologically-derived fuel components, in particular non-biologically-derived hydrocarbon fuel components. It may contain less than 5% v/v of, or less than 2.5 or 1% v/v of, such non-biologically-derived components. More suitably, it contains no non-biologically-derived fuel components, in particular no non-biologically-derived hydrocarbon fuel components.

In general, the properties of the basestock mixture may be tailored depending on the nature and concentration of alcohol with which it is to be blended, in order to achieve desired properties in the resultant alcohol-containing fuel formulation. This tailoring can be achieved by altering the natures and/or relative concentrations of the hydrocarbon components of the basestock mixture, for example in the ways described below.

It has been found that certain types of hydrocarbon fuel components—all derivable either directly or indirectly from the same type of biomass treatment process—can work particularly well together in a formulation according to the first aspect of the invention. The individual concentrations of these components can be varied so as to alter the properties (in particular the octane quality, volatility, distillation profile and aromatic hydrocarbon content) of the resultant formulation, according to requirements.

Thus, in an embodiment of the first aspect of the invention, the mixture of $C_4$ to $C_{12}$ hydrocarbon fuel components comprises:

1. a high octane hydrocarbon fuel component, comprising one or more hydrocarbons selected from $C_5$ to $C_{12}$ hydrocarbons and mixtures thereof, which is the product of a catalytic conversion of a biologically-derived oxygenate component, and which contains in the range of from 40 to 80% v/v or preferably in the range of from 50 to 70% v/v of aromatic hydrocarbons; and
2. one or more of:
a. a low octane hydrocarbon fuel component, comprising one or more hydrocarbons selected from $C_5$ to $C_{10}$ hydrocarbons and mixtures thereof, which is the product of a catalytic conversion of a biologically-derived oxygenate component, and which contains in the range of from 75% to 100% v/v of paraffinic hydrocarbons and in the range of from 0 vol % to 20% v/v of aromatic hydrocarbons,
b. a high octane isomerised hydrocarbon fuel component, comprising one or more biologically-derived hydrocarbons selected from $C_5$ and $C_6$ hydrocarbons and mixtures thereof, which contains 60% v/v or more of isoparaffinic hydrocarbons and saturated cyclic hydrocarbons and 5% v/v or less of aromatic hydrocarbons, and
c. a $C_4$ hydrocarbon fuel component which comprises a biologically-derived $C_4$ hydrocarbon or mixture thereof.

In an embodiment, the hydrocarbon mixture comprises the high octane component (1) and only one of the components (2a) to (2c); for example it is a mixture of components (1) and (2a), or of (1) and (2b), or of (1) and (2c), in particular of (1) and (2a). In an embodiment, the hydrocarbon mixture comprises the component (1) together with two of the components (2a) to (2c); for example it is a mixture of components (1), (2a) and (2b), or more particularly of components (1), (2a) and (2c) or of components (1), (2b) and (2c). In an embodiment, the hydrocarbon mixture comprises all four of the components (1), (2a), (2b) and (2c).

In an embodiment, the hydrocarbon mixture comprises the component (1) together with components (2a) and/or (2b), in the absence of the $C_4$ component (2c). In an embodiment, it comprises the component (1) together with components (2a) and/or (2c), in the absence of the isomerised component (2b). In an embodiment, it comprises the component (1) together with components (2b) and/or (2c), in the absence of the low octane component (2a). In a specific embodiment, it comprises the components (1) and (2c), optionally together with either or both of the components (2a) and (2b).

In this specification, in particular in the examples, the component (1) may be referred to as a "reformate", or as a "bio-reformate", because of its potential similarity to a refinery reformate stream. The component (2a) may be referred to as a "naphtha" or "bio-naphtha" component. The component (2b) may be referred to as an "isomerate" or "bio-isomerate" or as a "$C_5/C_6$ isomerate". The component (2c) may be referred to as a "bio-butane" or "bio-butane/butane" component.

In the present context, a hydrocarbon is a combustible molecule containing only carbon and hydrogen. A hydrocarbon may be an alkane (paraffin), an alkene, a cycloalkane or a cycloalkene. It may be an aromatic molecule, such as benzene or an alkyl-substituted benzene. A paraffin may in general be straight chain (an n-paraffin) or branched (an isoparaffin). The content of particular types of hydrocarbons, for example iso-paraffins or aromatic moieties, may however be constrained for individual hydrocarbon components of a fuel formulation according to the invention.

References to "$C_n$" compounds, where n is an integer, are to compounds containing n carbon atoms: thus, for example, "$C_5$ to $C_{12}$ hydrocarbons" means hydrocarbons containing from 5 to 12 carbon atoms in their molecules. For practical purposes, a mixture of $C_n$ to $C_m$ hydrocarbons, where n and m are integers, means a mixture which contains primarily (i.e. typically more than 90% v/v of, or more than 93 or 95% v/v of) those hydrocarbons, although due to the fractionation process a hydrocarbon fuel component may contain minor amounts of hydrocarbons outside its quoted carbon number range: for example a $C_5$ to $C_{10}$ hydrocarbon fuel component may contain minor amounts of $C_4$ and/or $C_{11}$ hydrocarbons.

A "high octane" component is a component having a research octane number (RON) of for instance 80 or greater, suitably greater than 80, for example from 80 to 110. A "low octane" component is a component having a RON of for instance 70 or lower, suitably lower than 70, for example from 20 to 70.

This embodiment of the present invention is based on the discovery that it is possible to combine certain biologically-derived hydrocarbon components, in such a manner that the resultant combination can be used as a basestock for blending with an alcohol, such as ethanol, in order to form a gasoline fuel formulation. Moreover, the properties of the resultant formulation can be such as to comply with current regulatory specifications, for example EN 228 in Europe and ASTM D4814 in North America, making it suitable for use in unmodified vehicle engines and for distribution via the existing supply chain infrastructure.

The combination has been found suitable for blending with up to 10% v/v ethanol, as is to be required in the gasoline fuels of the future. It has also been found suitable for blending with higher concentrations of ethanol, and with other alcohols such as n-butanol and iso-butanol. Because the components (1), (2a), (2b) and (2c) can all be derived from biological sources, the overall fuel formulation can thus contain a high proportion, if not 100%, of renewable fuels.

The invention can thus allow the biofuel content of a gasoline fuel formulation to be significantly increased. Instead of blending a biologically-derived alcohol such as ethanol with a petroleum-derived gasoline base fuel, as is conventional, or with a mixture of petroleum-derived and biologically-derived fuel components, the alcohol can be blended with a combination of the biologically-derived component (1) and one or more of the biologically-derived components (2a), (2b) and (2c), which have now been found capable, when their relative concentrations are appropriately selected, of behaving together in the manner of a more conventional gasoline fuel.

A gasoline fuel formulation according to the invention can also have a relatively low carbon intensity compared to a conventional petroleum-derived gasoline fuel, resulting in a decrease in well-to-wheels carbon dioxide emissions. This too can be advantageous from an environmental standpoint. Moreover, because it can be largely hydrocarbon-based, as opposed to oxygenate-based, it can allow greater fuel economy than alternative biofuels such as high ethanol-content blends (for example those containing greater than 10% v/v ethanol).

In a fuel formulation according to the invention, the high octane component (1) may comprise a mixture of $C_5$ to $C_{11}$ or $C_5$ to $C_{10}$ hydrocarbons. The low octane component (2a) may comprise a mixture of $C_5$ to $C_9$ hydrocarbons. Both are biologically-derived, as are the components (2b) and (2c), meaning that they have been derived, whether directly or indirectly, from a biological source. A fuel component or fuel formulation which is biologically-derived will typically contain a significant proportion of carbon-containing species (in particular hydrocarbons) which are less than 100 years old as calculated from the carbon 14 content, i.e. which were formed during the previous hundred years, and thus have a higher concentration of the $^{14}C$ isotope than would a non-biologically-derived component such as from a mineral source. In this way, a biologically-derived component can be distinguished from one having mineral origins. Similarly, a biologically-derived oxygenate component will contain a higher concentration of the $^{14}C$ isotope than would the same chemical species but derived from a mineral source. By way of example, 80% w/w or more of the carbon-containing species present in a biologically-derived fuel component or oxygenate component may have been formed during the previous hundred years, or 90 or 95% w/w or more.

A biological source, from which a biologically-derived species such as an oxygenate component or other fuel component may be produced, may comprise organic matter from plants, animals and/or micro-organisms. It may in particular be biomass. As used herein, the term "biomass" refers to, without limitation, organic materials produced by plants (such as leaves, roots, seeds and stalks), and microbial and animal metabolic wastes. Common biomass sources include: (1) agricultural residues, including corn stover, straw, seed hulls, sugarcane leavings, bagasse, nutshells, cotton gin trash, and manure from cattle, poultry, and hogs; (2) wood materials, including wood or bark, sawdust, timber slash, and mill scrap; (3) municipal solid waste, including recycled paper, waste paper and yard clippings; and (4) energy crops, including poplars, willows, switch grass, *miscanthus*, sorghum, alfalfa, prairie bluestem, corn, soybean, and the like. The term also refers to the primary building blocks of the above, namely, lignin, cellulose, hemicellulose and carbohydrates, such as saccharides, sugars and starches, among others.

The isomerised $C_5/C_6$ hydrocarbon fuel component (2b) may be derived, at least indirectly, from a component (2a).

The $C_4$ hydrocarbon component (2c) may be derived, at least indirectly (for example by distillation), from the product of a catalytic conversion, in particular from a component (1) and/or from a component (2a). The concentration of the component (2c), if present, may be used to adjust the vapour pressure of the overall fuel formulation, the $C_4$ hydrocarbons being inherently more volatile than higher molecular weight hydrocarbons.

In embodiments of the invention, at least some of the $C_4$ hydrocarbon component (2c) may in practice be used in combination with a component (1) and/or (2a): for example, it may be incorporated in the form of a high octane $C_4$ to $C_{12}$ hydrocarbon stream corresponding to a combination of components (1) and (2c), or in the form of a low octane $C_4$ to $C_{10}$ hydrocarbon stream corresponding to a combination of components (2a) and (2c). Thus, for example, the catalytic deoxygenation and condensation processes used to produce the component (1) may be tailored so that the component comprises a mixture of $C_4$ to $C_{12}$ hydrocarbons. Instead or in addition, the catalytic deoxygenation and subsequent dehydration, oligomerisation and hydrotreatment processes used to produce the component (2a), if present, may be tailored so that the component comprises a mixture of $C_4$ to $C_{10}$ hydrocarbons. The desired concentration of $C_4$ hydrocarbons in—and hence volatility of—a fuel formulation according to the invention may therefore, in practice, be achieved by tailoring the $C_4$ hydrocarbon content of a component (1) and/or (2a), instead of or as well as the concentration of the component (2c) in the formulation.

The hydrocarbon fuel components (1) and (2a) are products of a conversion process carried out on a plurality, which may be two or more, of biologically-derived oxygenates or on an oxygenate component. An oxygenate is a compound containing one or more oxygen atoms, together with carbon and hydrogen atoms. In the context of the present invention, an oxygenate component is a component that consists of at least two molecules of oxygenate. It may for example be selected from sugars, alcohols (including di-, tri- and polyols), carboxylic acids, esters, ethers, ketones, aldehydes, furans, and mixtures thereof. It is suitably used in the form of a water-soluble material, but in cases may be used in the form of a water-insoluble material such as a cellulosic material. In an embodiment, the oxygenate comprises a sugar or mixture of sugars, for example selected from glucose, pentoses, hexoses, and mixtures thereof: this may for example be used in the form of a syrup such as corn syrup, or of sugar cane or sugar beet. In an embodiment, the oxygenate comprises an alcohol—in particular a polyol such as sorbitol—or mixture thereof. The oxygenate may have been obtained from a biological source by any suitable means: for example, a sugar may be generated by enzymatic hydrolysis of a cellulosic material such as lignocellulosic biomass, and an alcohol may be obtained by fermentation of a sugar.

Advantageously, the oxygenate may comprise a $C_1+O_{1-3}$ compound, i.e. a compound containing no more than three oxygen atoms per molecule. Suitably, such an oxygenate may comprise one or more of an alcohol, ketone, aldehyde, furan, diol, triol, hydroxyl carboxylic acid or carboxylic acid. Such an oxygenate may suitably be obtained by deoxygenation of an oxygenated hydrocarbon comprising a $C_{1+}O_{1+}$ compound. Such oxygenated hydrocarbons are themselves oxygenates.

In an embodiment, the oxygenate is obtained by providing water and a water-soluble oxygenated hydrocarbon comprising a $C_{1+}O_{1+}$ compound in an aqueous liquid phase and/or a vapor phase; providing $H_2$; and catalytically reacting in the liquid and/or vapor phase the oxygenated hydrocarbon with the $H_2$ in the presence of a deoxygenation catalyst at a deoxygenation temperature and deoxygenation pressure to produce an oxygenate comprising a $C_1+O_{1-3}$ compound.

The deoxygenation catalyst may be a heterogeneous catalyst having one or more materials capable of catalysing a reaction between hydrogen and the oxygenated hydrocarbon to remove one or more of the oxygen atoms from the oxygenated hydrocarbon to produce alcohols, ketones, aldehydes, furans, diols, triols, hydroxy carboxylic acids or carboxylic acids. Said one or more materials may be adhered to a support and may comprise one or more of Cu, Re, Fe, Ru, Ir, Co, Rh, Pt, Pd, Ni, W, Os, Mo, Ag, Au, alloys or combinations thereof. Said support may comprise a nitride, carbon, silica, alumina, zirconia, titania, vanadia, ceria, zinc oxide, chromia, boron nitride, heteropolyacids, kieselguhr, hydroxyapatite, or mixtures thereof.

Deoxygenation of an oxygenated hydrocarbon comprising a $C_{1+}O_{1+}$ compound may be carried out using any process which is suitable to generate a desired oxygenate, for example mono-oxgenated compounds such as alcohols, ketones, aldehydes, and mixtures thereof. The deoxygenation process may comprise a hydrogenation and/or hydrogenolysis step, which may for instance be used to convert a sugar such as glucose into a more readily processed polyol such as sorbitol. Such sugar-to-polyol conversion may be effected either upstream of or as part of the catalytic conversion process.

The conversion process suitably converts a plurality of biologically-derived oxygenates or an oxygenate component into one or more hydrocarbons, hydrogen and carbon dioxide.

A convenient way of providing for deoxygenation and/or conversion is an aqueous phase reforming (APR) process, which can be carried out at a relatively low temperature and in the liquid phase. Hydrogen generated from the reforming process may be fed back into the system and used in hydrogenation, hydrogenolysis and/or other deoxygenation processes taking place, for example in the conversion of a sugar into a polyol.

In an embodiment, the APR process is carried out in situ, on a product derived from the oxygenates by hydrogenation and/or hydrogenolysis. By way of example, a biologically-derived sugar may be converted into a polyol, which may then be subjected to aqueous phase reformation in order to generate both hydrogen and aldehydes in situ. The polyhydric alcohol and the aldehyde formed from it can then be converted, in situ, to form the desired hydrocarbon(s).

Any suitable catalysts and operating conditions may be used for deoxygenation and conversion process(es) carried out on the biologically-derived oxygenate, or for their constituent processing steps.

The catalytic conversion may comprise a catalytic condensation to form fuel component (1). The catalytic conversion may comprise any process which is suitable for generating, from a plurality of condensable oxygenates, e.g. oxygenates generated by a deoxygenation process, a hydrocarbon or mixture of hydrocarbons for use as a fuel component (1) in a fuel formulation according to the invention. Such a process may comprise an acid catalysed condensation reaction, a base catalysed condensation reaction, or any combination thereof. In an embodiment, it comprises an acid catalyzed condensation reaction, for example using a zeolite catalyst. Again, any suitable catalysts and operating conditions may be used for the condensation process or its constituent processing steps. The choice of catalyst(s) and operating conditions may be used to tailor the product of the condensation process, in particular its octane quality and/or aromatic hydrocarbon content.

Deoxygenation and condensation processes, may be carried out in a single reactor, ideally under steady-state conditions, using a single biologically-derived starting material or mixtures of biologically-derived starting materials. Nevertheless, the condensation reaction can still be considered to be "subsequent" to the deoxygenation reaction for any individual oxygenate which is subjected to the two processes.

Deoxygenation, e.g. by aqueous phase reforming, can form a mixture of alcohols, ketones, aldehydes, furans, organic acids and alkanes which provides a feed that can be passed over a catalyst such as an acid condensation catalyst (e.g. modified ZSM-5). The resultant oxygen-free condensate can be fractionated to produce a $C_5$ to $C_{10}$ (or in cases $C_4$ to $C_{10}$) hydrocarbon product for use in gasoline fuel formulations (corresponding to the high octane component (1) defined above), together with other products such as a $C_{11+}$ hydrocarbon component suitable for use in marine fuels.

Alternatively, the oxygenates or oxygenate component, preferably following a deoxygenation step, can be subjected to dehydration, oligomerisation and/or hydrotreatment to convert it to largely saturated, oxygen-free hydrocarbons. This yields a product that can then be fractionated to form either jet ($C_7$ to $C_{28}$) or diesel ($C_8$ to $C_{28}$) fuel components. This alternative route can also produce significant levels of a lighter ($C_5$ to $C_{10}$, or in cases $C_4$ to $C_{10}$) naphtha fraction which can be used as the component (2a) in a fuel formulation according to the invention. Such a naphtha fraction has often been found less useful in conventional gasoline fuels due to its relatively low octane values, but in accordance with the present invention it can be put to use in formulating within-specification biofuel-rich gasoline.

The dehydration, oligomerisation and/or hydrotreatment processes can also yield a separate $C_4$ fraction, useable as the component (2c). The naphtha fraction can be further fractionated to form a $C_6$ and below (for example $C_5$ to $C_6$), stream: this can then be subjected to isomerisation in order to yield a product, usable as the component (2b), which contains a higher proportion of higher octane branched-chain saturated hydrocarbons.

Any suitable catalysts and operating conditions may be used for dehydration, oligomerisation and/or hydrotreatment steps carried out on the APR product, for example to generate a component (2a) or (2c). Similarly, any suitable catalysts and operating conditions may be used for isomerisation of a downstream $C_5/C_6$ fraction in order to yield a component (2b): such isomerisation may be carried out using conventional technology.

The conditions used for the catalytic conversion may be tailored based on the teaching and principles disclosed in the following documents, which are incorporated herein by reference:

US20080216391, US20110257448, and US20130185992 relating to the synthesis of liquid fuels and chemicals from oxygenated hydrocarbons by acid condensation;

US20080300435 and US20110245542 relating to the synthesis of liquid fuels and chemicals from oxygenated hydrocarbons by base condensation;

US20080300434, US20110245543, and US20110257416 relating to the synthesis of liquid fuels and chemicals from oxygenated hydrocarbons by acid/base condensation;

US20100076233 relating to the synthesis of liquid fuels from biomass;

US20100077655, US20100218417, and US20130055626 relating to liquid fuel compositions;

US20120198760 relating to a method and systems for making distillate fuels from biomass;

US20130036660 relating to the production of chemicals and fuels from biomass; and US20130263498 relating to the production of distillate Fuels from biomass-derived polyoxygenates.

For the production of a high octane fuel component (1), catalytic conversion of the oxygenates to form hydrocarbons may suitably be conducted at temperatures between 300 and 500° C., and pressure ranging from 1 bar to 30 bar over a zeolite catalyst. Examples of such a process can be found in Examples 55 and 56 of US20080216391, and also in Example B hereinbelow.

For the production of a low octane fuel component (2a), catalytic conversion of the oxygenates may suitably be conducted at temperatures between 200 and 375° C. and pressure ranging from 20 bar to 150 bar over an acidic catalyst. Residual oxygen and olefins may be optionally removed using a subsequent deoxygenation and/or hydrotreating process. Examples of such a process can be found in Examples 24 and 31 of US20130263498, and also in Example A hereinbelow.

It can be seen that processes such as those just described can yield, from the same soluble biomass, firstly a $C_5$ to $C_{12}$ or $C_4$ to $C_{12}$ gasoline product that comprises a mixture of paraffinic and aromatic hydrocarbons and is somewhat similar to a refinery reformate stream with relatively high octane quality; and secondly a $C_5$ to $C_{10}$ or $C_4$ to $C_{10}$ naphtha product that primarily consists of n-alkanes and consequently has a relatively low octane quality and sensitivity. These two products correspond respectively to components (1) and (2a) of the $C_4$ to $C_{12}$ hydrocarbon mixture used in the present invention, optionally incorporating component (2c). Fractionation of the lower octane stream (2a) to produce a $C_6$ and lower product allows conventional isomerisation technology to be applied to form a $C_5/C_6$ component with upgraded octane quality, in which aromatic moieties such as benzene have been converted to saturated moieties such as cycloalkanes, and n-alkanes to their branched-chain isomers. This isomerised product corresponds to component (2b).

The conditions used for the production of an isomerate (2b) from a low octane fuel component (2a) may suitably include reaction pressures between 14 and 60 bar and a temperature between 100° C. and 250° C. for a chlorided alumina type isomerization catalyst, a temperature between 125° C. and 225° C. for a sulfated zirconia type isomerization catalyst, and a temperature between 200° C. and 350° C. for a zeolite type isomerization catalyst. Other catalysts and conditions for isomerization will be apparent to those skilled in the art.

The high octane "reformate" component (1) may contain for example from 40 to 80% v/v of aromatic hydrocarbons, but it can also contain n- and iso-paraffins and small amounts of olefins and naphthenes. This type of product has been used as a gasoline fuel component, usually incorporated at blend ratios of up to about 50% v/v in combination with more conventional, mineral-derived, gasoline fuel components. Its aromatics content has however generally been considered too high for it to be suitable for use at higher blend ratios.

Following the catalytic conversion, in particular condensation reaction, used to produce it, the high octane component (1) is typically separated into two subcomponents, the first comprising all or some of the $C_4$ hydrocarbons from the original stream and the second containing no, or a lower concentration of, $C_4$ hydrocarbons. The extent to which the $C_4$ hydrocarbons are removed may be used to tailor the volatility of the component (1) and thus of a fuel formulation containing it.

In a specific embodiment, the second subcomponent contains no $C_4$ hydrocarbons. $C_4$ Hydrocarbons have been separated from such bio-reformate products, and then used to adjust the vapour pressure of a final fuel formulation which contains the remaining $C_5$ to $C_{12}$ fraction of the reformate. In a similar fashion, a fuel component (2c) comprising one or more $C_4$ hydrocarbons (suitably a subcomponent of the type just described) may be incorporated into a gasoline fuel formulation according to the invention, together with the component (1) and optionally either or both of components (2a) and (2b), at a concentration suitable to achieve a desired vapour pressure for the overall formulation. In effect, some or all of the separated $C_4$ hydrocarbons may be reintroduced into the reformate (1) prior to its use in a fuel formulation according to the invention. Instead or in addition, some or all of the removed $C_4$ hydrocarbons may be added separately into a fuel formulation according to the invention, in addition to the component (1) and optionally (2a) and/or (2b).

Deoxygenation and subsequent dehydration, oligomerisation and/or hydrotreatment processes, as described above, may be used to produce a low octane stream which is usable as the component (2a) in a fuel formulation according to the invention. Such a component may be a paraffinic naphtha stream, analogous to a light refinery naphtha, and may for example comprise a mixture of n- and iso-paraffins. It may also contain some naphthenes and benzene. Again, some or all of the $C_4$ hydrocarbons present in the low octane stream may be removed following its production. Some or all of the thus-removed $C_4$ hydrocarbons may be reintroduced into the stream prior to its use as a component (2a) in accordance with the invention, and/or may be used as a component (2c) in the final fuel formulation. In a specific embodiment, a component (2a) used in a fuel formulation according to the invention contains no $C_4$ hydrocarbons.

As described in more detail below, the fuel components (1) and (2a) may both be produced from the same, or the same type of, biomass treatment process, but using different processing steps and conditions subsequent to a deoxygenation process. In an embodiment, they are both produced from the same process, in which a plurality of biologically-derived oxygenates or an oxygenate component is subjected to catalytic deoxygenation, and the resultant deoxygenate is separated into two streams, one of which is processed to yield the high octane component (1) and the other to yield the low octane component (2a).

In a further embodiment, the fuel component (2b) may be the indirect product of the same type of process as that used to produce the component (1) and/or (2a). In an embodiment, the component (2b) is produced from the same process, ie from the same biologically-derived oxygenate, as the component (1) and/or (2a). In an embodiment, it is the product of a fractionation and subsequent isomerisation process carried out on the component (2a).

In a yet further embodiment, the fuel component (2c) may be the indirect product of the same type of process as that used to produce the component (1) and/or (2a). In an embodiment, the component (2c) is produced from the same process, i.e. from the same biologically-derived oxygenate, as the component (1) and/or (2a). In an embodiment, it is the product of a fractionation process carried out on the component (1) and/or the component (2a).

In an embodiment, all four fuel components (1), (2a), (2b) and (2c) are the direct or indirect products of the same type of process. In an embodiment, all four of the components are produced from the same process, i.e. from the same biologically-derived oxygenate. In this embodiment, the components (2b) and (2c) are suitably derived from the component (2a).

The invention can therefore make use of two, or in cases three or even four, products from a single type of biomass-to-hydrocarbon conversion process. The biologically-derived component (1), together with one or more of the components (2a) to (2c), can be incorporated into a single basestock mixture that is compatible with other biofuel components such as alcohols, making it possible to formulate 100% (or close to 100%) renewable gasoline fuels. This can provide new uses for the products of such reforming processes, and thus help to make more efficient use of the processes. At the same time, it can increase the options available to the fuel formulator, for increasing the biofuel content of a gasoline fuel formulation whilst still meeting relevant fuel specifications.

The high octane fuel component (1) suitably comprises hydrocarbons with boiling points in the gasoline range (typically from 0 to 250° C., or from 20 or 25° C. to 200 or 230° C.). In an embodiment, it comprises a mixture of $C_4$ to $C_{12}$ hydrocarbons or of $C_4$ to $C_{11}$ or $C_4$ to $C_{10}$ hydrocarbons. In an embodiment, it comprises a mixture of $C_5$ to $C_{11}$ or $C_5$ to $C_{10}$ hydrocarbons. Suitably it contains primarily (i.e. 99% v/v or more of, or 99.5 or 99.9% v/v or more of) $C_4$ to $C_{10}$ hydrocarbons. Suitably it contains 10% v/v or less of, or 7% v/v or less of, $C_4$ hydrocarbons.

The component (1) suitably has a motor octane number MON of 70 or greater, or of 75 or more suitably 80 or greater. It may have a MON of up to 100, or of up to 95 or 90, for example from 80 to 95. It suitably has a research octane number RON of 80 or greater, or of 85 or more suitably 90 or greater. It may have a RON of up to 110, or of up to 105, for example from 90 to 105. A relatively high benzene content component (1) might for instance have a MON of from 83 to 93 or from 86 to 90, and/or a RON of from 95 to 105 or from 98 to 102. A relatively low benzene content component (1) might for instance have a MON of from 80 to 90 or from 83 to 87, and/or a RON of from 90 to 100 or from 93 to 97.

The component (1) may have an octane sensitivity (RON minus MON) of for example from 7 to 15.

In order to comply with automotive gasoline fuel specifications, it may be necessary to limit the aromatics and/or benzene contents of the component (1). The component may for instance contain up to 80% v/v of aromatic species, in particular aromatic hydrocarbons. It may contain up to 75 or 70% v/v of aromatic species, or in cases up to 65 or 60% v/v. It may contain 40% v/v or more of aromatic species, or 45 or 50% v/v or more, for example from 50 to 70% v/v or from 50 to 70% v/v. In cases, it may contain 55 or 60 or 65% v/v or more of aromatic species. It may contain up to 3% v/v of benzene, or up to 2.5 or 2% v/v, or in cases up to 1.5 or 1% v/v. It may contain 0.1% v/v or more of benzene, or 0.25 or 0.5% v/v or more, for example from 0.5 to 2% v/v. In cases it may contain 1 or 1.5% v/v or more of benzene.

In a specific embodiment, in particular for use in an EN 228-compliant gasoline fuel formulation and/or a reformulated gasoline fuel formulation, the component (1) contains from 60 to 70% v/v of aromatic species, and/or from 1 to 2% v/v or from 1.5 to 2% v/v of benzene. In another embodiment, in particular for use in an ASTM D4814-compliant gasoline fuel formulation, the component (1) contains from 50 to 60% v/v of aromatic species, and/or from 0.2 to 1% v/v of benzene, ideally from 0.2 to 0.62% v/v.

The component (1) will suitably boil in the range from 0 to 250° C. or from 15 or 20 or 25 to 200 or 220 or 230° C. It may for example have an initial boiling point (IBP) of from 15 to 70° C., and/or a final boiling point (FBP) of from 150 to 220° C. It will suitably have a density of from 720 to 870 kg/m$^3$ at 15° C. It will suitably have a vapour pressure at 37.8° C. (dry vapour pressure equivalent, DVPE) of from 30 to 110 kPa. It will suitably contain 5 mg/kg or less of sulphur. Suitably at least 99% v/v of its constituents will be biologically-derived, as defined above and assessed for example based on $^{14}$C content.

The low octane fuel component (2a) suitably comprises hydrocarbons with boiling points in the gasoline range (typically from 0 to 250° C. or from 15 or 20 or 25 to 200 or 220 or 230° C.). In an embodiment, it comprises a mixture of $C_4$ to $C_{10}$ hydrocarbons. This mixture suitably contains a relatively high proportion (for example 90% v/v or more) of naphthenic and paraffinic hydrocarbons, in particular paraffinic hydrocarbons. It may for example contain 65% v/v or more of $C_5$ to $C_9$ n- and iso-paraffins. It will typically contain a major proportion (for example 45% v/v or greater) of $C_5$ and $C_6$ paraffins. Suitably it contains primarily (i.e. 95% v/v or more of, or 98% v/v or more of) $C_4$ to $C_{10}$ hydrocarbons. Suitably it contains 20% v/v or less of $C_4$ hydrocarbons, or in cases 10 or 5% v/v or less.

The component (2a) suitably has a MON of 30 or greater, or of 40 or 45 or 48 or greater. It may have a MON of up to 70, or of up to 60 or 55 or 52, for example from 30 to 70 or from 40 to 60 or from 45 to 55. It suitably has a RON of 30 or greater, or of 40 or 45 or 48 or greater. It may have a RON of up to 70, or of up to 60 or 55 or 52, for example from 30 to 70 or from 40 to 60 or from 45 to 55. A component (2a) might have an octane sensitivity of for example from 0 to 6.

The component (2a) suitably contains 5% v/v or less of aromatic species, in particular aromatic hydrocarbons, or 2 or 1 or 0.5% v/v or less, for example from 0 to 2% v/v. In an embodiment, it contains no aromatic species. It suitably contains 2% v/v or less of benzene, for example from 0 to 1% v/v. In an embodiment, it contains no benzene.

The component (2a) will suitably boil in the range from 0 to 250° C., or from 15 or 20 or 25° C. to 200 or 220 or 230° C. It may for example have an initial boiling point (IBP) of from 15 to 70° C., and/or a final boiling point (FBP) of from 150 to 220° C. It will suitably have a density of from 600 to 760 kg/m$^3$ at 15° C. It will suitably have a vapour pressure at 37.8° C. (dry vapour pressure equivalent, DVPE) of from 30 to 110 kPa. It will suitably contain 5 mg/kg or less of sulphur. Suitably at least 99% v/v of its constituents will be biologically-derived, as defined above and assessed for example based on $^{14}$C content.

The high octane isomerised fuel component (2b) suitably comprises hydrocarbons with boiling points in the gasoline range (typically from 0 to 250° C. or from 15 or 20 or 25 to 200 or 220 or 230° C.). In an embodiment, it comprises a mixture of $C_5$ and $C_6$ hydrocarbons; it may also contain minor amounts (for example 10% v/v or less, or 5 or 4% v/v or less) of $C_4$ and/or $C_7$ hydrocarbons. This mixture suitably contains a high proportion (for example 60% v/v or more, or 65 or 70% v/v or more) of iso-paraffins, suitably $C_5$ to $C_6$ iso-paraffins. It may contain from 0 to 15% v/v or from 0 to 12% v/v of n-paraffins, suitably $C_5$ to $C_6$ n-paraffins.

The component (2b) suitably has a MON of 75 or greater, or of 80 or 82 or greater. It may have a MON of up to 95, or of up to 90 or 86, for example from 75 to 95 or from 80 to 88. It suitably has a RON of 75 or greater, or of 80 or 85 or greater. It may have a RON of up to 95, or of up to 90, for example from 75 to 95 or from 83 to 91. A component (2b) might have an octane sensitivity of for example from 0 to 6, or from 1 to 5.

The component (2b) suitably contains 5% v/v or less of aromatic species, in particular aromatic hydrocarbons, or 2 or 1 or 0.5% v/v or less, for example from 0 to 0.5% v/v. In an embodiment, it contains no aromatic species.

The component (2b) will suitably boil in the range from 0 to 120° C. It will suitably have a density of from 580 to 740 kg/m³ at 15° C. It will suitably have a vapour pressure at 37.8° C. (dry vapour pressure equivalent, DVPE) of from 45 to 110 kPa. It will suitably have an olefin content of less than 5% v/v. It will suitably contain 5 mg/kg or less of sulphur. Suitably at least 99% v/v of its constituents will be biologically-derived, as defined above and assessed for example based on $^{14}C$ content.

In the $C_4$ hydrocarbon component (2c), the $C_4$ hydrocarbon(s) may be selected from butanes, butenes, and mixtures thereof, for example from n-butane, iso-butane, n-butene, iso-butene and mixtures thereof. A $C_4$ hydrocarbon fuel component (2c) may comprise one or more such $C_4$ hydrocarbons. A component (2c) may contain small amounts (for example 8% v/v or less, or 7 or 6 or 5% v/v or less) of $C_3$ and/or $C_5$ hydrocarbons. It suitably contains 90% v/v or more, more suitably 92 or 94 or 95% v/v or more, of $C_4$ hydrocarbons.

In a gasoline fuel formulation according to the invention, the biologically-derived alcohol may for example be selected from $C_1$ to $C_5$ saturated or unsaturated alcohols and mixtures thereof. It may in particular be selected from $C_1$ to $C_4$ aliphatic alcohols such as ethanol, propanol and butanol, and mixtures thereof. References to "propanol" and "butanol" are to all isomers of the relevant molecule and mixtures thereof: thus, for example, butanol may be either n-butanol, iso-butanol, t-butanol or a mixture thereof. However, when the alcohol is butanol, it may in particular be n-butanol, iso-butanol or a mixture thereof, more particularly iso-butanol.

The biologically-derived alcohol may in particular be selected from ethanol, butanol and mixtures thereof, more particularly from ethanol, n-butanol, iso-butanol and mixtures thereof, yet more particularly from ethanol, iso-butanol and mixtures thereof. In an embodiment, it is ethanol. In an embodiment it is butanol, in particular n-butanol or iso-butanol or a mixture thereof, more particularly iso-butanol.

The alcohol may suitably be derived from a plant source such as corn or sugar cane or biomass. It may for instance have been produced by fermentation of one or more plant-derived sugars.

The concentration of the alcohol in the fuel formulation may be 0.5% v/v or greater. It may be 1 or 2.5 or 5% v/v or greater, or 7.5% v/v or greater. Its concentration may be up to 30% v/v, or up to 25 or 20 or 15% v/v, or up to 10% v/v, such as from 1 to 30% v/v or from 1 to 25% v/v or from 1 to 20% v/v. In cases its concentration may be from 1 to 15% v/v or from 1 to 10% v/v or from 5 to 10% v/v. The alcohol concentration may for example be approximately 5% v/v, or approximately 10% v/v, or approximately 15 or 20% v/v, in particular approximately 10% v/v.

A gasoline fuel formulation according to the invention may contain one or more additional fuel components. In an embodiment, it may contain one or more additional biofuel components and/or oxygenates. Such additional fuel components may have boiling points within the normal gasoline boiling range, and in the case of biofuel components will have been derived—whether directly or indirectly—from biological sources. Additional oxygenates will also suitably be biologically-derived.

A fuel formulation according to the invention should be suitable for use in a spark ignition (petrol) internal combustion engine. It may in particular be suitable for use as an automotive fuel.

The MON of the fuel formulation is suitably 70 or greater, or 75 or 80 or greater. It may be 84 or 85 or greater. The MON may for example be from 70 to 110 or from 75 to 105 or from 84 to 95. The RON of the formulation is suitably 80 or greater: it may be 85 or 90 or 93 or 94 or 95 or 98 or greater. The RON may for example be from 80 to 110 or from 85 to 115 or from 90 to 105 or from 93 to 102 or from 94 to 100.

The anti-knock index AKI of the formulation is suitably 85 or greater, or 87 or 90 or 91 or greater, for example from 87 to 95 or from 91 to 95. In an embodiment, the AKI of the formulation is greater than 87. In an embodiment, it is greater than 91. AKI is defined as (RON+MON)/2, and can therefore be calculated from RON and MON values measured using the tests referred to below.

The RVP (Reid vapour pressure) of the formulation is suitably 105 kPa or lower, such as from 45 to 105 kPa, the exact value depending on the conditions under which the formulation is intended to be used. Its E70 value is suitably 52% v/v or less, such as from 22 to 52% v/v. Its E100 value is suitably 72% v/v or less, such as from 46 to 72% v/v.

The concentration of aromatic hydrocarbons in the formulation is suitably 35% v/v or lower. The concentration of benzene in the formulation is suitably 1.0% v/v or lower.

A fuel formulation according to the invention will suitably comply with applicable current standard gasoline fuel specification(s) such as for example EN 228 in the European Union or ASTM D4814 in North America. By way of example, the overall formulation may have a density from 720 to 775 kg/m³ at 15° C.; a final boiling point of 210° C. or less; a RON of 95.0 or greater; a MON of 85.0 or greater; and/or an olefinic hydrocarbon content of from 0 to 20% v/v. It may have an oxygen content (depending at least in part on its alcohol content) of from 0.5 to 12% w/w, or from 0.5 to 10% w/w or from 0.5 to 5% w/w, such as from 1 to 12% w/w or from 1 to 10% w/w. It may have an E70 value of from 22 to 52% v/v, and/or an E100 value of from 46 to 72% v/v. Relevant specifications may however differ from country to country, from season to season and from year to year, and may depend on the intended use of the formulation. Moreover a formulation according to the invention may contain fuel components with properties outside of these ranges, since the properties of an overall blend may differ, often significantly, from those of its individual constituents.

In a first specific embodiment of the first aspect of the invention, the gasoline fuel formulation satisfies one or more of, suitably two or more of, or all five of, the following criteria:

a) a RON of 95 or greater;
b) a DVPE of 100 kPa or less;

c) an E70 value of 52% v/v or less, suitably from 22 to 52;
d) a benzene content of 1% v/v or less; and
e) a total aromatics content of 35% v/v or less.

A formulation which satisfies all five of these criteria is likely to be suitable for use as a European automotive gasoline fuel, compliant with the European standard EN 228. A DVPE of 100 kPa or less (for example from 50 to 100, or from 50 to 80, or from 60 to 90, or from 65 to 95, or from 70 to 100, kPa) may then be suitable for a winter grade fuel, and a DVPE of 70 kPa or less (for example from 45 to 70 or from 45 to 60 kPa) for a summer grade fuel. Such a formulation suitably also has an olefin content of 18% v/v or less.

In a second specific embodiment of the first aspect of the invention, the gasoline fuel formulation satisfies one or more of, suitably two or more of, or all five of, the following criteria:
a) an AKI of 87 or greater;
b) a DVPE of 15.0 psi (103.4 kPa) or less;
c) a T10 value of 70° C. or less, or of 50° C. or less, and/or a T90 value of 190° C. or less or of 185° C. or less;
d) a benzene content of 0.62% v/v or less; and
e) a total aromatics content of 50% v/v or less.

A formulation which satisfies all five of these criteria, or at least criteria (a) to (c) and (e), is likely to be suitable for use as a North American regular grade automotive gasoline fuel, compliant with the North American standard ASTM D4814. A DVPE of 15.0 psi (103.4 kPa) or less may then be suitable for a winter grade fuel, and a DVPE of 7.8 psi (53.8 kPa) or less for a summer grade fuel. Such a formulation suitably also has an olefin content of 25% v/v or less.

In a third specific embodiment of the first aspect of the invention, the gasoline fuel formulation satisfies one or more of, suitably two or more of, or all five of, the following criteria:
a) an AKI of 91 or greater;
b) a DVPE of 15.0 psi (103.4 kPa) or less;
c) a T10 value of 70° C. or less, or of 50° C. or less, and/or a T90 value of 190° C. or less or of 185° C. or less;
d) a benzene content of 0.62% v/v or less; and
e) a total aromatics content of 50% v/v or less.

A formulation which satisfies all five of these criteria, or at least criteria (a) to (c) and (e), is likely to be suitable for use as a North American premium grade automotive gasoline fuel, compliant with the North American standard ASTM D4814. A DVPE of 15.0 psi (103.4 kPa) or less may then be suitable for a winter grade fuel, and a DVPE of 9.0 psi (62.1 kPa) or less, or of 7.8 psi (53.8 kPa) or less, for a summer grade fuel.

Such a formulation suitably also has an olefin content of 25% v/v or less. It suitably has a driveability index (DI) of 597 or less, or of 569 or less. In particular, a formulation for use as a summer grade fuel ideally has a DI of 597 or less, and a formulation for use as a winter grade fuel ideally has a DI of 569 or less.

A gasoline fuel formulation according to the invention suitably has a low total lead content, such as at most 0.005 g/l. In an embodiment it is lead free ("unleaded"), ie it has no lead compounds in it. It suitably has a low sulphur content, such as 30 mg/kg or less.

A gasoline fuel formulation according to the invention may be a category 4 or category 5 unleaded gasoline fuel, as defined according to the Worldwide Fuel Charter (5$^{th}$ Edition available for instance from the European Automobile Manufacturers Association in Belgium or the Alliance of Automobile Manufacturers in the USA. It may be a category 5 unleaded gasoline fuel. It may have a density of from 715 to 775 kg/m$^3$, in particular from 715 to 770 kg/m$^3$ or from 720 to 775 kg/m$^3$. It may have an oxygen content of 2.7% w/w or less. It may have an olefin content of 18.0% v/v or less, in particular of 10.0% v/v or less. It may have an aromatics content of 50.0% v/v or less, or of 40.0% v/v or less, in particular of 35.0% v/v or less. It may have a benzene content of 5.0% v/v or less, or of 2.5% v/v or less, in particular of 1.0% v/v or less.

The formulation may have an RVP of from 45 to 105 kPa. It may have an E70 value of from 20 to 50% v/v. It may have an E100 value of from 50 to 70% v/v. Within these ranges, such volatility-related properties may be tailored for the climatic conditions under which the formulation is intended to be used.

The formulation may have a MON of 82.0 or greater, or of 82.5 or greater, or more preferably of 85.0 or 88.0 or greater. It may have a RON of 91.0 or greater, or of 95.0 or greater, or of 98.0 or greater. In an embodiment it is a 95 RON fuel with a RON of 95.0 or greater or a 98 RON fuel with a RON of 98.0 or greater, in particular a 98 RON fuel.

The density of a fuel formulation or fuel component can be measured using ASTM D4052 or EN ISO 3675; its RVP using ASTM D323 and its DVPE using ASTM D5191 or IP 394; its E70, E100, T10 and T90 values and other distillation properties using ASTM D86 or EN ISO 3405; its MON using ASTM D2700 or EN ISO 5163; and its RON using ASTM D2699 or EN ISO 5164. Its hydrocarbon composition (for example, the relative concentrations of components such as olefins, paraffins or aromatic hydrocarbons) may be determined using EN 15553 or EN ISO 22854. Its oxygen content can be measured using EN 13132 or EN ISO 22854, and its sulphur content using EN 13032, EN ISO 20846 or EN ISO 20884. Its DI (driveability index) can be calculated using ASTM D4814.

A fuel formulation according to the invention may contain one or more fuel or refinery additives which are suitable for use in gasoline fuels. Many such additives are known and commercially available. They may be added to the fuel formulation, or any component thereof, at any point prior to or during its preparation, for example to a hydrocarbon basestock which is subsequently blended with the biologically-derived alcohol. Non-limiting examples of suitable types of fuel additives that can be included in a gasoline fuel formulation include anti-oxidants, corrosion inhibitors, detergents, dehazers, antiknock additives, metal deactivators, valve-seat recession protectant compounds, dyes, solvents, carrier fluids, diluents, friction modifiers, markers, and combinations thereof. Examples of suitable such additives are described generally in U.S. Pat. No. 5,855,629.

In a fuel formulation according to the invention, the relative concentrations of the alcohol and of the $C_4$ to $C_{12}$ hydrocarbon mixture, in particular of the hydrocarbon components (1), (2a), (2b) and (2c) if present, can be chosen so as to achieve one or more desired properties for the overall fuel formulation. Suitable concentration ratios will depend in part on the natures and properties of the components, and in part on any specification(s) with which the fuel formulation is to comply, for example as to its octane and/or anti-knock quality, its vapour pressure, its aromatics and/or benzene content, its distillation properties (for instance distillation temperatures, or E70 or E100 values) and/or its density. Such specification(s) may in turn depend on the country and/or season in which the fuel formulation is intended to be used, and/or on its intended grade (for example premium or regular).

Suitable concentrations for the components of the fuel formulation may be calculated by applying appropriate blending rules to the desired properties (for example the octane numbers, E70 or E100 values or vapour pressures) of the individual components. For these purposes, blending values should be used for the relevant properties of each of the components.

For example, the DVPE or RVP of a blend of fuel components may be calculated using the Chevron blend rule and the relevant measured blending values. The distillation properties of a blend, for example its E70 value, may be calculated using linear blending rules and Hartenhof blending values. RON and MON values may be determined according to known octane models, employing the appropriate blending coefficients.

A three-way composition plot may be used to provide a visual indication of which concentration ratios could be used for a three-constituent combination of components selected from components (1), (2a), (2b) and (2c) so as to yield, when the combination is blended with an alcohol at a desired concentration, a fuel formulation having the desired properties overall. Spreadsheets and associated calculation methods may also be used to determine suitable concentration ranges for each of the components, setting appropriate constraints for example on key properties of the resultant fuel formulation and/or on concentrations of certain components.

In general, it may be necessary to adjust the relative concentrations of the components (1) and (2a), or of components (1), (2a) and (2b), in order to tailor the aromatics and/or benzene content of the fuel formulation, and/or in order to tailor the octane number of the formulation. These properties can also be tailored by selecting a component (1) with an appropriate aromatics and/or benzene content, which in turn may be achievable by tailoring the conditions under which the component is produced. Generally speaking, the higher the concentration of the high octane component (1), and/or the lower the concentration of the low octane component (2a), the higher the aromatics and benzene contents of the resultant fuel formulation and the higher its octane number.

The concentration of the $C_4$ hydrocarbon component (2c) may be used to help tailor the vapour pressure of the overall fuel formulation, thus for instance making it possible to produce both winter grade (higher vapour pressure) and summer grade (lower vapour pressure) formulations in order to comply with seasonal fuel specifications. Generally speaking, the higher the concentration of the $C_4$ component, the higher the vapour pressure of the resultant fuel formulation.

By way of example, the concentration of the high octane hydrocarbon fuel component (1), in the gasoline fuel formulation, may be 40% v/v or greater, or 45% v/v or greater, or 50 or 55 or 60% v/v or greater, or in cases 65 or 70 or 75 or 80% v/v or greater. It may be up to 90% v/v, or up to 85 or 80 or 75 or 70% v/v, or up to 65 or 60 or 55 or 50% v/v, such as from 44 to 81% v/v or from 46 to 81% v/v.

In cases, the concentration of the component (1) may be 46% v/v or greater, or 51 or 53 or 56 or 58 or 59% v/v or greater, or in cases 60% v/v or greater. Its concentration may be up to 81% v/v, or up to 80 or 78 or 76 or 75 or 74 or 73% v/v, or in cases up to 72 or 65% v/v.

By way of example, the concentration of the low octane component (2a) in the formulation (if present) may be 0.1% v/v or greater, or 0.5 or 1 or 2.5% v/v or greater. It may be 5% v/v or greater, or 8 or 10 or 15% v/v or greater, or in cases 20 or 25 or 30 or 35% v/v or greater. It may be up to 50% v/v, or up to 45 or 40% v/v, or in cases up to 35 or 30 or 25 or 20 or 15 or 10% v/v.

In cases, the concentration of the component (2a), if present, may be 1% v/v or greater, or 4 or 6% v/v or greater, or in cases 16% v/v or greater. Its concentration may be up to 34% v/v, or up to 33 or 32 or 27 or 26% v/v, or in cases up to 23 or 22 or 19% v/v. It may for example be from 0 to 34% v/v, or from 0.5 to 34% v/v, or from 1 to 34% v/v.

By way of example, the concentration of the $C_5/C_6$ isomerised hydrocarbon fuel component (2b), if present in the gasoline fuel formulation, may be 1% v/v or greater, or 2% v/v or greater, or in cases 5 or 7% v/v or greater. Its concentration may be up to 37% v/v, or up to 33 or 31 or 27 or 26% v/v, or in cases up to 18 or 16 or 10 or even 6% v/v. It may for example be from 0 to 37% v/v, or from 0.5 to 37% v/v, or from 1 to 37% v/v.

By way of example, the concentration of the $C_4$ hydrocarbon component (2c) in the formulation (if present) may be up to 20% v/v, or up to 15% v/v, or in cases up to 10 or 5 or 3% v/v, or up to 2 or 1% v/v. It may be 0.1% v/v or greater, or 0.25 or 0.5 or 0.75 or 1% v/v or greater, or in cases 2.5 or 5 or 7.5 or 10% v/v or greater.

In cases, the concentration of the component (2c), if present, may be 1% v/v or greater, or 2 or 3% v/v or greater, or in cases 6% v/v or greater. Its concentration may be up to 21% v/v, or up to 20 or 18 or 17 or 16% v/v, or in cases up to 15 or 13% v/v. It may for example be from 0 to 21% v/v, or from 0.5 to 21% v/v, or from 1 to 21% v/v.

In an embodiment, in particular where a gasoline fuel formulation according to the invention contains ethanol, more particularly when it contains from 2.5 to 7.5% v/v (for example 5% v/v) of ethanol, it may contain from 59 to 80% v/v of the component (1), from 1 to 27% v/v of the component (2a), from 0 to 26% v/v of the component (2b), and/or from 0 to 15% v/v of the component (2c).

In an embodiment, in particular where the gasoline fuel formulation contains ethanol, more particularly when it contains from 7.5 to 15% v/v (for example 10% v/v) of ethanol, it may contain from 53 to 76% v/v of the component (1), from 6 to 34% v/v of the component (2a), from 0 to 16% v/v of the component (2b), and/or from 0 to 15% v/v of the component (2c).

In an embodiment, in particular where the gasoline fuel formulation contains ethanol, more particularly when it contains greater than 15% v/v (for example 20% v/v or greater, or from 15 to 25% v/v, such as 20% v/v) of ethanol, it may contain from 46 to 65% v/v of the component (1), from 16 to 32% v/v of the component (2a), from 0 to 6% v/v of the component (2b), and/or from 1 to 13% v/v of the component (2c).

In an embodiment, in particular where the gasoline fuel formulation contains n-butanol, more particularly when it contains from 2.5 to 7.5% v/v (for example 5% v/v) of n-butanol, it may contain from 58 to 72% v/v of the component (1), from 1 to 19% v/v of the component (2a), from 7 to 31% v/v of the component (2b), and/or from 1 to 16% v/v of the component (2c).

In an embodiment, in particular where the gasoline fuel formulation contains n-butanol, more particularly when it contains from 7.5 to 15% v/v (for example 10% v/v) of n-butanol, it may contain from 60 to 75% v/v of the component (1), from 1 to 22% v/v of the component (2a), from 1 to 33% v/v of the component (2b), and/or from 3 to 17% v/v of the component (2c).

In an embodiment, in particular where the gasoline fuel formulation contains n-butanol, more particularly when it contains greater than 15% v/v (for example 20% v/v or greater, or from 15 to 25% v/v, such as 20% v/v) of n-butanol, it may contain from 56 to 74% v/v of the component (1), from 0 to 23% v/v of the component (2a), from 2 to 27% v/v of the component (2b), and/or from 3 to 20% v/v of the component (2c).

In an embodiment, in particular where the gasoline fuel formulation contains iso-butanol, more particularly when it contains from 2.5 to 7.5% v/v (for example 5% v/v) of iso-butanol, it may contain from 59 to 73% v/v of the component (1), from 0 to 22% v/v of the component (2a), from 1 to 37% v/v of the component (2b), and/or from 2 to 17% v/v of the component (2c).

In an embodiment, in particular where the gasoline fuel formulation contains iso-butanol, more particularly when it contains from 7.5 to 15% v/v (for example 10% v/v) of iso-butanol, it may contain from 56 to 81% v/v of the component (1), from 0 to 26% v/v of the component (2a), from 0 to 31% v/v of the component (2b), and/or from 2 to 18% v/v of the component (2c).

In an embodiment, in particular where the gasoline fuel formulation contains iso-butanol, more particularly when it contains greater than 15% v/v of (for example 20% v/v or greater, or from 15 to 25% v/v, such as 20% v/v) of iso-butanol, it may contain from 51 to 78% v/v of the component (1), from 4 to 33% v/v of the component (2a), from 0 to 18% v/v of the component (2b), and/or from 6 to 21% v/v of the component (2c).

In embodiments, it may be preferred for the $C_4$ to $C_{12}$ hydrocarbon fuel component mixture, in a fuel formulation according to the invention, to contain a relatively low concentration of the $C_5/C_6$ isomerised hydrocarbon fuel component (2b), since this is the most intensively processed of the hydrocarbon components and hence likely to be the most costly. For example, the concentration of the component (2b) in a gasoline fuel formulation according to the invention may be 37% v/v or lower, or 33 or 31% v/v or lower, or 27 or 26% v/v or lower, or more suitably 18 or 16% v/v or lower, in cases 10 or 6 or 5% v/v or lower. In an embodiment, the concentration of the component (2c) is 2% v/v or lower. In an embodiment, the component (2c) is absent from the formulation.

In an embodiment, in particular when a gasoline fuel formulation according to the invention is a category 4 or category 5 unleaded gasoline fuel, as defined according to the Worldwide Fuel Charter (see above), it may contain from 42 to 69% v/v, in particular from 48 to 64 or from 48 to 60 or from 48 to 56% v/v, of the component (1); from 0 to 30% v/v, or from 1 to 30% v/v, in particular from 16 to 30% v/v, of the component (2a); from 0 to 35% v/v, or from 0 to 30 or 0 to 20% v/v, or from 1 to 35 or 1 to 30 or 1 to 20% v/v, in particular from 0 to 9% v/v, of the component (2b); and/or from 1 to 17% v/v, in particular from 5 to 13% v/v, of the component (2c).

Where the fuel formulation contains ethanol, in particular less than 20% v/v ethanol, it may contain both component (1) and component (2a), optionally with component (2b) and/or component (2c). Where the fuel formulation contains n-butanol, in particular less than 20% v/v n-butanol, it may contain all four components (1) and (2a) to (2c). Where the fuel formulation contains iso-butanol, it may contain both component (1) and component (2c), optionally with component (2a) and/or component (2b).

In embodiments of the first aspect of the invention, the biologically-derived alcohol may be ethanol, and its concentration from 10 to 30% v/v or from 15 to 25% v/v or from 18 to 22% v/v, such as about 20% v/v. In embodiments, the biologically-derived alcohol may be either ethanol or butanol, and its concentration from 5 to 20% v/v or from 5 to 15% v/v or from 8 to 12% v/v, such as about 10% v/v. In embodiments, the biologically-derived alcohol may be butanol, and its concentration from 5 to 20% v/v or from 5 to 15% v/v or from 8 to 12% v/v, such as about 10% v/v. In embodiments, the biologically-derived alcohol may be either ethanol or iso-butanol, and its concentration from 2 to 10% v/v, such as about 5% v/v. In embodiments, the biologically-derived alcohol may be iso-butanol, and its concentration from 5 to 30% v/v: this concentration may be from 5 to 20% v/v or from 5 to 15% v/v or from 8 to 12% v/v, such as about 10% v/v; or it may be from 10 to 30% v/v or from 15 to 25% v/v or from 18 to 22% v/v, such as about 20% v/v.

According to a second aspect, the invention provides a method for producing a gasoline fuel formulation, which method comprises combining together (a) a biologically-derived alcohol and (b) a mixture of $C_4$ to $C_{12}$ hydrocarbon fuel components, all of which hydrocarbon fuel components have been derived, whether directly or indirectly, from the catalytic conversion of a plurality of biologically-derived oxygenates or an oxygenate component, in order to produce a gasoline fuel formulation that contains 60% v/v or more of the combination of (a) and (b) and from 0.1 to 30% v/v of the alcohol (a). The alcohol (a) may in particular be selected from ethanol, butanol and in cases mixtures thereof.

Such a method suitably comprises combining the biologically-derived alcohol (a), a high octane hydrocarbon fuel component (1), and one or more of a low octane hydrocarbon fuel component (2a), an isomerised fuel component (2b) and a $C_4$ hydrocarbon fuel component (2c), where the components (1), (2a), (2b) and (2c) are as defined above in connection with the first aspect of the invention.

The method may comprise the step(s) of producing one or more of the components (1) and (2a) to (2c), either directly or indirectly, from a plurality of biologically-derived oxygenates or an oxygenate component. It may comprise producing at least components (1) and (2a) in this way; or at least components (1), (2a) and (2b); or all four components. Such production steps may comprise subjecting a plurality of biologically-derived oxygenates or oxygenate component to a catalytic conversion process, in particular an APR process, with optional further downstream treatment processes.

In a specific embodiment, such a method comprises:

i. subjecting a plurality of biologically-derived oxygenates or oxygenate component, optionally following a catalytic deoxygenation process, to a catalytic condensation process in order to produce either the high octane hydrocarbon fuel component (1) or a precursor thereto which additionally contains one or more $C_4$ hydrocarbons;

ii. subjecting a plurality of biologically-derived oxygenates or oxygenate component, optionally following a catalytic deoxygenation process, to a dehydration, oligomerisation and/or hydrotreatment process in order to produce the low octane hydrocarbon fuel component (2a); and iii. mixing together the component (1) which results from step (i) and the component (2a) which results from step (ii), either before, after or at the same time as combining them with the biologically-derived alcohol (a).

In this embodiment, the steps (i) and (ii) may both be carried out on the same biologically-derived oxygenate or mixture of biologically-derived oxygenates. In a specific embodiment, a plurality of biologically-derived oxygenates or oxygenate component or mixture thereof is subjected to a catalytic deoxygenation process; the resulting deoxygenate product is then separated into first and second streams; the first stream is subjected to a catalytic condensation process under conditions suitable to produce the high octane fuel component (1); the second stream is subjected to dehydration, oligomerisation and hydrotreatment processes under conditions suitable to produce the low octane fuel component (2a); and the resulting processed first stream is mixed with the processed second stream—and/or a further-processed product thereof, such as for example a fuel component (2b) or (2c)—in a desired concentration ratio.

In an embodiment, the method comprises an additional step (iv) of subjecting the component (2a) produced in step (ii) to a fractionation process in order to yield a $C_6$ and below hydrocarbon mixture, and subsequently subjecting the $C_6$ and below hydrocarbon mixture to an isomerisation process in order to produce the isomerised $C_5/C_6$ hydrocarbon fuel component (2b). The method suitably also involves mixing the product of step (iv) with the products of steps (i) and/or (ii).

The method may comprise removing some or all, suitably all, of the $C_4$ hydrocarbons from the product of the catalytic condensation process in step (i). The $C_4$ hydrocarbons may be removed by distillation. The method may comprise returning some or all of the thus-removed $C_4$ hydrocarbons to the component (1), to the component (2a), and/or to a mixture of components (1) and (2a). Instead or in addition, the components (1) and/or (2a) may be mixed with a biologically-derived $C_4$ hydrocarbon fuel component from another source.

The method may comprise removing some or all, suitably all, of the $C_4$ hydrocarbons from the product of the dehydration, oligomerisation and hydrotreatment processes in step (ii). Again the $C_4$ hydrocarbons may be removed by distillation. The method may comprise returning some or all of the thus-removed $C_4$ hydrocarbons to the component (1), to the component (2a), and/or to the mixture of components (1) and (2a).

A method according to the second aspect of the invention can thus allow the production of a fully biologically-derived gasoline fuel formulation, using hydrocarbon components from a single production route. Preferred features of the deoxygenation, condensation and other treatment processes used in the method, and of the oxygenate starting material, may be as described above in connection with the first aspect of the invention. In particular, the deoxygenation process may comprise aqueous phase reforming of the biologically-derived oxygenate, or of a derivative thereof such as an alcohol, in order to generate hydrogen in situ.

A method according to the second aspect of the invention may also comprise preparing the biologically-derived oxygenate from a suitable biological source, for instance plant-derived biomass. The preparation may comprise pretreatment of a source such as lignocellulosic biomass, for example by enzymatic hydrolysis in order to convert celluloses into sugars. It may comprise subjecting the source, or a component generated from the source, to hydrogenation and/or hydrogenolysis: this may for example be used to convert a sugar into an alcohol, in particular a polyhydric alcohol.

A gasoline fuel formulation produced using a method according to the second aspect of the invention may in particular be a fuel formulation according to the first aspect.

The invention may be used to produce at least 1,000 litres of the gasoline fuel formulation, or at least 5,000 or 10,000 or 20,000 or 50,000 litres.

A third aspect of the invention provides a method of operating an internal combustion engine, and/or a vehicle which is driven by an internal combustion engine, which method involves introducing into a combustion chamber of the engine a gasoline fuel formulation according to the first aspect of the invention. The engine will suitably be a spark ignition (petrol) engine.

According to a fourth aspect, the invention provides the use of a hydrocarbon fuel component (1) as defined above, in combination with a biologically-derived alcohol and one or more of the components (2a), (2b) and (2c) as defined above, in a gasoline fuel formulation, for the purpose of increasing the concentration of biologically-derived fuel components (in particular biologically-derived hydrocarbon fuel components) in the formulation. Suitably the relevant components are used for the purpose of increasing the concentration of biologically-derived fuel components in the formulation whilst at the same time allowing the formulation to meet a desired fuel specification or standard, in particular to make the formulation suitable for use as an automotive gasoline fuel, more particularly a category 4 or category 5 unleaded gasoline fuel as defined according to the Worldwide Fuel Charter (see above).

The natures of the components (1), (2a), (2b) and (2c) and of the biologically-derived alcohol, and the concentrations in which they are used, may be as described above in connection with the first to the third aspects of the invention.

Throughout the description and claims of this specification, the words "comprise" and "contain" and variations of the words, for example "comprising" and "comprises", mean "including but not limited to", and do not exclude other moieties, additives, components, integers or steps. Moreover the singular encompasses the plural unless the context otherwise requires: in particular, where the indefinite article is used, the specification is to be understood as contemplating plurality as well as singularity, unless the context requires otherwise.

Preferred features of each aspect of the invention may be as described in connection with any of the other aspects. Other features of the invention will become apparent from the following examples. Generally speaking the invention extends to any novel one, or any novel combination, of the features disclosed in this specification (including any accompanying claims and drawings). Thus features, integers, characteristics, compounds, chemical moieties or groups described in conjunction with a particular aspect, embodiment or example of the invention are to be understood to be applicable to any other aspect, embodiment or example described herein unless incompatible therewith. Moreover unless stated otherwise, any feature disclosed herein may be replaced by an alternative feature serving the same or a similar purpose.

Where upper and lower limits are quoted for a property, for example for the concentration of a fuel component, then a range of values defined by a combination of any of the upper limits with any of the lower limits may also be implied.

In this specification, references to fuel and fuel component properties are—unless stated otherwise—to properties measured under ambient conditions, ie at atmospheric pressure and at a temperature of from 16 to 22 or 25° C., or from 18 to 22 or 25° C., for example about 20° C. Percentage concentrations by volume are denoted as "% v/v" or "% vol" or "% v". Percentage concentrations by mass are denoted as "% w/w" or "% m".

The following non-limiting illustrative examples describe how the production of a low octane fuel component (Example A) and the production of a high octane fuel component (Example B) may be achieved.

BRIEF DESCRIPTION OF DRAWINGS

Reference is made to the accompanying drawings in which:

FIG. 1 is a process flow diagram (PFD) showing overall process flow, in diagrammatic form, for the process of Example A, and FIG. 2 is a process flow diagram (PFD) showing overall process flow, in diagrammatic form, for the process of Example B.

EXAMPLE A—PRODUCTION OF A LOW OCTANE FUEL COMPONENT

The below example summarizes the results obtained from a process that was configured to continuously and simultaneously produce $C_4$ to $C_{28}$ hydrocarbons containing bio-naphtha component (2a), bio-distillate, and bio-heavy hydrocarbons. The term bio-distillate refers to a hydrocarbon fraction which encompasses the boiling point range for both jet fuel and diesel fuel.

FIG. 1 shows a high level PFD of the overall process flow. Conditions for the catalytic reaction steps are contained within Table A1a. The fresh feed to the system 101, was a 60% dry solids mixture of 43 DE (dextrose equivalent) corn syrup and water. Fresh feed 101, was combined with hydrogen 102, and recycle from the reactor outlet 105, to form the combined feed 103 to the first stage aqueous phase reactor 104. The combined feed 103, was passed over the catalyst contained within reactor 104, whereupon hydrogen was consumed to facilitate deoxygenation and carbon-carbon bond cleavage of the corn syrup sugar molecules. The reactor temperatures were maintained in a range such that liquid was present at the reactor outlet. A portion of the reactor 104 liquid phase products was returned to the reactor inlet as recycle 105 while the remaining liquid and all the gas phase products 107 were removed from reactor, cooled, and separated into gas and liquid phase products in separator 108. The gas phase product 109, primarily residual hydrogen, was removed from the process. The liquid phase product 110 was passed on to the second stage APR.

Liquid phase product 110 from the first stage APR was combined with hydrogen 111 and second stage APR liquid recycle 114 to form the combined feed 112 to the second stage APR reactor 113. The second stage of APR continued the hydrogen consuming reactions of the first stage. After passing over the catalyst in the second stage APR reactor 113, a portion of the liquid products were returned to the reactor inlet as liquid recycle 114 while the remaining liquid and all the gas phase products 115 were combined with recycle stream 125 to form combined stream 116 and passed on to the condensation reactor 117.

Condensation product 118 was flashed and separated in hot separator 119 to form a gas stream 120 and a liquid stream 121 which was sent on to hydrotreating. The gas stream 120 was cooled and separated in cold separator 122 to generate a gas product 123 which was vented from the system, an aqueous product 124 which was removed from the system, and an organic phase, a portion of which was directed into recycle stream 125 and a portion 126 which was sent to hydrotreating.

Streams 121 and 126 were combined with hydrogen 127 and hydrotreating product recycle 132 to form the combined feed 128 for the hydrotreating reactor 129. In the hydrotreating step, hydrogen was reacted with the product of the condensation process step in order further to remove oxygen so that the product sent on for distillation was substantially hydrocarbons. The nickel catalyst within the hydrotreating reactor was suitable for promoting the required oxygen removing reactions. Subsequent to the hydrotreating reactor 129, hydrotreating reactor effluent 130 was cooled and separated in cold separator 131. Gas product 133 from separator 131 was vented and a portion of the organic phase was directed to the hydrotreating recycle 132. The remaining organic phase and any free water were taken as net product 134 and sent on to distillation column 135 which recovered bio-naphtha 136 and water 137 as overhead products. Bottoms product 138 was subjected to further separation in distillation column 139 to generate bio-jet or bio-diesel (depending on the operation of the distillation columns 135 and 139) as an overhead product 140 and a heavies fraction 141 suitable for a number of fuel oil, lubricant, solvent, and other applications.

TABLE A1a

Reactor Conditions for Example A

| Unit Op | APR I 104 | APR II 113 | Condensation 117 | Hydrotreating 129 |
|---|---|---|---|---|
| Temperature | 175-245° C. | 245-260° C. | 250-310° C. | 330-400° C. |
| Pressure | 124 bar | 62 bar | 62 bar | 90 bar |
| WHSV* | 0.8 hr$^{-1}$ | 0.8 hr$^{-1}$ | 0.8 hr$^{-1}$ | 1.6 hr$^{-1}$ |
| Feed | 60% 43DE Corn syrup | APR I Product | APR II Product | DHOG Product |
| H$_2$ Co-feed mol H$_2$/mol C | 1.4:1 | 0.8:1 | — | 0.5:1 |
| Recycle Ratio**, mass recycle/mass fresh feed | 2:1 | 1:1 | 0.9:1 | 0.7:1 |

*WHSV, weight hourly space velocity. The feed rate for all four catalysts used for determining space velocity was based on the fresh corn syrup feed (dry basis) into the system.
**The recycle ratio was based on the total mass of feed entering the reactor (wet basis, including water)

Table A1b summarizes catalyst formulations used in the above bio-hydrocarbon production process. The aqueous phase reforming and condensation catalysts were made with monoclinic zirconia or tungstated zirconia support (NorPro Saint Gobain). Metals impregnation was completed by incipient wetness with a deionized water/ammonium nitrate solution. The catalysts were calcined in a static oven at a maximum temperature of 400° C. The condensation catalyst was selected for its ability to form carbon-carbon bonds and increase the average molecular weight of the reaction products in order to produce distillate fuels in the $C_9$-$C_{20}$ range. The reactions include dehydration, olefin oligomerization, aldol condensation, and other oligomerization and condensation reactions as described in Patent Application US20120198760 A1. The hydrotreating (HT) catalyst was a commercial nickel oxide catalyst available from CRI catalysts, KL6560, which was loaded as received. After loading into the reactors, the catalysts were reduced under flowing hydrogen using typical industrial reduction conditions.

TABLE A1b

Catalyst Compositions

| Process | HDO I | HDO II | Condensation | Hydrotreating |
|---|---|---|---|---|
| Metal 1 | Pd | Pd | Pd | Ni |
| Metal 2 | Mo | Ag | Ag | — |

TABLE A1b-continued

| | Catalyst Compositions | | | |
|---|---|---|---|---|
| Process | HDO I | HDO II | Condensation | Hydrotreating |
| Metal 3 | Sn | — | — | — |
| Support | W on M-ZrO$_2$ | WO$_x$—ZrO$_2$ | WO$_x$—ZrO$_2$ | Alumina |

The catalysts were loaded into the process described above and operated for 21 days. Samples of process intermediate streams and product streams were subjected to gas chromatography with flame ionization detector (GC), gas chromatography with a mass spectroscopy detector (GC-MS), and/or high performance liquid chromatography (HPLC) to determine the composition of the samples. These analytical techniques are commonly used and familiar to those skilled in the art of hydrocarbon and oxygenate analysis.

Table A1c summarizes the composition of the APR product 115 on a carbon percentage basis. Approximately 90% of the components contained continuous carbon chain lengths of six or less. This material was subsequently sent on to condensation reactor In order to modify the carbon number distribution to increase the amount of molecules in the jet and diesel range.

The composition was a complex mixture which comprised mono-oxygenates such as alcohols, ketones, aldehydes, and ethers (including cyclic ethers such as 2,5 dimethyl tetrahydrofuran) and more highly oxygenated di-oxygenates and poly-oxygenates. Around half of the mixture consisted of species which did not fall into the categories listed or could not be identified though the analytical techniques employed covered by the other and unknown category.

Table A1d shows a typical bio-naphtha 136 composition from the same operation. The bio-naphtha could be further distilled into a light, C$_5$ and C$_6$ fraction and subjected to isomerization. Due to the large amount of normal hexane (47 wt % of the total naphtha cut or 68% of the C$_5$+C$_6$ fraction), the octane upgrading potential that would be obtained from isomerization would be substantial.

TABLE A1c

| | Start of Run | 21 Days on Stream |
|---|---|---|
| Paraffins | 2% | 2% |
| Olefins | 1% | 0% |
| Alcohols | 8% | 6% |
| Ketones | 10% | 4% |
| Aldehydes | 7% | 5% |
| Ethers | 9% | 9% |
| Di-Oxygenates | 6% | 8% |
| Poly-Oxygenates | 11% | 10% |
| Other + Unknown | 44% | 56% |

TABLE A1d

| Name | CAS Number | Composition (wt %) |
|---|---|---|
| Ethane | 74-84-0 | 0.02 |
| Propane | 74-98-6 | 0.9 |
| Isobutane | 75-28-5 | 0.1 |
| Butane | 106-97-8 | 3.5 |
| Butane, 2-methyl- | 78-78-4 | 0.7 |
| Pentane | 109-66-0 | 9.4 |
| Cyclopentane | 287-92-3 | 0.6 |
| Pentane, 2-methyl- | 107-83-5 | 2.0 |

TABLE A1d-continued

| Name | CAS Number | Composition (wt %) |
|---|---|---|
| Pentane, 3-methyl- | 96-14-0 | 1.5 |
| Hexane | 110-54-3 | 47.0 |
| Cyclopentane, methyl- | 96-37-7 | 4.4 |
| Pentane, 2,4-dimethyl- | 108-08-7 | 0.01 |
| Benzene | 71-43-2 | 0.05 |
| Cyclohexane | 110-82-7 | 3.5 |
| C$_{7+}$ | | 26.4 |

EXAMPLE B—PRODUCTION OF A HIGH OCTANE FUEL COMPONENT (1)

The below example summarizes the results obtained from a process that was configured to continuously and simultaneously produce bio-reformate component (1), bio-butanes component (2c), and light bio-naphtha from sucrose. The overall process flow utilized is illustrated by FIG. 2. Conditions for the catalytic reaction steps are contained within Table B2a. The fresh feed to the system 101, was a 60% dry solids mixture of sucrose and water. Fresh feed 101, was combined with hydrogen 102, and recycle from the reactor outlet 107, to form the combined feed to the reactor 104. The combined feed 103, was passed over the catalyst contained within reactor 104, whereupon hydrogen was consumed to facilitate deoxygenation and carbon-carbon bond cleavage of the sucrose. The reactor temperatures were maintained in a range such that liquid was present at the reactor outlet. The reactor effluent 105 was cooled and separated in decanter 106 into gas, organic liquid, and aqueous phase products. The gas phase product 108, containing excess hydrogen and light hydrocarbons was vented from the system to maintain pressure. A portion of the aqueous phase product 107 was recycled to the reactor inlet while the organic phase 109 product and the remaining portion of the aqueous phase product 110 was sent on to condensation.

The APR and condensation catalysts were made using monoclinic zirconia support (NorPro Saint Gobain). The catalyst composition is summarized in Table B2b. Metals impregnation for the APR catalyst was completed by incipient wetness. The catalysts were calcined in a static oven at a maximum temperature of 400° C. After loading into the reactors, the APR catalyst was reduced under flowing hydrogen using typical industrial reduction conditions.

The catalysts within the condensation reactors 112a, 112b, and 112c were selected for the ability to generate aromatic hydrocarbons. In general, two reactors were operated to convert the oxygenate feed from the APR process, shown as 112a and 112b operated in series while a third reactor was regenerated using an oxidative regeneration step, shown as 112c in this example. The three reactors shown were rotated through the lead (112a in FIG. 2), lag (112b in FIG. 2), and regeneration (112c in FIG. 2) positions such that the reactors were brought off line, regenerated, and brought back on line in a manner to support continuous process operations. APR product organic 109 and aqueous 110 fractions were combined with recycle gas 121 and recycle liquid 128 to generate combined feed 111 upstream of the condensation reactor 112a. Lead reactor 112a product 113 was then sent on to a lag reactor 112b for further oxygenate conversion. Lag reactor product 114 was cooled and separated into gas, organic, and aqueous phase product in decanter 115. The aqueous phase product was exported from the system. The gas phase product 118 was combined with distillation column offgas 128 and a portion of the combined stream was compressed in compressor 120 to increase the pressure of the recycle gas 121 and allow it to be returned to the reactor inlet. A portion of the gas 119 was vented to maintain system pressure.

The organic phase product 117, containing high levels of aromatics, was removed from the system as product 117 or was sent on to distillation column 122 which was operated to remove components with boiling points less than that of toluene (including benzene) from the bio-reformate 123. The distillation column overhead was cooled and separated in decanter 124. The gas phase fraction 128 was recycled while the liquid phase fraction was returned to the distillation column as reflux 125, sent to the condensation reactors through a pump as liquid recycle 127, or removed as light naphtha product 226.

Table B2c summarizes the composition of the liquid APR product which is the combination of streams 109 and 110 referring to FIG. 2 on a water free weight percentage basis. This material was subsequently sent on to condensation reactor 112a to generate aromatics and other hydrocarbons from the mixed oxygenates.

The composition of the liquid APR product was a complex mixture which comprised mono-oxygenates such as alcohols, ketones, aldehydes, and ethers (including cyclic ethers such as 2,5 dimethyl tetrahydrofuran) and more highly oxygenated di-oxygenates and poly-oxygenates. Around one third of the mixture consisted of species which did not fall into the categories listed or could not be identified though the analytical techniques employed covered by the other and unknown category.

Table B2d shows typical bio-reformate compositions from the same operation. One case corresponds to the composition at 117 in FIG. 2 before distillation and one to the composition at 123 in FIG. 2 after distillation to remove $C_{6-}$ hydrocarbons. The $C_{6-}$ hydrocarbons 126, containing almost all of the benzene, could be subjected to benzene saturation and recombined with the product 123 to generate a highly aromatic but low benzene reformate product.

TABLE B2a

Reactor Operating Parameters

|  | APR | Condensation |
|---|---|---|
| Internal Temperature Range (° C.) | 175-290 | 350-450 |
| Pressure (bar) | 124 | 7 |
| WHSV (hr$^{-1}$) | 0.4 | 0.85* |
| H$_2$ addition (molH$_2$/mol Feed Carbon) | 1.75 | None |
| Vapor Recycle (g recycle/g feed) | None | 3 |
| Liquid Recycle (g recycle/g feed) | 4 | 0-0.95 |

*WHSV is on a single reactor basis

TABLE B2b

| Catalyst | APR | Condensation |
|---|---|---|
| Metal Content | Pd, Mo, Sn, W | Ni |
| Support | Monoclinic ZrO$_2$ | ZSM-5 (SAR 30) |

TABLE B2c

|  | Weight Percent of APR Product Liquid |
|---|---|
| Paraffins | 1.6% |
| Olefins | 0.3% |
| Alcohols | 19.1% |
| Ketones | 3.1% |
| Aldehydes | 0.6% |
| Ethers | 9.4% |
| Diols | 22.7% |
| Poly-Oxygenates | 2.9% |
| Organic Acids | 3.8% |
| Other di-oxygenates | 1.84% |
| Other + Unknown | 35% |

TABLE B2d

| Case | Unfractionated bio-reformate 117, wt % | Fractionated bio-reformate 123, wt % |
|---|---|---|
| Paraffins | | |
| Ethane | 0.0 | 0.0 |
| Propane | 0.9 | 0.0 |
| Isobutane | 1.8 | 0.0 |
| Butane | 1.9 | 0.0 |
| Butane, 2-methyl- | 2.6 | 0.0 |
| Pentane | 1.2 | 0.0 |
| Butane, 2,2-dimethyl- | 0.0 | 0.0 |
| Pentane, 2-methyl- | 0.8 | 0.0 |
| Pentane, 3-methyl- | 0.4 | 0.0 |
| Hexane | 1.8 | 0.0 |
| C$_{7+}$ Paraffins | 0.7 | 0.3 |
| Naphthenes | | |
| Cyclopentane | 0.5 | 0.0 |
| Cyclopentane, methyl- | 2.1 | 0.0 |
| Cyclohexane | 0.1 | 0.0 |
| C$_{7+}$ Naphthenes | 2.4 | 1.0 |
| Olefins | | |
| C$_4$ Olefins | 0.4 | 0.0 |
| C$_5$ Olefins | 0.8 | 0.0 |
| C$_{6+}$ Olefins | 0.6 | 0.0 |
| Aromatics | | |
| Benzene | 2.7 | 0.0 |
| Toluene | 15.6 | 16.9 |
| Ethylbenzene | 4.1 | 7.1 |
| m-Xylene | 12.7 | 17.0 |
| p-Xylene | 3.1 | 3.3 |
| o-Xylene | 4.8 | 6.1 |
| C$_9$ Aromatics | 20.8 | 26.8 |
| C$_{10+}$ Aromatics | 13.7 | 19.0 |
| Other | 3.5 | 2.5 |

The present invention will now be further described with reference to the following non-limiting example.

Example 1

This example shows how gasoline fuels can be contain 100% biologically-derived fuel components, whilst still complying with the current European Union standard, EN 228, for automotive gasoline fuels.

The fuel formulations make use of components which are obtainable from a catalytic process for the conversion of biological materials into hydrocarbons. This process involves the catalytic deoxygenation and reforming of an oxygenate derived from a plant source such as lignocellulosic biomass, using an APR treatment process. As described in more detail below, two separate oxygenate streams are subjected to two different further treatments, so as to yield both a high octane and a low octane hydrocarbon product.

The data that follow demonstrate that, using only biologically-derived fuel components of this type, the invention may be used to formulate a wide range of gasoline fuels. The APR-derived hydrocarbon components, blended together in different ratios according to requirements, can provide versatility in terms of the properties of the overall formulations, in particular as to octane quality and volatility. Thus, fuels can be formulated to meet the requirements of different vehicle emission control technologies and different climatic conditions.

Four hydrocarbon components were considered, corresponding to components (1), (2a), (2b) and (2c) as defined above. They were:
  a $C_5$ to $C_{10}$ "bio-reformate" (component (1)).
  a $C_5$ to $C_{10}$ "bio-naphtha" (component (2a)).
  a $C_5$ to $C_6$ "bio-isomerate" (component (2b)).
  a $C_4$ "bio-butanes/butenes" component (component (2c)), referred to in the following results tables as "bio-butanes".

All four can be obtained from the same basic APR process, carried out on a water-soluble biologically-derived oxygenate. The bio-reformate can be obtained directly, by acid-catalysed condensation of the APR product followed by removal of the $C_4$ hydrocarbons by distillation. Suitable conditions for the acid-catalysed condensation process are a pressure between 1 bar and 30 bar, a temperature between 300° C. and 500° C. using a zeolite catalyst.

The bio-naphtha can also be obtained directly, by dehydration, oligomerisation and hydrotreatment of the APR product, again followed by distillation to remove the $C_4$ hydrocarbons. Suitable conditions for these processes are a pressure between 30 and 250 bar, a temperature between 200 and 350° C., using an acid catalyst.

The relatively high octane reformate contains aromatic hydrocarbons. The amounts and natures of these aromatic species (including benzene) can be varied by altering the conditions for the condensation reaction from which the reformate results. The aromatic content of component (1) is a function of the operating conditions and catalyst used for the condensation system as well as the effective hydrogen to carbon ratio of the oxygenate mixture converted in the condensation system. The benzene content of component (1) is influenced by the same conditions as the total aromatics content but to a different extent. Therefore, there is some ability to control benzene content independent of the total aromatic content of component (1).

Benzene levels are strictly controlled in automotive gasoline fuels. For example, the MSAT-II (Mobile Source Air Toxics limit for hazardous air pollutants, set by the Environmental Protection Agency in the USA) requirement for benzene levels in US gasoline is an annual average of 0.62% v/v: this represents a major constraint for the formulation of biofuel-containing gasoline fuels.

The current EN 228 specification in Europe allows for a maximum benzene level of 1% v/v and a maximum total aromatics content of 35% v/v. Consequently, for European use it becomes possible to formulate a gasoline fuel with a bio-reformate containing a higher level of benzene, provided that the following condition is met:

(35% v/tot.aromatics (% v) in $C_{5+}$ bio-roformate)* benzene (% v) in $C_{5+}$ bio-reformate≤1% v This in turn can make possible the use of a relatively high octane bio-reformate in a 100% biologically-derived gasoline fuel.

In general terms, when carrying out the present invention, appropriate levels of $C_4$ hydrocarbons may be left in the bio-reformate and/or the bio-naphtha components in order to yield desired volatility and distillation profiles. This may be in part achieved by tailoring the conditions under which the two components are processed, in order to yield product streams that contain the desired $C_4$ levels and/or that have the desired properties. For the purposes of this example, the bio-reformate and bio-naphtha components are both assumed to contain no $C_4$ hydrocarbons: the bio-butane component can then be used to tailor the $C_4$ content—and hence the volatility—of the overall fuel formulation.

The bio-isomerate can be obtained by fractionation of the bio-naphtha stream followed by isomerisation to convert paraffins into iso-paraffins and to saturate olefins and aromatic compounds. Suitable conditions for this isomerisation process are reaction pressures between 14 and 60 bar and a temperature between 100° C. and 250° C. for a chlorided alumina type isomerization catalyst, a temperature between 125° C. and 225° C. for a sulfated zirconia type isomerization catalyst, and a temperature between 200° C. and 350° C. for a zeolite type isomerization catalyst.

As described above, the bio-butanes/butenes component can be obtained, by distillation, from either the bio-reformate or the bio-naphtha stream.

The compositions of a typical bio-reformate and bio-naphtha, both obtained from an APR process with subsequent processing as described above, are shown in Tables 1a and 1b respectively at the end of this example. Table 1c shows the composition of a $C_5/C_6$ bio-isomerate that could be obtained from the bio-naphtha component of Table 1b. The figures in the tables are percentage concentrations by volume (% v/v). The benzene content of the reformate was 1.57% v/v.

Also considered were three oxygenates: ethanol, n-butanol and iso-butanol. These too can be obtained from biological sources.

Theoretical calculations were used to establish in what ratios these components could be mixed in order to create gasoline fuel formulations having certain desired properties. Calculations were performed for formulations containing 5, 10 and 20% v/v of each alcohol. Although the bio-reformate and bio-naphtha of Tables 1a and 1b contain $C_4$ hydrocarbons, the notional bio-reformate and bio-naphtha used in the calculations did not: instead, the bio-butane was used as a separate component, to allow more effective tailoring of overall fuel volatility.

For the purposes of these calculations, certain fuel component properties were assumed to translate into formulation properties on a linear-by-volume basis: this applied to oxygen content, aromatics (and benzene) content, olefin content and density. RVP was assumed to blend according to the Chevron rule:

$$RVP = \Sigma_1^n v_{fn} RVP_n^{1.5}$$

where RVP is the Reid vapour pressure of the fuel formulation in kPa; $v_{fn}$ is the volume fraction of component n; and $RVP_n$ is the Reid vapour pressure of component n, again in kPa.

A Hartenhof calculation was used to assign values for E70, E100, E120, E150 and E180, which were then assumed to blend on a linear-by-volume basis. RON and MON values were determined using a model derived from fundamental understandings of octane number (see for example C Morley, "A fundamental based correlation between alkane structure and octane number", *Comb Sci Tech* 55 (1987): 115, and L J Kirsch and C P Quinn, "A fundamentally based model of knock in the gasoline engine", 16$^{th}$ *Symp (Int) Comb* (The Combustion Institute, Pittsburgh 1976), page 233). Table 2, at the end of this example, sets out blending properties used for the seven potential fuel components, corrected where necessary to take account of the absence of $C_4$ hydrocarbons in the bio-reformate and bio-naphtha.

In order to consider a range of different gasoline fuel specifications, reference was made to the Worldwide Fuel Charter (see above). This defines five categories of fuel quality for unleaded gasoline, depending on the markets in which the fuels are intended to be used:

Category 1: markets with no or first level emission control, based primarily on fundamental vehicle/engine performance and protection of emission control systems, for example markets requiring US Tier 0, EURO 1 or equivalent emission standards.

Category 2: markets with requirements for emission control or other market demands, for example markets requiring US Tier 1, EURO 2/II, EURO 3/III or equivalent emission standards.

Category 3: markets with more stringent requirements for emission control or other market demands, for example markets requiring US LEV, California LEV or ULEV, EURO 4/IV (except lean burn gasoline engines), JP 2005 or equivalent emission standards.

Category 4: markets with advanced requirements for emission control, for example markets requiring US Tier 2, US Tier 3 (pending), US 2007/2010 Heavy Duty On-Highway, US Non-Road Tier 4, California LEV II, EURO 4/IV, EURO 5/V, EURO 6/VI, JP 2009 or equivalent emission standards. Category 4 fuels enable sophisticated $NO_x$ and particulate matter after-treatment technologies.

Category 5: markets with highly advanced requirements for emission control and fuel efficiency, for example those markets with Category 4 emission standards that also require US 2017 light duty fuel economy, US heavy duty fuel economy, California LEV III or equivalent emission control and fuel efficiency standards.

The fuel properties required across these five categories are summarised in Tables 3 and 4 at the end of this example, Table 4 relating specifically to the volatility requirements. It is to be noted that within each category, a fuel may be formulated to any of three different octane specifications: 91 RON, 95 RON and 98 RON, and independently to any of five different volatility classes.

The approach taken involved setting two targets for each formulation:
 a RON or MON value, the choice being dependent upon which octane value was limiting; and
 an RVP value that is the upper limit of each volatility class.

Other properties were then constrained within appropriate limits for each volatility class and fuel category. Based on the blending properties of the fuel components, an Excel (trade mark) spreadsheet solver was used to find blend ratios which used both the maximum and minimum possible amounts of the $C_5/C_6$ bio-isomerate.

The combination of three octane classes, five categories of fuel for different levels of emission control and five volatility classes results in 75 (i.e. 3×5×5) different unleaded gasoline fuel specifications that cover the fuel requirements of the different world markets. The present calculations aimed to identify how many of these 75 specifications could be met using some or all of the seven biologically-derived fuel components.

Example 1A—Bio-Gasoline With Ethanol

The results of the calculations for formulations containing biologically-derived ethanol are summarised in Tables 5a to 5c below. These show the categories in which fuels can be formulated to the necessary specifications. The ethanol was introduced into the calculations at concentrations of 5, 10 and 20% v/v.

TABLE 5a

5% v/v Ethanol

| Volatility Class | 98 RON | 95 RON | 91 RON |
|---|---|---|---|
| A | 1 | 1, 2 | 1, 2, 3, 4, 5 |
| B | 1 | 1, 2 | 1, 2, 3, 4, 5 |
| C | 1 | 1, 2 | 1, 2, 3, 4, 5 |
| D | 1 | 1, 2, 3, 4, 5 | 1, 2, 3, 4, 5 |
| E | 1, 2 | 1, 2, 3, 4, 5 | 1, 2, 3, 4, 5 |

TABLE 5b

10% v/v Ethanol

| Volatility Class | 98 RON | 95 RON | 91 RON |
|---|---|---|---|
| A | 1 | 1, 2 | 1, 2, 3, 4, 5 |
| B | 1 | 1, 2 | 1, 2, 3, 4, 5 |
| C | 1 | 1, 2 | 1, 2, 3, 4, 5 |
| D | 1, 2 | 1, 2, 3, 4, 5 | 1, 2, 3, 4, 5 |
| E | 1, 2 | 1, 2, 3, 4, 5 | 1, 2, 3, 4, 5 |

TABLE 5c

20% v/v Ethanol

| Volatility Class | 98 RON | 95 RON | 91 RON |
|---|---|---|---|
| A | 1, 2 | 1, 2, 3, 4, 5 | 1, 2, 3, 4, 5 |
| B | 1, 2, 3, 4, 5 | 1, 2, 3, 4, 5 | 1, 2, 3, 4, 5 |
| C | 1, 2, 3, 4, 5 | 1, 2, 3, 4, 5 | 1, 2, 3, 4, 5 |
| D | 1, 2, 3, 4, 5 | 1, 2, 3, 4, 5 | 1, 2, 3, 4, 5 |
| E | 1, 2, 3, 4, 5 | 1, 2, 3, 4, 5 | 1, 2, 3, 4, 5 |

The oxygenate contributes to octane quality, and even at only 5% v/v ethanol, a reasonable proportion of the different fuel categories can be blended.

The use of 10% v/v ethanol results in an oxygen content that is above the 2.7% w/w limit set in the Worldwide Fuel Charter. However, 10% v/v ethanol is allowed where permitted by existing market regulations and has therefore been assumed generically allowable for all the categories listed in Table 5b.

The Worldwide Fuel Charter makes no allowance for unleaded gasoline with 20% v/v ethanol (6.9% w/w oxygen), although in Table 5c permissibility is assumed for each fuel category, whilst not changing any of the other property requirements.

It can be seen from Tables 5a to 5c that the progressive introduction of more ethanol increases the number of types of fuel which can be formulated. The presence of the oxygenate can have an added advantage in that it reduces the amount of the more highly processed $C_5/C_6$ bio-isomerate needed to meet fuel specifications, the effect increasing as ethanol content is raised.

The detailed results of this exercise are given in Tables 6a to 6j at the end of this example, for unleaded gasoline categories 1, 2, 3, 4 and 5 and separately for each ethanol concentration (E5=5% v/v ethanol; E10=10% v/v ethanol; E20=20% v/v ethanol). The tables show the percentages (by volume) of each component that can be blended together to yield fuels meeting each of the 75 specifications. The term "n.b." means that it is not possible, using the relevant components, to formulate a blend having the necessary overall properties. Tables 6a to 6j also quote calculated octane values and other relevant properties for each of the blends.

It should be noted that the 98 RON fuels do not meet the MON requirement, which is set within the Worldwide Fuel Charter at 88 MON. However, it is known that modern spark ignition engines fitted with knock sensor technology are able to realise a performance advantage from fuels with high RON and high octane sensitivity (RON minus MON). Lower MON value fuels can therefore offer a power and acceleration benefit in these types of engine, and as such the Charter's requirement of 88 MON may be regarded as conservative.

Assuming that the most commercially favourable blends will use the smallest amount of the $C_5/C_6$ bio-isomerate (which is the most processed stream), the maximum and minimum levels of each biologically-derived hydrocarbon component can be defined across the range of successful blends. The results are shown in Table 11 at the end of this example, together with those from Examples 1B and 1C.

Example 1B—Bio-Gasoline With N-Butanol

Biologically-derived n-butanol was introduced into the calculations at concentrations of 5, 10 and 20% v/v. The results are summarised in Tables 7a to 7c below.

TABLE 7a

| | 5% v/v n-butanol | | |
|---|---|---|---|
| Volatility Class | 98 RON | 95 RON | 91 RON |
| A | — | 1, 2 | 1, 2, 3, 4, 5 |
| B | — | 1, 2 | 1, 2, 3, 4, 5 |
| C | — | 1, 2 | 1, 2, 3, 4, 5 |
| D | — | 1, 2, 3, 4, 5 | 1, 2, 3, 4, 5 |
| E | — | 1, 2, 3, 4, 5 | 1, 2, 3, 4, 5 |

TABLE 7b

| | 10% v/v n-butanol | | |
|---|---|---|---|
| Volatility Class | 98 RON | 95 RON | 91 RON |
| A | — | 1, 2 | 1, 2, 3, 4, 5 |
| B | — | 1, 2, 3, 4, 5 | 1, 2, 3, 4, 5 |
| C | — | 1, 2, 3, 4, 5 | 1, 2, 3, 4, 5 |
| D | — | 1, 2, 3, 4, 5 | 1, 2, 3, 4, 5 |
| E | — | 1, 2, 3, 4, 5 | 1, 2, 3, 4, 5 |

TABLE 7c

| | 20% v/v n-butanol | | |
|---|---|---|---|
| Volatility Class | 98 RON | 95 RON | 91 RON |
| A | — | 1, 2 | 1, 2, 3, 4, 5 |
| B | — | 1, 2, 3, 4, 5 | 1, 2, 3, 4, 5 |
| C | — | 1, 2, 3, 4, 5 | 1, 2, 3, 4, 5 |
| D | — | 1, 2, 3, 4, 5 | 1, 2, 3, 4, 5 |
| E | — | 1, 2, 3, 4, 5 | 1, 2, 3, 4, 5 |

The production of bio-butanol by fermentation has focused on two isomers: n-butanol and iso-butanol. The primary straight chain alcohol has lower octane than ethanol but more attractive volatility characteristics (RVP, E70 and E100). The lower octane of n-butanol is reflected in the inability to blend any of the 98 RON fuels. However, the majority of the 95 RON and all of the 91 RON fuels can be blended.

The detailed results of this exercise are given in Tables 8a to 8j at the end of this example. These tables are set out in the same format as Tables 6a to 6j, separately for each n-butanol concentration (nB5=5% v/v n-butanol; nB10=10% v/v n-butanol; nB20=20% v/v n-butanol). The loss of octane quality (relative to ethanol) is reflected in an increased requirement for the $C_5/C_6$ bio-isomerate in order to blend the range of unleaded gasolines defined within the Worldwide Fuel Charter.

Example 1C—Bio-Gasoline With Iso-Butanol

Biologically-derived iso-butanol was introduced into the calculations at concentrations of 5, 10 and 20% v/v. The results are summarised in Tables 9a to 9c below.

TABLE 9a

| | 5% v/v Iso-butanol | | |
|---|---|---|---|
| Volatility Class | 98 RON | 95 RON | 91 RON |
| A | — | 1, 2 | 1, 2, 3, 4, 5 |
| B | — | 1, 2, 3, 4, 5 | 1, 2, 3, 4, 5 |
| C | — | 1, 2, 3, 4, 5 | 1, 2, 3, 4, 5 |
| D | — | 1, 2, 3, 4, 5 | 1, 2, 3, 4, 5 |
| E | — | 1, 2, 3, 4, 5 | 1, 2, 3, 4, 5 |

TABLE 9b

| | 10% v/v Iso-butanol | | |
|---|---|---|---|
| Volatility Class | 98 RON | 95 RON | 91 RON |
| A | 1 | 1, 2, 3, 4, 5 | 1, 2, 3, 4, 5 |
| B | 1 | 1, 2, 3, 4, 5 | 1, 2, 3, 4, 5 |
| C | 1 | 1, 2, 3, 4, 5 | 1, 2, 3, 4, 5 |
| D | 1, 2 | 1, 2, 3, 4, 5 | 1, 2, 3, 4, 5 |
| E | 1, 2 | 1, 2, 3, 4, 5 | 1, 2, 3, 4, 5 |

TABLE 9c

| | 20% v/v Iso-butanol | | |
|---|---|---|---|
| Volatility Class | 98 RON | 95 RON | 91 RON |
| A | 1, 2 | 1, 2, 3, 4, 5 | 1, 2, 3, 4, 5 |
| B | 1, 2, 3, 4, 5 | 1, 2, 3, 4, 5 | 1, 2, 3, 4, 5 |
| C | 1, 2, 3, 4, 5 | 1, 2, 3, 4, 5 | 1, 2, 3, 4, 5 |
| D | 1, 2, 3, 4, 5 | 1, 2, 3, 4, 5 | 1, 2, 3, 4, 5 |
| E | 1, 2, 3, 4, 5 | 1, 2, 3, 4, 5 | 1, 2, 3, 4, 5 |

The use of iso-butanol as the oxygenate restores some of the loss of octane quality that is experienced with n-butanol, although at 5% v/v it is still not possible to blend 98 RON fuels. This constraint is progressively alleviated by increasing the blend ratio of the iso-butanol and at 20% v/v almost all classes of fuel can be blended. The $C_5/C_6$ bio-isomerate has to be used at similar levels as those employed when blending with n-butanol.

The detailed results of this exercise are given in Tables 10a to 10i at the end of this example. These tables are set out in the same format as Tables 6a to 6j, separately for each iso-butanol concentration (iB5=5% v/v iso-butanol; iB10=10% v/v iso-butanol; iB20=20% v/v iso-butanol).

Example 1—Summary & Conclusions

The above demonstrates that it is possible to formulate a range of different unleaded gasolines, with a range of desired properties, using only biologically-derived fuel components, in particular those derived, either directly or indirectly, from a biomass reformation process.

Importantly, within-specification fuels be formulated by blending an alcohol with two or more of four hydrocarbon components, all of which can be obtained as individual processing streams from the same biologically-derived starting material. It has been shown possible to formulate such fuels with several different alcohol types and concentrations. The alcohols can themselves be biologically-derived, thus allowing the preparation of 100% biologically-derived fuels which nevertheless still meet current gasoline specifications and can be used without engine or supply chain modification.

Collating the results of the above three blending exercises yields maximum and minimum concentrations at which each of the four hydrocarbon components may be blended in order to yield fuels within at least one of the relevant categories. These concentrations are shown in Table 11 at the end of this example.

Table 12 below shows, for fuels containing different types and concentrations of oxygenate, the percentage of the 75 possible fuel specifications which can be met using only the four biologically-derived hydrocarbon components.

TABLE 12

| Oxygenate | 5% v/v | 10% v/v | 20% v/v |
|---|---|---|---|
| Ethanol | 63 | 64 | 96 |
| n-butanol | 55 | 63 | 63 |
| Iso-butanol | 63 | 76 | 96 |

Table 12 shows that, due to constraints on octane ratings, a higher alcohol concentration widens the range of fuels that can be successfully formulated. n-butanol provides less versatility than ethanol and iso-butanol, with iso-butanol proving the most versatile at an alcohol concentration of 10% v/v.

When ethanol is used at 20% v/v, virtually all of the five fuel categories and volatility classes can be blended, across the three octane grades. Ethanol also allows the use of lower concentrations of the $C_5/C_6$ bio-isomerate, which is the component requiring the most intensive level of processing and thus typically the most expensive.

Butanol has a lower octane quality than ethanol. This is most acutely observed for the n-isomer and is reflected in an inability to blend any of the 98 RON fuels, even at 20% v/v oxygenate. At 10% v/v there is however parity between n-butanol and ethanol in terms of the number of fuels that can be blended across the three octane grades. More specifically, n-butanol provides more versatility than ethanol for 95 RON fuels.

The branched isomer, iso-butanol, offers a blend advantage over n-butanol. Like ethanol, it allows blending of nearly all the 75 fuels when used at 20% v/v. At 10% v/v it is not possible to blend 98 RON fuels with iso-butanol, but the oxygenate nevertheless has excellent utility for blending 95 RON and 91 RON fuels.

The above examples demonstrate that the present invention makes it possible to formulate 100% biologically-derived gasoline fuels using only biomass-derived hydrocarbons and oxygenates. The resultant formulations can be tailored to meet the requirements of existing fuel specifications, vehicles and distribution infrastructures.

TABLE 1a

Bio-reformate Composition

| C no. | n-Paraffins | iso-Paraffins | n-Olefins | iso-Olefins | Cylic Olefins | Dienes | Naphthenes | Aromatics | Unknowns |
|---|---|---|---|---|---|---|---|---|---|
| 3 | 0.00 | 0.00 | 0.00 | 0.00 | 0.00 | 0.00 | 0.00 | 0.00 | 0.00 |
| 4 | 5.50 | 0.21 | 0.66 | 0.16 | 0.00 | 0.00 | 0.00 | 0.00 | 0.00 |
| 5 | 8.69 | 6.31 | 0.35 | 1.23 | 0.02 | 0.00 | 0.68 | 0.00 | 0.00 |
| 6 | 7.28 | 3.55 | 0.06 | 0.43 | 0.01 | 0.00 | 1.64 | 1.57 | 0.00 |
| 7 | 0.16 | 1.29 | 0.07 | 0.11 | 0.29 | 0.00 | 1.23 | 11.70 | 0.01 |
| 8 | 0.10 | 0.41 | 0.13 | 0.14 | 0.00 | 0.00 | 0.32 | 22.04 | 0.12 |
| 9 | 0.00 | 0.40 | 0.00 | 0.00 | 0.00 | 0.00 | 0.00 | 18.46 | 0.11 |
| 10 | 0.00 | 0.38 | 0.00 | 0.00 | 0.00 | 0.00 | 0.00 | 4.05 | 0.01 |
| 11 | 0.00 | 0.00 | 0.00 | 0.00 | 0.00 | 0.00 | 0.00 | 0.00 | 0.00 |
| 12 | 0.00 | 0.00 | 0.00 | 0.00 | 0.00 | 0.00 | 0.00 | 0.00 | 0.06 |
| Σ | 21.74 | 12.55 | 1.26 | 2.07 | 0.31 | 0.00 | 3.88 | 57.83 | 0.31 |

TABLE 1b

Bio-naphtha Composition

| C no. | n-Paraffins | iso-Paraffins | n-Olefins | iso-Olefins | Cylic Olefins | Dienes | Naphthenes | Aromatics | Unknowns |
|---|---|---|---|---|---|---|---|---|---|
| 3 | 0.82 | 0.00 | 0.00 | 0.00 | 0.00 | 0.00 | 0.00 | 0.00 | 0.00 |
| 4 | 4.26 | 0.12 | 0.00 | 0.00 | 0.00 | 0.00 | 0.00 | 0.00 | 0.00 |
| 5 | 14.08 | 1.33 | 0.00 | 0.00 | 0.00 | 0.00 | 0.80 | 0.00 | 0.00 |
| 6 | 39.21 | 3.95 | 0.00 | 0.00 | 0.02 | 0.00 | 8.55 | 0.00 | 0.00 |
| 7 | 4.16 | 1.89 | 0.00 | 0.09 | 0.00 | 0.00 | 1.57 | 0.00 | 0.00 |
| 8 | 3.18 | 1.64 | 0.00 | 0.03 | 0.00 | 0.00 | 3.29 | 0.00 | 0.00 |
| 9 | 2.65 | 3.50 | 0.00 | 0.00 | 0.00 | 0.00 | 0.42 | 0.00 | 0.00 |
| 10 | 0.39 | 3.53 | 0.00 | 0.00 | 0.00 | 0.00 | 0.07 | 0.00 | 0.00 |
| 11 | 0.05 | 0.41 | 0.00 | 0.00 | 0.00 | 0.00 | 0.00 | 0.00 | 0.00 |
| 12 | 0.00 | 0.00 | 0.00 | 0.00 | 0.00 | 0.00 | 0.00 | 0.00 | 0.00 |
| Σ | 68.80 | 16.35 | 0.00 | 0.12 | 0.02 | 0.00 | 14.70 | 0.00 | 0.00 |

TABLE 1c

Bio-isomerate Composition

| C no. | n-Paraffins | iso-Paraffins | n-Olefins | iso-Olefins | Cylic Olefins | Dienes | Naphthenes | Aromatics | Unknowns |
|---|---|---|---|---|---|---|---|---|---|
| 3 | 0.00 | 0.00 | 0.00 | 0.00 | 0.00 | 0.00 | 0.00 | 0.00 | 0.00 |
| 4 | 1.88 | 0.17 | 0.00 | 0.00 | 0.00 | 0.00 | 0.00 | 0.00 | 0.00 |
| 5 | 8.19 | 40.95 | 0.00 | 0.39 | 0.00 | 0.00 | 4.86 | 0.00 | 0.00 |
| 6 | 0.72 | 30.91 | 0.00 | 0.00 | 0.91 | 0.00 | 9.75 | 0.00 | 0.00 |
| 7 | 0.00 | 0.75 | 0.00 | 0.00 | 0.00 | 0.00 | 0.52 | 0.00 | 0.00 |
| 8 | 0.00 | 0.00 | 0.00 | 0.00 | 0.00 | 0.00 | 0.00 | 0.00 | 0.00 |
| 9 | 0.00 | 0.00 | 0.00 | 0.00 | 0.00 | 0.00 | 0.00 | 0.00 | 0.00 |
| 10 | 0.00 | 0.00 | 0.00 | 0.00 | 0.00 | 0.00 | 0.00 | 0.00 | 0.00 |
| 11 | 0.00 | 0.00 | 0.00 | 0.00 | 0.00 | 0.00 | 0.00 | 0.00 | 0.00 |
| 12 | 0.00 | 0.00 | 0.00 | 0.00 | 0.00 | 0.00 | 0.00 | 0.00 | 0.00 |
| Σ | 10.79 | 72.78 | 0.00 | 0.39 | 0.91 | 0.00 | 15.13 | 0.00 | 0.00 |

TABLE 2

| Blending property | Units | $C_4$ Bio-butanes | $C_{5-9}$ Bio-Naphtha | $C_{5/6}$ Bio-Isomerate | $C_{5-10}$ Bio-Reformate | Ethanol (at 5%) | Ethanol (at 10%) | Ethanol (at 20%) | n-Butanol | iso-Butanol |
|---|---|---|---|---|---|---|---|---|---|---|
| RON | — | 98 | 49 | 87 | 99 | 108 | 108 | 108 | 99 | 106 |
| MON | — | 89 | 49 | 84 | 87 | 90 | 90 | 90 | 85 | 91 |
| RVP | kPa | 370 | 45 | 96 | 35 | 170 | 120 | 120 | 39 | 17 |
| Oxygen | % w/w | 0 | 0 | 0 | 0 | 35 | 35 | 35 | 22 | 22 |
| Aromatics | % v/v | 0 | 0 | 0 | 62 | 0 | 0 | 0 | 0 | 0 |
| Olefins | % v/v | 18 | 0 | 0 | 3 | 0 | 0 | 0 | 0 | 0 |
| Density | kg/m³ | 573 | 679 | 660 | 785 | 794 | 794 | 794 | 810 | 803 |
| Hartenhof E70 | % v/v | 100 | 39 | 85 | 6 | 270 | 235 | 139 | −8 | 16 |
| E100 | % v/v | 100 | 75 | 104 | 27 | 209 | 110 | 146 | 93 | 133 |
| E120 | % v/v | 103 | 88 | 105 | 46 | 198 | 100 | 118 | 124 | 122 |
| E150 | % v/v | 100 | 93 | 100 | 76 | 150 | 100 | 108 | 96 | 97 |
| E180 | % v/v | 100 | 96 | 100 | 97 | 105 | 100 | 101 | 112 | 100 |

TABLE 3

| Property | | Fuel category | | | | |
|---|---|---|---|---|---|---|
| | | 1 | 2 | 3 | 4 | 5 |
| 91 RON | RON | 91.0 | 91.0 | 91.0 | 91.0 | 91.0 |
| | MON | 82.0 | 82.5 | 82.5 | 82.5 | 82.5 |
| 95 RON | RON | 95.0 | 95.0 | 95.0 | 95.0 | 95.0 |
| | MON | 85.0 | 85.0 | 85.0 | 85.0 | 85.0 |
| 98 RON | RON | 98.0 | 98.0 | 98.0 | 98.0 | 98.0 |
| | MON | 88.0 | 88.0 | 88.0 | 88.0 | 88.0 |
| Oxygen (% w/w) | | 2.7 | 2.7 | 2.7 | 2.7 | 2.7 |
| Olefins (% v/v) | | — | 18.0 | 10.0 | 10.0 | 10.0 |
| Aromatics (% v/v) | | 50.0 | 40.0 | 35.0 | 35.0 | 35.0 |
| Benzene (% v/v) | | 5.0 | 2.5 | 1.0 | 1.0 | 1.0 |
| Density (kg/m³) | | 715-780 | 715-770 | 715-770 | 715-770 | 720-775 |

TABLE 4

| Property | Class (for all categories) | | | | |
|---|---|---|---|---|---|
| | A | B | C | D | E |
| RVP (kPa) | 45-60 | 55-70 | 65-80 | 75-90 | 85-105 |
| E70 (% v/v) | 20-45 | 20-45 | 25-47 | 25-50 | 25-50 |
| E100 (% v/v) | 50-65 | 50-65 | 50-65 | 55-70 | 55-70 |

TABLE 6a

E5 Gasoline; Category 1

| Components | Volatility classes w/ RON98 | | | | | Volatility classes w/ RON 95 | | | | |
|---|---|---|---|---|---|---|---|---|---|---|
| | A | B | C | D | E | A | B | C | D | E |
| $C_4$ Bio-Butanes | 1% | 4% | 7% | 9% | 13% | 2% | 5% | 8% | 9% | 14% |
| $C_{5/6}$ Bio-Isomerate | 16% | 13% | 10% | 16% | 10% | 9% | 6% | 3% | 8% | 3% |
| $C_{5-10}$ Bio-Naphtha | 1% | 2% | 3% | 1% | 3% | 11% | 12% | 13% | 12% | 13% |
| $C_{5-10}$ Bio-Reformate | 76% | 76% | 75% | 69% | 69% | 73% | 72% | 72% | 65% | 65% |
| Ethanol | 5% | 5% | 5% | 5% | 5% | 5% | 5% | 5% | 5% | 5% |
| RON | 98.0 | 98.0 | 98.0 | 98.0 | 98.0 | 95.2 | 95.2 | 95.2 | 95.0 | 95.1 |
| MON | 86.4 | 86.4 | 86.4 | 86.5 | 86.5 | 85.1 | 85.1 | 85.0 | 85.0 | 85.0 |
| Aromatics (% v) | 47 | 47 | 47 | 43 | 43 | 45 | 45 | 44 | 41 | 40 |
| Olefins (% v) | 2 | 3 | 3 | 4 | 4 | 2 | 3 | 3 | 4 | 4 |
| RVP (kPa) | 60 | 70 | 80 | 90 | 105 | 60 | 70 | 80 | 90 | 105 |
| E70 (% v) | 34 | 34 | 34 | 40 | 41 | 32 | 32 | 33 | 38 | 39 |
| E100 (% v) | 50 | 50 | 50 | 55 | 55 | 50 | 50 | 50 | 55 | 55 |
| E150 (% v) | 84 | 84 | 84 | 86 | 86 | 84 | 84 | 84 | 86 | 86 |
| Density (kg/m$^3$) | 761 | 758 | 755 | 746 | 742 | 758 | 755 | 752 | 743 | 738 |
| Benzene (% v) | 1.20 | 1.19 | 1.18 | 1.09 | 1.08 | 1.14 | 1.13 | 1.12 | 1.03 | 1.02 |

| Components | Volatility classes w/ RON91 | | | | |
|---|---|---|---|---|---|
| | A | B | C | D | E |
| $C_4$ Bio-Butanes | 3% | 5% | 8% | 10% | 14% |
| $C_{5/6}$ Bio-Isomerate | 0% | 0% | 0% | 0% | 0% |
| $C_{5-10}$ Bio-Naphtha | 25% | 25% | 25% | 25% | 25% |
| $C_{5-10}$ Bio-Reformate | 67% | 65% | 62% | 60% | 56% |
| Ethanol | 5% | 5% | 5% | 5% | 5% |
| RON | 91.0 | 91.0 | 91.0 | 91.0 | 91.0 |
| MON | 83.0 | 83.0 | 82.9 | 82.9 | 82.9 |
| Aromatics (% v) | 42 | 40 | 39 | 37 | 35 |
| Olefins (% v) | 2 | 3 | 3 | 4 | 4 |
| RVP (kPa) | 60 | 70 | 80 | 90 | 105 |
| E70 (% v) | 30 | 32 | 35 | 37 | 41 |
| E100 (% v) | 50 | 52 | 54 | 56 | 59 |
| E150 (% v) | 85 | 85 | 86 | 86 | 87 |
| Density (kg/m$^3$) | 752 | 747 | 742 | 737 | 729 |
| Benzene (% v) | 1.05 | 1.01 | 0.98 | 0.94 | 0.87 |

TABLE 6b

E5 Gasoline; Category 2

| Components | Volatility classes w/ RON98 | | | | | Volatility classes w/ RON 95 | | | | | Volatility classes w/ RON91 | | | | |
|---|---|---|---|---|---|---|---|---|---|---|---|---|---|---|---|
| | A | B | C | D | E | A | B | C | D | E | A | B | C | D | E |
| $C_4$ Bio-butanes | n.b. | n.b. | n.b. | n.b. | 12% | 0% | 3% | 6% | 9% | 14% | 2% | 5% | 8% | 10% | 14% |
| $C_{5/6}$ Bio-Isomerate | n.b. | n.b. | n.b. | n.b. | 18% | 23% | 19% | 15% | 10% | 3% | 5% | 0% | 0% | 0% | 0% |
| $C_{5-10}$ Bio-Naphtha | n.b. | n.b. | n.b. | n.b. | 1% | 7% | 9% | 10% | 11% | 14% | 24% | 25% | 25% | 25% | 25% |
| $C_{5-10}$ Bio-Reformate | n.b. | n.b. | n.b. | n.b. | 64% | 64% | 64% | 64% | 64% | 64% | 64% | 64% | 62% | 60% | 56% |
| Ethanol | n.b. | n.b. | n.b. | n.b. | 5% | 5% | 5% | 5% | 5% | 5% | 5% | 5% | 5% | 5% | 5% |
| RON | | | | | 98.0 | 95.0 | 95.0 | 95.0 | 95.0 | 95.0 | 91.0 | 91.0 | 91.0 | 91.0 | 91.0 |
| MON | | | | | 86.6 | 85.2 | 85.1 | 85.1 | 85.1 | 85.0 | 83.0 | 83.0 | 82.9 | 82.9 | 82.9 |
| Aromatics (% v) | | | | | 40 | 40 | 40 | 40 | 40 | 40 | 40 | 40 | 39 | 37 | 35 |

TABLE 6b-continued

E5 Gasoline; Category 2

| Components | Volatility classes w/ RON98 | | | | | Volatility classes w/ RON 95 | | | | | Volatility classes w/ RON91 | | | | |
|---|---|---|---|---|---|---|---|---|---|---|---|---|---|---|---|
| | A | B | C | D | E | A | B | C | D | E | A | B | C | D | E |
| Olefins (% v) | | | | | 4 | 2 | 2 | 3 | 3 | 4 | 2 | 3 | 3 | 4 | 4 |
| RVP (kPa) | | | | | 105 | 60 | 70 | 80 | 90 | 105 | 60 | 70 | 80 | 90 | 105 |
| E70 (% v) | | | | | 45 | 40 | 40 | 40 | 39 | 39 | 33 | 33 | 35 | 37 | 41 |
| E100 (% v) | | | | | 59 | 57 | 57 | 56 | 56 | 55 | 53 | 52 | 54 | 56 | 59 |
| E150 (% v) | | | | | 87 | 87 | 86 | 86 | 86 | 86 | 85 | 85 | 86 | 86 | 87 |
| Density (kg/m$^3$) | | | | | 737 | 748 | 746 | 744 | 741 | 738 | 749 | 747 | 742 | 737 | 729 |
| Benzene (% v) | | | | | 1.01 | 1.01 | 1.01 | 1.01 | 1.01 | 1.01 | 1.01 | 1.01 | 0.98 | 0.94 | 0.87 |

TABLE 6c

E5 Gasoline; Categories 3-4

| Components | Volatility classes w/ RON98 | | | | | Volatility classes w/ RON 95 | | | | | Volatility classes w/ RON91 | | | | |
|---|---|---|---|---|---|---|---|---|---|---|---|---|---|---|---|
| | A | B | C | D | E | A | B | C | D | E | A | B | C | D | E |
| $C_4$ Bio-butanes | n.b. | n.b. | n.b. | n.b. | n.b. | n.b. | n.b. | n.b. | 7% | 12% | 1% | 3% | 6% | 9% | 14% |
| $C_{5/6}$ Bio-Isomerate | n.b. | n.b. | n.b. | n.b. | n.b. | n.b. | n.b. | n.b. | 25% | 18% | 19% | 15% | 10% | 6% | 0% |
| $C_{5-10}$ Bio-Naphtha | n.b. | n.b. | n.b. | n.b. | n.b. | n.b. | n.b. | n.b. | 7% | 9% | 19% | 20% | 22% | 23% | 25% |
| $C_{5-10}$ Bio-Reformate | n.b. | n.b. | n.b. | n.b. | n.b. | n.b. | n.b. | n.b. | 56% | 56% | 56% | 56% | 56% | 56% | 56% |
| Ethanol | n.b. | n.b. | n.b. | n.b. | n.b. | n.b. | n.b. | n.b. | 5% | 5% | 5% | 5% | 5% | 5% | 5% |
| RON | | | | | | | | | 95.0 | 95.0 | 91.0 | 91.0 | 91.0 | 91.0 | 91.0 |
| MON | | | | | | | | | 85.3 | 85.2 | 83.2 | 83.1 | 83.0 | 83.0 | 82.9 |
| Aromatics (% v) | | | | | | | | | 35 | 35 | 35 | 35 | 35 | 35 | 35 |
| Olefins (% v) | | | | | | | | | 3 | 4 | 2 | 2 | 3 | 3 | 4 |
| RVP (kPa) | | | | | | | | | 90 | 105 | 60 | 70 | 80 | 90 | 105 |
| E70 (% v) | | | | | | | | | 48 | 47 | 41 | 41 | 40 | 40 | 41 |
| E100 (% v) | | | | | | | | | 63 | 63 | 60 | 60 | 59 | 59 | 59 |
| E150 (% v) | | | | | | | | | 89 | 88 | 88 | 88 | 87 | 87 | 87 |
| Density (kg/m$^3$) | | | | | | | | | 732 | 728 | 740 | 738 | 736 | 733 | 729 |
| Benzene (% v) | | | | | | | | | 0.89 | 0.89 | 0.89 | 0.89 | 0.89 | 0.89 | 0.87 |

TABLE 6d

E5 Gasoline; Category 5

| Components | Volatility classes w/ RON98 | | | | | Volatility classes w/ RON 95 | | | | | Volatility classes w/ RON91 | | | | |
|---|---|---|---|---|---|---|---|---|---|---|---|---|---|---|---|
| | A | B | C | D | E | A | B | C | D | E | A | B | C | D | E |
| $C_4$ Bio-Butanes | n.b. | n.b. | n.b. | n.b. | n.b. | n.b. | n.b. | n.b. | 7% | 12% | 1% | 3% | 6% | 9% | 14% |
| $C_{5/6}$ Bio-Isomerate | n.b. | n.b. | n.b. | n.b. | n.b. | n.b. | n.b. | n.b. | 25% | 18% | 19% | 15% | 10% | 6% | 0% |
| $C_{5-10}$ Bio-Naphtha | n.b. | n.b. | n.b. | n.b. | n.b. | n.b. | n.b. | n.b. | 7% | 9% | 19% | 20% | 22% | 23% | 25% |
| $C_{5-10}$ Bio-Reformate | n.b. | n.b. | n.b. | n.b. | n.b. | n.b. | n.b. | n.b. | 56% | 56% | 56% | 56% | 56% | 56% | 56% |
| Ethanol | n.b. | n.b. | n.b. | n.b. | n.b. | n.b. | n.b. | n.b. | 5% | 5% | 5% | 5% | 5% | 5% | 5% |
| RON | | | | | | | | | 95.0 | 95.0 | 91.0 | 91.0 | 91.0 | 91.0 | 91.0 |
| MON | | | | | | | | | 85.3 | 85.2 | 83.2 | 83.1 | 83.0 | 83.0 | 82.9 |
| Aromatics (% v) | | | | | | | | | 35 | 35 | 35 | 35 | 35 | 35 | 35 |
| Olefins (% v) | | | | | | | | | 3 | 4 | 2 | 2 | 3 | 3 | 4 |
| RVP (kPa) | | | | | | | | | 90 | 105 | 60 | 70 | 80 | 90 | 105 |
| E70 (% v) | | | | | | | | | 48 | 47 | 41 | 41 | 40 | 40 | 41 |
| E100 (% v) | | | | | | | | | 63 | 63 | 60 | 60 | 59 | 59 | 59 |
| E150 (% v) | | | | | | | | | 89 | 88 | 88 | 88 | 87 | 87 | 87 |
| Density (kg/m$^3$) | | | | | | | | | 732 | 728 | 740 | 738 | 736 | 733 | 729 |
| Benzene (% v) | | | | | | | | | 0.89 | 0.89 | 0.89 | 0.89 | 0.89 | 0.89 | 0.87 |

TABLE 6e

E10 Gasoline; Category 1

| Components | Volatility classes w/ RON98 | | | | | Volatility classes w/ RON 95 | | | | |
|---|---|---|---|---|---|---|---|---|---|---|
| | A | B | C | D | E | A | B | C | D | E |
| $C_4$ Bio-butanes | 1% | 4% | 7% | 8% | 13% | 2% | 5% | 7% | 10% | 14% |
| $C_{5/6}$ Bio-Isomerate | 15% | 11% | 8% | 14% | 8% | 8% | 4% | 2% | 0% | 0% |
| $C_{5-10}$ Bio-Naphtha | 6% | 7% | 8% | 6% | 7% | 15% | 17% | 17% | 17% | 18% |
| $C_{5-10}$ Bio-Reformate | 69% | 68% | 68% | 62% | 61% | 65% | 64% | 64% | 63% | 58% |
| Ethanol | 10% | 10% | 10% | 10% | 10% | 10% | 10% | 10% | 10% | 10% |
| RON | 98.0 | 98.0 | 98.0 | 98.0 | 98.0 | 95.5 | 95.3 | 95.6 | 95.5 | 95.4 |
| MON | 86.2 | 86.2 | 86.2 | 86.4 | 86.4 | 85.0 | 84.9 | 85.0 | 85.0 | 85.0 |
| Aromatics (% v) | 43 | 42 | 42 | 38 | 38 | 40 | 40 | 40 | 39 | 36 |
| Olefins (% v) | 2 | 3 | 3 | 3 | 4 | 2 | 3 | 3 | 4 | 4 |
| RVP (kPa) | 60 | 70 | 80 | 90 | 105 | 60 | 70 | 80 | 90 | 105 |
| E70 (% v) | 43 | 44 | 44 | 50 | 50 | 42 | 42 | 43 | 44 | 48 |
| E100 (% v) | 50 | 50 | 50 | 55 | 55 | 50 | 50 | 50 | 51 | 54 |
| E150 (% v) | 83 | 83 | 83 | 85 | 85 | 83 | 83 | 83 | 84 | 85 |
| Density (kg/m$^3$) | 759 | 756 | 754 | 744 | 740 | 756 | 753 | 750 | 746 | 738 |
| Benzene (% v) | 1.08 | 1.07 | 1.06 | 0.97 | 0.96 | 1.02 | 1.01 | 1.01 | 0.98 | 0.92 |

| Components | Volatility classes w/ RON91 | | | | |
|---|---|---|---|---|---|
| | A | B | C | D | E |
| $C_4$ Bio-butanes | 3% | 5% | 7% | 10% | 12% |
| $C_{5/6}$ Bio-Isomerate | 0% | 0% | 0% | 0% | 0% |
| $C_{5-10}$ Bio-Naphtha | 30% | 30% | 30% | 30% | 30% |
| $C_{5-10}$ Bio-Reformate | 57% | 55% | 53% | 50% | 48% |
| Ethanol | 10% | 10% | 10% | 10% | 10% |
| RON | 91.0 | 91.0 | 91.0 | 91.0 | 91.0 |
| MON | 82.8 | 82.8 | 82.8 | 82.8 | 82.8 |
| Aromatics (% v) | 36 | 34 | 33 | 31 | 30 |
| Olefins (% v) | 2 | 2 | 3 | 3 | 4 |
| RVP (kPa) | 60 | 70 | 80 | 90 | 98 |
| E70 (% v) | 41 | 43 | 46 | 48 | 50 |
| E100 (% v) | 52 | 53 | 55 | 57 | 59 |
| E150 (% v) | 84 | 85 | 85 | 86 | 86 |
| Density (kg/m$^3$) | 748 | 743 | 738 | 733 | 728 |
| Benzene (% v) | 0.90 | 0.86 | 0.82 | 0.79 | 0.75 |

TABLE 6f

E10 Gasoline; Category 2

| Components | Volatility classes w/ RON98 | | | | | Volatility classes w/ RON 95 | | | | | Volatility classes w/ RON91 | | | | |
|---|---|---|---|---|---|---|---|---|---|---|---|---|---|---|---|
| | A | B | C | D | E | A | B | C | D | E | A | B | C | D | E |
| $C_4$ Bio-butanes | n.b. | n.b. | n.b. | 8% | 13% | 2% | 5% | 7% | 10% | 14% | 3% | 5% | 7% | 10% | 12% |
| $C_{5/6}$ Bio-Isomerate | n.b. | n.b. | n.b. | 14% | 8% | 9% | 4% | 2% | 0% | 0% | 0% | 0% | 0% | 0% | 0% |
| $C_{5-10}$ Bio-Naphtha | n.b. | n.b. | n.b. | 6% | 7% | 15% | 17% | 17% | 17% | 18% | 30% | 30% | 30% | 30% | 30% |
| $C_{5-10}$ Bio-Reformate | n.b. | n.b. | n.b. | 62% | 61% | 64% | 64% | 64% | 63% | 58% | 57% | 55% | 53% | 50% | 48% |
| Ethanol | n.b. | n.b. | n.b. | 10% | 10% | 10% | 10% | 10% | 10% | 10% | 10% | 10% | 10% | 10% | 10% |
| RON | | | | 98.0 | 98.0 | 95.5 | 95.3 | 95.6 | 95.5 | 95.4 | 91.0 | 91.0 | 91.0 | 91.0 | 91.0 |
| MON | | | | 86.4 | 86.4 | 85.0 | 84.9 | 85.0 | 85.0 | 85.0 | 82.8 | 82.8 | 82.8 | 82.8 | 82.8 |
| Aromatics (% v) | | | | 38 | 38 | 40 | 40 | 40 | 39 | 36 | 36 | 34 | 33 | 31 | 30 |
| Olefins (% v) | | | | 3 | 4 | 2 | 3 | 3 | 4 | 4 | 2 | 2 | 3 | 3 | 4 |
| RVP (kPa) | | | | 90 | 105 | 60 | 70 | 80 | 90 | 105 | 60 | 70 | 80 | 90 | 98 |
| E70 (% v) | | | | 50 | 50 | 43 | 42 | 43 | 44 | 48 | 41 | 43 | 46 | 48 | 50 |
| E100 (% v) | | | | 55 | 55 | 51 | 50 | 50 | 51 | 54 | 52 | 53 | 55 | 57 | 59 |
| E150 (% v) | | | | 85 | 85 | 84 | 83 | 83 | 84 | 85 | 84 | 85 | 85 | 86 | 86 |
| Density (kg/m$^3$) | | | | 744 | 740 | 755 | 753 | 750 | 746 | 738 | 748 | 743 | 738 | 733 | 728 |
| Benzene (% v) | | | | 0.97 | 0.96 | 1.01 | 1.01 | 1.01 | 0.98 | 0.92 | 0.90 | 0.86 | 0.82 | 0.79 | 0.75 |

TABLE 6g

E10 Gasoline; Categories 3-5

| Components | Volatility classes w/ RON98 | | | | | Volatility classes w/ RON 95 | | | | | Volatility classes w/ RON91 | | | | |
|---|---|---|---|---|---|---|---|---|---|---|---|---|---|---|---|
| | A | B | C | D | E | A | B | C | D | E | A | B | C | D | E |
| $C_4$ Bio-Butanes | n.b. | n.b. | n.b. | n.b. | n.b. | n.b. | n.b. | n.b. | 9% | 13% | 2% | 5% | 7% | 10% | 12% |
| $C_{5/6}$ Bio-Isomerate | n.b. | n.b. | n.b. | n.b. | n.b. | n.b. | n.b. | n.b. | 9% | 3% | 2% | 0% | 0% | 0% | 0% |
| $C_{5-10}$ Bio-Naphtha | n.b. | n.b. | n.b. | n.b. | n.b. | n.b. | n.b. | n.b. | 16% | 17% | 30% | 30% | 30% | 30% | 30% |
| $C_{5-10}$ Bio-Reformate | n.b. | n.b. | n.b. | n.b. | n.b. | n.b. | n.b. | n.b. | 56% | 56% | 56% | 55% | 53% | 50% | 48% |
| Ethanol | n.b. | n.b. | n.b. | n.b. | n.b. | n.b. | n.b. | n.b. | 10% | 10% | 10% | 10% | 10% | 10% | 10% |
| RON | | | | | | | | | 95.1 | 95.3 | 91.0 | 91.0 | 91.0 | 91.0 | 91.0 |
| MON | | | | | | | | | 85.0 | 85.1 | 82.8 | 82.8 | 82.8 | 82.8 | 82.8 |
| Aromatics (% v) | | | | | | | | | 35 | 35 | 35 | 34 | 33 | 31 | 30 |
| Olefins (% v) | | | | | | | | | 3 | 4 | 2 | 2 | 3 | 3 | 4 |
| RVP (kPa) | | | | | | | | | 90 | 105 | 60 | 70 | 80 | 90 | 98 |
| E70 (% v) | | | | | | | | | 49 | 50 | 42 | 43 | 46 | 48 | 50 |
| E100 (% v) | | | | | | | | | 56 | 56 | 53 | 53 | 55 | 57 | 59 |
| E150 (% v) | | | | | | | | | 85 | 85 | 84 | 85 | 85 | 86 | 86 |
| Density (kg/m$^3$) | | | | | | | | | 739 | 735 | 747 | 743 | 738 | 733 | 728 |
| Benzene (% v) | | | | | | | | | 0.89 | 0.89 | 0.89 | 0.86 | 0.82 | 0.79 | 0.75 |

TABLE 6h

E20 Gasoline; Category 1

| Components | Volatility classes w/ RON98 | | | | | Volatility classes w/ RON 95 | | | | |
|---|---|---|---|---|---|---|---|---|---|---|
| | A | B | C | D | E | A | B | C | D | E |
| $C_4$ Bio-butanes | 1% | 3% | 6% | 8% | 12% | 1% | 3% | 5% | 8% | 12% |
| $C_{5/6}$ Bio-Isomerate | 0% | 0% | 0% | 0% | 0% | 0% | 0% | 0% | 0% | 0% |
| $C_{5-10}$ Bio-Naphtha | 17% | 17% | 17% | 17% | 17% | 23% | 24% | 25% | 26% | 20% |
| $C_{5-10}$ Bio-Reformate | 62% | 60% | 57% | 55% | 51% | 56% | 53% | 50% | 47% | 48% |
| Ethanol | 20% | 20% | 20% | 20% | 20% | 20% | 20% | 20% | 20% | 20% |
| RON | 98.0 | 98.0 | 98.0 | 98.0 | 98.0 | 96.2 | 95.9 | 95.7 | 95.4 | 97.0 |
| MON | 85.7 | 85.8 | 85.9 | 86.0 | 86.2 | 85.0 | 85.0 | 85.0 | 85.0 | 85.8 |
| Aromatics (% v) | 38 | 37 | 36 | 34 | 32 | 35 | 33 | 31 | 29 | 30 |
| Olefins (% v) | 2 | 2 | 3 | 3 | 4 | 2 | 2 | 2 | 3 | 3 |
| RVP (kPa) | 60 | 70 | 80 | 90 | 105 | 60 | 70 | 80 | 90 | 105 |
| E70 (% v) | 39 | 41 | 43 | 46 | 49 | 41 | 43 | 46 | 48 | 50 |
| E100 (% v) | 60 | 61 | 63 | 65 | 68 | 63 | 65 | 67 | 69 | 69 |
| E150 (% v) | 86 | 86 | 87 | 87 | 88 | 87 | 87 | 88 | 89 | 89 |
| Density (kg/m$^3$) | 766 | 762 | 757 | 751 | 743 | 760 | 755 | 749 | 743 | 740 |
| Benzene (% v) | 0.97 | 0.94 | 0.90 | 0.86 | 0.80 | 0.88 | 0.83 | 0.78 | 0.73 | 0.75 |

| Components | Volatility classes w/ RON91 | | | | |
|---|---|---|---|---|---|
| | A | B | C | D | E |
| $C_4$ Bio-butanes | 1% | 3% | 5% | 6% | 12% |
| $C_{5/6}$ Bio-Isomerate | 0% | 0% | 0% | 0% | 0% |
| $C_{5-10}$ Bio-Naphtha | 30% | 30% | 30% | 30% | 20% |
| $C_{5-10}$ Bio-Reformate | 49% | 47% | 45% | 44% | 48% |
| Ethanol | 20% | 20% | 20% | 20% | 20% |
| RON | 94.0 | 94.0 | 94.0 | 94.0 | 97.0 |
| MON | 84.2 | 84.3 | 84.3 | 84.4 | 85.8 |
| Aromatics (% v) | 31 | 29 | 28 | 27 | 30 |
| Olefins (% v) | 2 | 2 | 2 | 2 | 3 |
| RVP (kPa) | 60 | 70 | 78 | 84 | 105 |
| E70 (% v) | 43 | 45 | 47 | 48 | 50 |
| E100 (% v) | 66 | 67 | 69 | 70 | 69 |
| E150 (% v) | 88 | 88 | 89 | 89 | 89 |
| Density (kg/m$^3$) | 753 | 748 | 744 | 741 | 740 |
| Benzene (% v) | 0.77 | 0.74 | 0.71 | 0.68 | 0.75 |

TABLE 6i

E20 Gasoline; Category 2

| Components | Volatility classes w/ RON98 | | | | | Volatility classes w/ RON 95 | | | | |
|---|---|---|---|---|---|---|---|---|---|---|
| | A | B | C | D | E | A | B | C | D | E |
| C$_4$ Bio-butanes | 1% | 3% | 6% | 8% | 12% | 1% | 3% | 5% | 8% | 12% |
| C$_{5/6}$ Bio-Isomerate | 0% | 0% | 0% | 0% | 0% | 0% | 0% | 0% | 0% | 0% |
| C$_{5-10}$ Bio-Naphtha | 17% | 17% | 17% | 17% | 17% | 23% | 24% | 25% | 26% | 20% |
| C$_{5-10}$ Bio-Reformate | 62% | 60% | 57% | 55% | 51% | 56% | 53% | 50% | 47% | 48% |
| Ethanol | 20% | 20% | 20% | 20% | 20% | 20% | 20% | 20% | 20% | 20% |
| RON | 98.0 | 98.0 | 98.0 | 98.0 | 98.0 | 96.2 | 95.9 | 95.7 | 95.4 | 97.0 |
| MON | 85.7 | 85.8 | 85.9 | 86.0 | 86.2 | 85.0 | 85.0 | 85.0 | 85.0 | 85.8 |
| Aromatics (% v) | 38 | 37 | 36 | 34 | 32 | 35 | 33 | 31 | 29 | 30 |
| Olefins (% v) | 2 | 2 | 3 | 3 | 4 | 2 | 2 | 2 | 3 | 3 |
| RVP (kPa) | 60 | 70 | 80 | 90 | 105 | 60 | 70 | 80 | 90 | 105 |
| E70 (% v) | 39 | 41 | 43 | 46 | 49 | 41 | 43 | 46 | 48 | 50 |
| E100 (% v) | 60 | 61 | 63 | 65 | 68 | 63 | 65 | 67 | 69 | 69 |
| E150 (% v) | 86 | 86 | 87 | 87 | 88 | 87 | 87 | 88 | 89 | 89 |
| Density (kg/m$^3$) | 766 | 762 | 757 | 751 | 743 | 760 | 755 | 749 | 743 | 740 |
| Benzene (% v) | 0.97 | 0.94 | 0.90 | 0.86 | 0.80 | 0.88 | 0.83 | 0.78 | 0.73 | 0.75 |

| Components | Volatility classes w/ RON91 | | | | |
|---|---|---|---|---|---|
| | A | B | C | D | E |
| C$_4$ Bio-butanes | 1% | 3% | 5% | 6% | 12% |
| C$_{5/6}$ Bio-Isomerate | 0% | 0% | 0% | 0% | 0% |
| C$_{5-10}$ Bio-Naphtha | 30% | 30% | 30% | 30% | 20% |
| C$_{5-10}$ Bio-Reformate | 49% | 47% | 45% | 44% | 48% |
| Ethanol | 20% | 20% | 20% | 20% | 20% |
| RON | 94.0 | 94.0 | 94.0 | 94.0 | 97.0 |
| MON | 84.2 | 84.3 | 84.3 | 84.4 | 85.8 |
| Aromatics (% v) | 31 | 29 | 28 | 27 | 30 |
| Olefins (% v) | 2 | 2 | 2 | 2 | 3 |
| RVP (kPa) | 60 | 70 | 78 | 84 | 105 |
| E70 (% v) | 43 | 45 | 47 | 48 | 50 |
| E100 (% v) | 66 | 67 | 69 | 70 | 69 |
| E150 (% v) | 88 | 88 | 89 | 89 | 89 |
| Density (kg/m$^3$) | 753 | 748 | 744 | 741 | 740 |
| Benzene (% v) | 0.77 | 0.74 | 0.71 | 0.68 | 0.75 |

TABLE 6j

E20 Gasoline; Categories 3-5

| Components | Volatility classes w/ RON98 | | | | | Volatility classes w/ RON 95 | | | | |
|---|---|---|---|---|---|---|---|---|---|---|
| | A | B | C | D | E | A | B | C | D | E |
| C$_4$ Bio-Butanes | n.b. | 2% | 5% | 8% | 12% | 1% | 3% | 5% | 8% | 12% |
| C$_{5/6}$ Bio-Isomerate | n.b. | 6% | 2% | 0% | 0% | 0% | 0% | 0% | 0% | 0% |
| C$_{5-10}$ Bio-Naphtha | n.b. | 15% | 17% | 17% | 17% | 23% | 24% | 25% | 26% | 20% |
| C$_{5-10}$ Bio-Reformate | n.b. | 56% | 56% | 55% | 51% | 56% | 53% | 50% | 47% | 48% |
| Ethanol | n.b. | 20% | 20% | 20% | 20% | 20% | 20% | 20% | 20% | 20% |
| RON | | 98.0 | 98.0 | 98.0 | 98.0 | 96.2 | 95.9 | 95.7 | 95.4 | 97.0 |
| MON | | 86.0 | 85.9 | 86.0 | 86.2 | 85.0 | 85.0 | 85.0 | 85.0 | 85.8 |
| Aromatics (% v) | | 35 | 35 | 34 | 32 | 35 | 33 | 31 | 29 | 30 |
| Olefins (% v) | | 2 | 3 | 3 | 4 | 2 | 2 | 2 | 3 | 3 |
| RVP (kPa) | | 70 | 80 | 90 | 105 | 60 | 70 | 80 | 90 | 105 |
| E70 (% v) | | 44 | 44 | 46 | 49 | 41 | 43 | 46 | 48 | 50 |
| E100 (% v) | | 64 | 64 | 65 | 68 | 63 | 65 | 67 | 69 | 69 |
| E150 (% v) | | 87 | 87 | 87 | 88 | 87 | 87 | 88 | 89 | 89 |
| Density (kg/m$^3$) | | 758 | 756 | 751 | 743 | 760 | 755 | 749 | 743 | 740 |
| Benzene (% v) | | 0.89 | 0.89 | 0.86 | 0.80 | 0.88 | 0.83 | 0.78 | 0.73 | 0.75 |

| Components | Volatility classes w/ RON91 | | | | |
|---|---|---|---|---|---|
| | A | B | C | D | E |
| C$_4$ Bio-Butanes | 1% | 3% | 5% | 6% | 12% |
| C$_{5/6}$ Bio-Isomerate | 0% | 0% | 0% | 0% | 0% |
| C$_{5-10}$ Bio-Naphtha | 30% | 30% | 30% | 30% | 20% |
| C$_{5-10}$ Bio-Reformate | 49% | 47% | 45% | 44% | 48% |
| Ethanol | 20% | 20% | 20% | 20% | 20% |
| RON | 94.0 | 94.0 | 94.0 | 94.0 | 97.0 |

TABLE 6j-continued

| E20 Gasoline; Categories 3-5 | | | | | |
|---|---|---|---|---|---|
| MON | 84.2 | 84.3 | 84.3 | 84.4 | 85.8 |
| Aromatics (% v) | 31 | 29 | 28 | 27 | 30 |
| Olefins (% v) | 2 | 2 | 2 | 2 | 3 |
| RVP (kPa) | 60 | 70 | 78 | 84 | 105 |
| E70 (% v) | 43 | 45 | 47 | 48 | 50 |
| E100 (% v) | 66 | 67 | 69 | 70 | 69 |
| E150 (% v) | 88 | 88 | 89 | 89 | 89 |
| Density (kg/m$^3$) | 753 | 748 | 744 | 741 | 740 |
| Benzene (% v) | 0.77 | 0.74 | 0.71 | 0.68 | 0.75 |

TABLE 8a nB5 Gasoline; Category 1

| Components | Volatility classes w/ RON98 | | | | | Volatility classes w/ RON 95 | | | | | Volatility classes w/ RON91 | | | | |
|---|---|---|---|---|---|---|---|---|---|---|---|---|---|---|---|
| | A | B | C | D | E | A | B | C | D | E | A | B | C | D | E |
| $C_4$ Bio-butanes | n.b. | n.b. | n.b. | n.b. | n.b. | 2% | 5% | 6% | 8% | 13% | 3% | 6% | 9% | 10% | 15% |
| $C_{5/6}$ Bio-Isomerate | n.b. | n.b. | n.b. | n.b. | n.b. | 22% | 19% | 25% | 30% | 23% | 13% | 10% | 8% | 12% | 7% |
| $C_{5-10}$ Bio-Naphtha | n.b. | n.b. | n.b. | n.b. | n.b. | 3% | 4% | 2% | 1% | 3% | 15% | 17% | 17% | 16% | 18% |
| $C_{5-10}$ Bio-Reformate | n.b. | n.b. | n.b. | n.b. | n.b. | 68% | 68% | 62% | 56% | 56% | 63% | 63% | 62% | 56% | 55% |
| n-Butanol | n.b. | n.b. | n.b. | n.b. | n.b. | 5% | 5% | 5% | 5% | 5% | 5% | 5% | 5% | 5% | 5% |
| RON | | | | | | 95.0 | 95.0 | 95.0 | 95.0 | 95.0 | 91.0 | 91.0 | 91.0 | 91.0 | 91.0 |
| MON | | | | | | 85.1 | 85.1 | 85.2 | 85.3 | 85.2 | 83.1 | 83.0 | 83.0 | 82.9 | 82.8 |
| Aromatics (% v) | | | | | | 42 | 42 | 38 | 35 | 35 | 39 | 39 | 38 | 35 | 34 |
| Olefins (% v) | | | | | | 2 | 3 | 3 | 3 | 4 | 2 | 3 | 3 | 3 | 4 |
| RVP (kPa) | | | | | | 60 | 70 | 80 | 90 | 105 | 60 | 70 | 80 | 90 | 105 |
| E70 (% v) | | | | | | 26 | 26 | 32 | 37 | 36 | 24 | 24 | 25 | 30 | 31 |
| E100 (% v) | | | | | | 50 | 50 | 55 | 59 | 59 | 50 | 50 | 51 | 55 | 55 |
| E150 (% v) | | | | | | 83 | 83 | 85 | 86 | 86 | 84 | 84 | 84 | 85 | 85 |
| Density (kg/m$^3$) | | | | | | 751 | 748 | 739 | 731 | 727 | 747 | 744 | 740 | 732 | 727 |
| Benzene (% v) | | | | | | 1.07 | 1.06 | 0.97 | 0.89 | 0.89 | 1.00 | 0.99 | 0.97 | 0.89 | 0.87 |

TABLE 8b nB5 Gasoline; Category 2

| Components | Volatility classes w/ RON98 | | | | | Volatility classes w/ RON 95 | | | | | Volatility classes w/ RON91 | | | | |
|---|---|---|---|---|---|---|---|---|---|---|---|---|---|---|---|
| | A | B | C | D | E | A | B | C | D | E | A | B | C | D | E |
| $C_4$ Bio-butanes | n.b. | n.b. | n.b. | n.b. | n.b. | 1% | 4% | 6% | 8% | 13% | 3% | 6% | 9% | 10% | 15% |
| $C_{5/6}$ Bio-Isomerate | n.b. | n.b. | n.b. | n.b. | n.b. | 28% | 24% | 25% | 30% | 23% | 13% | 10% | 8% | 12% | 7% |
| $C_{5-10}$ Bio-Naphtha | n.b. | n.b. | n.b. | n.b. | n.b. | 1% | 2% | 2% | 1% | 3% | 15% | 17% | 17% | 16% | 18% |
| $C_{5-10}$ Bio-Reformate | n.b. | n.b. | n.b. | n.b. | n.b. | 64% | 64% | 62% | 56% | 56% | 63% | 63% | 62% | 56% | 55% |
| n-Butanol | n.b. | n.b. | n.b. | n.b. | n.b. | 5% | 5% | 5% | 5% | 5% | 5% | 5% | 5% | 5% | 5% |
| RON | | | | | | 95.0 | 95.0 | 95.0 | 95.0 | 95.0 | 91.0 | 91.0 | 91.0 | 91.0 | 91.0 |
| MON | | | | | | 85.2 | 85.2 | 85.2 | 85.3 | 85.2 | 83.1 | 83.0 | 83.0 | 82.9 | 82.8 |
| Aromatics (% v) | | | | | | 40 | 40 | 38 | 35 | 35 | 39 | 39 | 38 | 35 | 34 |
| Olefins (% v) | | | | | | 2 | 3 | 3 | 3 | 4 | 2 | 3 | 3 | 3 | 4 |
| RVP (kPa) | | | | | | 60 | 70 | 80 | 90 | 105 | 60 | 70 | 80 | 90 | 105 |
| E70 (% v) | | | | | | 29 | 29 | 32 | 37 | 36 | 24 | 24 | 25 | 30 | 31 |
| E100 (% v) | | | | | | 53 | 53 | 55 | 59 | 59 | 50 | 50 | 51 | 55 | 55 |
| E150 (% v) | | | | | | 84 | 84 | 85 | 86 | 86 | 84 | 84 | 84 | 85 | 85 |
| Density (kg/m$^3$) | | | | | | 747 | 745 | 739 | 731 | 727 | 747 | 744 | 740 | 732 | 727 |
| Benzene (% v) | | | | | | 1.01 | 1.01 | 0.97 | 0.89 | 0.89 | 1.00 | 0.99 | 0.97 | 0.89 | 0.87 |

TABLE 8c nB5 Gasoline; Categories 3-4

| Components | Volatility classes w/ RON98 | | | | | Volatility classes w/ RON 95 | | | | | Volatility classes w/ RON91 | | | | |
|---|---|---|---|---|---|---|---|---|---|---|---|---|---|---|---|
| | A | B | C | D | E | A | B | C | D | E | A | B | C | D | E |
| $C_4$ Bio-butanes | n.b. | n.b. | n.b. | n.b. | n.b. | n.b. | n.b. | n.b. | 8% | 13% | 1% | 4% | 7% | 10% | 15% |
| $C_{5/6}$ Bio-Isomerate | n.b. | n.b. | n.b. | n.b. | n.b. | n.b. | n.b. | n.b. | 30% | 23% | 26% | 21% | 17% | 12% | 7% |
| $C_{5-10}$ Bio-Naphtha | n.b. | n.b. | n.b. | n.b. | n.b. | n.b. | n.b. | n.b. | 1% | 3% | 12% | 13% | 14% | 16% | 18% |
| $C_{5-10}$ Bio-Reformate | n.b. | n.b. | n.b. | n.b. | n.b. | n.b. | n.b. | n.b. | 56% | 56% | 56% | 56% | 56% | 56% | 55% |
| n-Butanol | n.b. | n.b. | n.b. | n.b. | n.b. | n.b. | n.b. | n.b. | 5% | 5% | 5% | 5% | 5% | 5% | 5% |
| RON | | | | | | | | | 95.0 | 95.0 | 91.0 | 91.0 | 91.0 | 91.0 | 91.0 |
| MON | | | | | | | | | 85.3 | 85.2 | 83.2 | 83.1 | 83.0 | 82.9 | 82.8 |
| Aromatics (% v) | | | | | | | | | 35 | 35 | 35 | 35 | 35 | 35 | 34 |
| Olefins (% v) | | | | | | | | | 3 | 4 | 2 | 2 | 3 | 3 | 4 |
| RVP (kPa) | | | | | | | | | 90 | 105 | 60 | 70 | 80 | 90 | 105 |
| E70 (% v) | | | | | | | | | 37 | 36 | 31 | 30 | 30 | 30 | 31 |
| E100 (% v) | | | | | | | | | 59 | 59 | 57 | 56 | 55 | 55 | 55 |
| E150 (% v) | | | | | | | | | 86 | 86 | 85 | 85 | 85 | 85 | 85 |
| Density (kg/m$^3$) | | | | | | | | | 731 | 727 | 739 | 737 | 734 | 732 | 727 |
| Benzene (% v) | | | | | | | | | 0.89 | 0.89 | 0.89 | 0.89 | 0.89 | 0.89 | 0.87 |

TABLE 8d nB5 Gasoline; Category 5

| Components | Volatility classes w/ RON98 | | | | | Volatility classes w/ RON 95 | | | | | Volatility classes w/ RON91 | | | | |
|---|---|---|---|---|---|---|---|---|---|---|---|---|---|---|---|
| | A | B | C | D | E | A | B | C | D | E | A | B | C | D | E |
| $C_4$ Bio-Butanes | n.b. | n.b. | n.b. | n.b. | n.b. | n.b. | n.b. | n.b. | 8% | 13% | 1% | 4% | 7% | 10% | 15% |
| $C_{5/6}$ Bio-Isomerate | n.b. | n.b. | n.b. | n.b. | n.b. | n.b. | n.b. | n.b. | 30% | 23% | 26% | 21% | 17% | 12% | 7% |
| $C_{5-10}$ Bio-Naphtha | n.b. | n.b. | n.b. | n.b. | n.b. | n.b. | n.b. | n.b. | 1% | 3% | 12% | 13% | 14% | 16% | 18% |
| $C_{5-10}$ Bio-Reformate | n.b. | n.b. | n.b. | n.b. | n.b. | n.b. | n.b. | n.b. | 56% | 56% | 56% | 56% | 56% | 56% | 55% |
| n-Butanol | n.b. | n.b. | n.b. | n.b. | n.b. | n.b. | n.b. | n.b. | 5% | 5% | 5% | 5% | 5% | 5% | 5% |
| RON | | | | | | | | | 95.0 | 95.0 | 91.0 | 91.0 | 91.0 | 91.0 | 91.0 |
| MON | | | | | | | | | 85.3 | 85.2 | 83.2 | 83.1 | 83.0 | 82.9 | 82.8 |
| Aromatics (% v) | | | | | | | | | 35 | 35 | 35 | 35 | 35 | 35 | 34 |
| Olefins (% v) | | | | | | | | | 3 | 4 | 2 | 2 | 3 | 3 | 4 |
| RVP (kPa) | | | | | | | | | 90 | 105 | 60 | 70 | 80 | 90 | 105 |
| E70 (% v) | | | | | | | | | 37 | 36 | 31 | 30 | 30 | 30 | 31 |
| E100 (% v) | | | | | | | | | 59 | 59 | 57 | 56 | 55 | 55 | 55 |
| E150 (% v) | | | | | | | | | 86 | 86 | 85 | 85 | 85 | 85 | 85 |
| Density (kg/m$^3$) | | | | | | | | | 731 | 727 | 739 | 737 | 734 | 732 | 727 |
| Benzene (% v) | | | | | | | | | 0.89 | 0.89 | 0.89 | 0.89 | 0.89 | 0.89 | 0.87 |

TABLE 8e nB10 Gasoline; Category 1

| Components | Volatility classes w/ RON98 | | | | | Volatility classes w/ RON 95 | | | | | Volatility classes w/ RON91 | | | | |
|---|---|---|---|---|---|---|---|---|---|---|---|---|---|---|---|
| | A | B | C | D | E | A | B | C | D | E | A | B | C | D | E |
| $C_4$ Bio-butanes | n.b. | n.b. | n.b. | n.b. | n.b. | 3% | 5% | 8% | 10% | 15% | 4% | 7% | 8% | 11% | 16% |
| $C_{5/6}$ Bio-Isomerate | n.b. | n.b. | n.b. | n.b. | n.b. | 17% | 19% | 15% | 16% | 11% | 8% | 4% | 9% | 6% | 1% |
| $C_{5-10}$ Bio-Naphtha | n.b. | n.b. | n.b. | n.b. | n.b. | 4% | 3% | 4% | 3% | 5% | 17% | 18% | 17% | 18% | 19% |
| $C_{5-10}$ Bio-Reformate | n.b. | n.b. | n.b. | n.b. | n.b. | 67% | 63% | 63% | 60% | 60% | 61% | 61% | 56% | 55% | 54% |
| n-Butanol | n.b. | n.b. | n.b. | n.b. | n.b. | 10% | 10% | 10% | 10% | 10% | 10% | 10% | 10% | 10% | 10% |
| RON | | | | | | 95.4 | 95.4 | 95.5 | 95.5 | 95.6 | 91.0 | 91.0 | 91.0 | 91.0 | 91.1 |
| MON | | | | | | 85.0 | 85.0 | 85.0 | 85.1 | 85.0 | 82.8 | 82.7 | 82.7 | 82.6 | 82.5 |
| Aromatics (% v) | | | | | | 42 | 39 | 39 | 37 | 37 | 38 | 38 | 35 | 34 | 34 |
| Olefins (% v) | | | | | | 2 | 3 | 3 | 4 | 4 | 2 | 3 | 3 | 4 | 4 |
| RVP (kPa) | | | | | | 60 | 70 | 80 | 90 | 105 | 60 | 70 | 80 | 90 | 105 |
| E70 (% v) | | | | | | 21 | 25 | 25 | 28 | 29 | 20 | 20 | 25 | 26 | 26 |
| E100 (% v) | | | | | | 50 | 53 | 53 | 55 | 55 | 51 | 50 | 55 | 55 | 55 |

TABLE 8e-continued nB10 Gasoline; Category 1

| Components | Volatility classes w/ RON98 | | | | | Volatility classes w/ RON 95 | | | | | Volatility classes w/ RON91 | | | | |
|---|---|---|---|---|---|---|---|---|---|---|---|---|---|---|---|
| | A | B | C | D | E | A | B | C | D | E | A | B | C | D | E |
| E150 (% v) | | | | | | 83 | 84 | 84 | 85 | 85 | 84 | 84 | 85 | 85 | 85 |
| Density (kg/m³) | | | | | | 757 | 751 | 748 | 742 | 738 | 751 | 749 | 741 | 737 | 733 |
| Benzene (% v) | | | | | | 1.05 | 1.00 | 1.00 | 0.95 | 0.94 | 0.96 | 0.96 | 0.88 | 0.86 | 0.85 |

TABLE 8f nB10 Gasoline; Category 2

| Components | Volatility classes w/ RON98 | | | | | Volatility classes w/ RON95 | | | | | Volatility classes w/ RON91 | | | | |
|---|---|---|---|---|---|---|---|---|---|---|---|---|---|---|---|
| | A | B | C | D | E | A | B | C | D | E | A | B | C | D | E |
| $C_4$ Bio-butanes | n.b. | n.b. | n.b. | n.b. | n.b. | 2% | 5% | 8% | 10% | 15% | 4% | 7% | 8% | 11% | 16% |
| $C_{5/6}$ Bio-Isomerate | n.b. | n.b. | n.b. | n.b. | n.b. | 21% | 19% | 15% | 16% | 11% | 8% | 4% | 9% | 6% | 1% |
| $C_{5-10}$ Bio-Naphtha | n.b. | n.b. | n.b. | n.b. | n.b. | 2% | 3% | 4% | 3% | 5% | 17% | 18% | 17% | 18% | 19% |
| $C_{5-10}$ Bio-Reformate | n.b. | n.b. | n.b. | n.b. | n.b. | 64% | 63% | 63% | 60% | 60% | 61% | 61% | 56% | 55% | 54% |
| n-Butanol | n.b. | n.b. | n.b. | n.b. | n.b. | 10% | 10% | 10% | 10% | 10% | 10% | 10% | 10% | 10% | 10% |
| RON | | | | | | 95.3 | 95.4 | 95.5 | 95.5 | 95.6 | 91.0 | 91.0 | 91.0 | 91.0 | 91.1 |
| MON | | | | | | 85.0 | 85.0 | 85.0 | 85.1 | 85.0 | 82.8 | 82.7 | 82.7 | 82.6 | 82.5 |
| Aromatics (% v) | | | | | | 40 | 39 | 39 | 37 | 37 | 38 | 38 | 35 | 34 | 34 |
| Olefins (% v) | | | | | | 2 | 3 | 3 | 4 | 4 | 2 | 3 | 3 | 4 | 4 |
| RVP (kPa) | | | | | | 60 | 70 | 80 | 90 | 105 | 60 | 70 | 80 | 90 | 105 |
| E70 (% v) | | | | | | 24 | 25 | 25 | 28 | 29 | 20 | 20 | 25 | 26 | 26 |
| E100 (% v) | | | | | | 52 | 53 | 53 | 55 | 55 | 51 | 50 | 55 | 55 | 55 |
| E150 (% v) | | | | | | 84 | 84 | 84 | 85 | 85 | 84 | 84 | 85 | 85 | 85 |
| Density (kg/m³) | | | | | | 754 | 751 | 748 | 742 | 738 | 751 | 749 | 741 | 737 | 733 |
| Benzene (% v) | | | | | | 1.01 | 1.00 | 1.00 | 0.95 | 0.94 | 0.96 | 0.96 | 0.88 | 0.86 | 0.85 |

TABLE 8g nB10 Gasoline; Categories 3-5

| Components | Volatility classes w/ RON98 | | | | | Volatility classes w/ RON95 | | | | | Volatility classes w/ RON91 | | | | |
|---|---|---|---|---|---|---|---|---|---|---|---|---|---|---|---|
| | A | B | C | D | E | A | B | C | D | E | A | B | C | D | E |
| $C_4$ Bio-butanes | n.b. | n.b. | n.b. | n.b. | n.b. | n.b. | 3% | 6% | 9% | 14% | 3% | 5% | 8% | 11% | 16% |
| $C_{5/6}$ Bio-Isomerate | n.b. | n.b. | n.b. | n.b. | n.b. | n.b. | 30% | 26% | 22% | 16% | 17% | 13% | 9% | 6% | 1% |
| $C_{5-10}$ Bio-Naphtha | n.b. | n.b. | n.b. | n.b. | n.b. | n.b. | 0% | 1% | 2% | 4% | 14% | 16% | 17% | 18% | 19% |
| $C_{5-10}$ Bio-Reformate | n.b. | n.b. | n.b. | n.b. | n.b. | n.b. | 56% | 56% | 56% | 56% | 56% | 56% | 56% | 55% | 54% |
| n-Butanol | n.b. | n.b. | n.b. | n.b. | n.b. | n.b. | 10% | 10% | 10% | 10% | 10% | 10% | 10% | 10% | 10% |
| RON | | | | | | | 95.0 | 95.1 | 95.2 | 95.4 | 91.0 | 91.0 | 91.0 | 91.0 | 91.1 |
| MON | | | | | | | 85.0 | 85.0 | 85.0 | 85.0 | 82.8 | 82.7 | 82.7 | 82.6 | 82.5 |
| Aromatics (% v) | | | | | | | 35 | 35 | 35 | 35 | 35 | 35 | 35 | 34 | 34 |
| Olefins (% v) | | | | | | | 2 | 3 | 3 | 4 | 2 | 3 | 3 | 4 | 4 |
| RVP (kPa) | | | | | | | 70 | 80 | 90 | 105 | 60 | 70 | 80 | 90 | 105 |
| E70 (% v) | | | | | | | 31 | 31 | 31 | 31 | 25 | 25 | 25 | 26 | 26 |
| E100 (% v) | | | | | | | 59 | 59 | 58 | 58 | 55 | 55 | 55 | 55 | 55 |
| E150 (% v) | | | | | | | 86 | 86 | 86 | 86 | 85 | 85 | 85 | 85 | 85 |
| Density (kg/m³) | | | | | | | 743 | 740 | 738 | 734 | 746 | 744 | 741 | 737 | 733 |
| Benzene (% v) | | | | | | | 0.89 | 0.89 | 0.89 | 0.89 | 0.89 | 0.89 | 0.88 | 0.86 | 0.85 |

TABLE 8h nB20 Gasoline; Category 1

| Components | Volatility classes w/ RON98 | | | | | Volatility classes w/ RON95 | | | | | Volatility classes w/ RON91 | | | | |
|---|---|---|---|---|---|---|---|---|---|---|---|---|---|---|---|
| | A | B | C | D | E | A | B | C | D | E | A | B | C | D | E |
| $C_4$ Bio-butanes | n.b. | n.b. | n.b. | n.b. | n.b. | 3% | 5% | 7% | 10% | 15% | 3% | 6% | 8% | 11% | 16% |
| $C_{5/6}$ Bio-Isomerate | n.b. | n.b. | n.b. | n.b. | n.b. | 18% | 14% | 19% | 15% | 9% | 11% | 7% | 12% | 7% | 1% |
| $C_{5-10}$ Bio-Naphtha | n.b. | n.b. | n.b. | n.b. | n.b. | 1% | 1% | 1% | 2% | 3% | 16% | 17% | 16% | 17% | 19% |
| $C_{5-10}$ Bio-Reformate | n.b. | n.b. | n.b. | n.b. | n.b. | 59% | 59% | 54% | 54% | 54% | 50% | 50% | 45% | 45% | 44% |
| n-Butanol | n.b. | n.b. | n.b. | n.b. | n.b. | 20% | 20% | 20% | 20% | 20% | 20% | 20% | 20% | 20% | 20% |
| RON | | | | | | 96.4 | 96.5 | 96.3 | 96.4 | 96.6 | 91.0 | 91.0 | 91.0 | 91.0 | 91.2 |
| MON | | | | | | 85.0 | 85.0 | 85.0 | 85.0 | 85.0 | 82.2 | 82.1 | 82.2 | 82.1 | 82.0 |
| Aromatics (% v) | | | | | | 37 | 37 | 33 | 33 | 33 | 31 | 31 | 28 | 28 | 28 |
| Olefins (% v) | | | | | | 2 | 3 | 3 | 3 | 4 | 2 | 3 | 3 | 3 | 4 |
| RVP (kPa) | | | | | | 60 | 70 | 80 | 90 | 105 | 60 | 70 | 80 | 90 | 105 |
| E70 (% v) | | | | | | 20 | 20 | 25 | 25 | 25 | 20 | 20 | 25 | 25 | 25 |
| E100 (% v) | | | | | | 56 | 56 | 60 | 60 | 59 | 58 | 58 | 62 | 62 | 62 |
| E150 (% v) | | | | | | 85 | 85 | 86 | 86 | 86 | 86 | 86 | 87 | 87 | 87 |
| Density (kg/m$^3$) | | | | | | 761 | 759 | 751 | 748 | 744 | 753 | 750 | 742 | 739 | 735 |
| Benzene (% v) | | | | | | 0.93 | 0.93 | 0.84 | 0.84 | 0.84 | 0.79 | 0.78 | 0.70 | 0.70 | 0.70 |

TABLE 8i nB20 Gasoline; Category 2

| Components | Volatility classes w/ RON98 | | | | | Volatility classes w/ RON95 | | | | | Volatility classes w/ RON91 | | | | |
|---|---|---|---|---|---|---|---|---|---|---|---|---|---|---|---|
| | A | B | C | D | E | A | B | C | D | E | A | B | C | D | E |
| $C_4$ Bio-butanes | n.b. | n.b. | n.b. | n.b. | n.b. | 3% | 5% | 7% | 10% | 15% | 3% | 6% | 8% | 11% | 15% |
| $C_{5/6}$ Bio-Isomerate | n.b. | n.b. | n.b. | n.b. | n.b. | 18% | 14% | 19% | 15% | 9% | 11% | 8% | 12% | 8% | 2% |
| $C_{5-10}$ Bio-Naphtha | n.b. | n.b. | n.b. | n.b. | n.b. | 1% | 1% | 1% | 2% | 3% | 14% | 15% | 14% | 15% | 16% |
| $C_{5-10}$ Bio-Reformate | n.b. | n.b. | n.b. | n.b. | n.b. | 59% | 59% | 54% | 54% | 54% | 51% | 51% | 46% | 46% | 46% |
| n-Butanol | n.b. | n.b. | n.b. | n.b. | n.b. | 20% | 20% | 20% | 20% | 20% | 20% | 20% | 20% | 20% | 20% |
| RON | | | | | | 96.4 | 96.5 | 96.3 | 96.4 | 96.6 | 91.6 | 91.7 | 91.6 | 91.8 | 92.1 |
| MON | | | | | | 85.0 | 85.0 | 85.0 | 85.0 | 85.0 | 82.6 | 82.5 | 82.5 | 82.5 | 82.5 |
| Aromatics (% v) | | | | | | 37 | 37 | 33 | 33 | 33 | 32 | 32 | 28 | 28 | 29 |
| Olefins (% v) | | | | | | 2 | 3 | 3 | 3 | 4 | 2 | 3 | 3 | 3 | 4 |
| RVP (kPa) | | | | | | 60 | 70 | 80 | 90 | 105 | 60 | 70 | 80 | 90 | 105 |
| E70 (% v) | | | | | | 20 | 20 | 25 | 25 | 25 | 20 | 20 | 25 | 25 | 25 |
| E100 (% v) | | | | | | 56 | 56 | 60 | 60 | 59 | 58 | 58 | 62 | 62 | 61 |
| E150 (% v) | | | | | | 85 | 85 | 86 | 86 | 86 | 86 | 86 | 87 | 87 | 87 |
| Density (kg/m$^3$) | | | | | | 761 | 759 | 751 | 748 | 744 | 754 | 751 | 743 | 741 | 737 |
| Benzene (% v) | | | | | | 0.93 | 0.93 | 0.84 | 0.84 | 0.84 | 0.80 | 0.80 | 0.72 | 0.72 | 0.72 |

TABLE 8j nB20 Gasoline; Categories 3-5

| Components | Volatility classes w/ RON98 | | | | | Volatility classes w/ RON95 | | | | | Volatility classes w/ RON91 | | | | |
|---|---|---|---|---|---|---|---|---|---|---|---|---|---|---|---|
| | A | B | C | D | E | A | B | C | D | E | A | B | C | D | E |
| $C_4$ Bio-Butanes | n.b. | n.b. | n.b. | n.b. | n.b. | 2% | 5% | 7% | 10% | 15% | 3% | 6% | 8% | 11% | 15% |
| $C_{5/6}$ Bio-Isomerate | n.b. | n.b. | n.b. | n.b. | n.b. | 21% | 18% | 19% | 15% | 9% | 11% | 8% | 12% | 8% | 2% |
| $C_{5-10}$ Bio-Naphtha | n.b. | n.b. | n.b. | n.b. | n.b. | 0% | 0% | 1% | 2% | 3% | 14% | 15% | 14% | 15% | 16% |
| $C_{5-10}$ Bio-Reformate | n.b. | n.b. | n.b. | n.b. | n.b. | 56% | 56% | 54% | 54% | 54% | 51% | 51% | 46% | 46% | 46% |
| n-Butanol | n.b. | n.b. | n.b. | n.b. | n.b. | 20% | 20% | 20% | 20% | 20% | 20% | 20% | 20% | 20% | 20% |
| RON | | | | | | 96.2 | 96.4 | 96.3 | 96.4 | 96.6 | 91.6 | 91.7 | 91.6 | 91.8 | 92.1 |
| MON | | | | | | 85.0 | 85.0 | 85.0 | 85.0 | 85.0 | 82.6 | 82.5 | 82.5 | 82.5 | 82.5 |
| Aromatics (% v) | | | | | | 35 | 35 | 33 | 33 | 33 | 32 | 32 | 28 | 28 | 29 |

TABLE 8j-continued nB20 Gasoline; Categories 3-5

| Components | Volatility classes w/ RON98 | | | | | Volatility classes w/ RON95 | | | | | Volatility classes w/ RON91 | | | | |
|---|---|---|---|---|---|---|---|---|---|---|---|---|---|---|---|
| | A | B | C | D | E | A | B | C | D | E | A | B | C | D | E |
| Olefins (% v) | | | | | | 2 | 3 | 3 | 3 | 4 | 2 | 3 | 3 | 3 | 4 |
| RVP (kPa) | | | | | | 60 | 70 | 80 | 90 | 105 | 60 | 70 | 80 | 90 | 105 |
| E70 (% v) | | | | | | 22 | 22 | 25 | 25 | 25 | 20 | 20 | 25 | 25 | 25 |
| E100 (% v) | | | | | | 58 | 58 | 60 | 60 | 59 | 58 | 58 | 62 | 62 | 61 |
| E150 (% v) | | | | | | 86 | 86 | 86 | 86 | 86 | 86 | 86 | 87 | 87 | 87 |
| Density (kg/m$^3$) | | | | | | 758 | 756 | 751 | 748 | 744 | 754 | 751 | 743 | 741 | 737 |
| Benzene (% v) | | | | | | 0.89 | 0.89 | 0.84 | 0.84 | 0.84 | 0.80 | 0.80 | 0.72 | 0.72 | 0.72 |

TABLE 10a iB5 Gasoline; Category 1

| Components | Volatility classes w/ RON98 | | | | | Volatility classes w/ RON95 | | | | | Volatility classes w/ RON91 | | | | |
|---|---|---|---|---|---|---|---|---|---|---|---|---|---|---|---|
| | A | B | C | D | E | A | B | C | D | E | A | B | C | D | E |
| C$_4$ Bio-butanes | n.b. | n.b. | n.b. | n.b. | n.b. | 3% | 6% | 9% | 10% | 15% | 4% | 7% | 9% | 11% | 16% |
| C$_{5/6}$ Bio-Isomerate | n.b. | n.b. | n.b. | n.b. | n.b. | 16% | 13% | 10% | 16% | 10% | 7% | 4% | 4% | 7% | 1% |
| C$_{5-10}$ Bio-Naphtha | n.b. | n.b. | n.b. | n.b. | n.b. | 6% | 7% | 8% | 6% | 8% | 19% | 20% | 20% | 19% | 21% |
| C$_{5-10}$ Bio-Reformate | n.b. | n.b. | n.b. | n.b. | n.b. | 69% | 69% | 68% | 62% | 62% | 65% | 64% | 61% | 58% | 57% |
| iso-Butanol | n.b. | n.b. | n.b. | n.b. | n.b. | 5% | 5% | 5% | 5% | 5% | 5% | 5% | 5% | 5% | 5% |
| RON | | | | | | 95.0 | 95.0 | 95.0 | 95.0 | 95.0 | 91.0 | 91.0 | 91.0 | 91.0 | 91.0 |
| MON | | | | | | 85.3 | 85.2 | 85.2 | 85.2 | 85.2 | 83.2 | 83.1 | 83.0 | 83.0 | 82.8 |
| Aromatics (% v) | | | | | | 43 | 43 | 42 | 39 | 38 | 40 | 40 | 38 | 36 | 35 |
| Olefins (% v) | | | | | | 3 | 3 | 3 | 4 | 4 | 3 | 3 | 3 | 4 | 4 |
| RVP (kPa) | | | | | | 60 | 70 | 80 | 90 | 105 | 60 | 70 | 80 | 90 | 105 |
| E70 (% v) | | | | | | 24 | 25 | 25 | 31 | 31 | 22 | 23 | 25 | 29 | 29 |
| E100 (% v) | | | | | | 50 | 50 | 50 | 55 | 55 | 50 | 50 | 52 | 55 | 55 |
| E150 (% v) | | | | | | 83 | 83 | 83 | 84 | 85 | 83 | 83 | 84 | 85 | 85 |
| Density (kg/m$^3$) | | | | | | 752 | 750 | 746 | 737 | 733 | 748 | 745 | 740 | 733 | 728 |
| Benzene (% v) | | | | | | 1.09 | 1.08 | 1.07 | 0.98 | 0.97 | 1.02 | 1.01 | 0.97 | 0.90 | 0.89 |

TABLE 10b iB5 Gasoline; Category 2

| Components | Volatility classes w/ RON98 | | | | | Volatility classes w/ RON95 | | | | | Volatility classes w/ RON91 | | | | |
|---|---|---|---|---|---|---|---|---|---|---|---|---|---|---|---|
| | A | B | C | D | E | A | B | C | D | E | A | B | C | D | E |
| C$_4$ Bio-butanes | n.b. | n.b. | n.b. | n.b. | n.b. | 2% | 5% | 8% | 10% | 15% | 4% | 7% | 9% | 11% | 16% |
| C$_{5/6}$ Bio-Isomerate | n.b. | n.b. | n.b. | n.b. | n.b. | 25% | 21% | 17% | 16% | 10% | 7% | 4% | 4% | 7% | 1% |
| C$_{5-10}$ Bio-Naphtha | n.b. | n.b. | n.b. | n.b. | n.b. | 3% | 5% | 6% | 6% | 8% | 19% | 20% | 20% | 19% | 21% |
| C$_{5-10}$ Bio-Reformate | n.b. | n.b. | n.b. | n.b. | n.b. | 64% | 64% | 64% | 62% | 62% | 65% | 64% | 61% | 58% | 57% |
| iso-Butanol | n.b. | n.b. | n.b. | n.b. | n.b. | 5% | 5% | 5% | 5% | 5% | 5% | 5% | 5% | 5% | 5% |
| RON | | | | | | 95.0 | 95.0 | 95.0 | 95.0 | 95.0 | 91.0 | 91.0 | 91.0 | 91.0 | 91.0 |
| MON | | | | | | 85.3 | 85.3 | 85.2 | 85.2 | 85.2 | 83.2 | 83.1 | 83.0 | 83.0 | 82.8 |
| Aromatics (% v) | | | | | | 40 | 40 | 40 | 39 | 38 | 40 | 40 | 38 | 36 | 35 |
| Olefins (% v) | | | | | | 2 | 3 | 3 | 4 | 4 | 3 | 3 | 3 | 4 | 4 |
| RVP (kPa) | | | | | | 60 | 70 | 80 | 90 | 105 | 60 | 70 | 80 | 90 | 105 |
| E70 (% v) | | | | | | 29 | 29 | 29 | 31 | 31 | 22 | 23 | 25 | 29 | 29 |
| E100 (% v) | | | | | | 55 | 54 | 54 | 55 | 55 | 50 | 50 | 52 | 55 | 55 |
| E150 (% v) | | | | | | 84 | 84 | 84 | 84 | 85 | 83 | 83 | 84 | 85 | 85 |
| Density (kg/m$^3$) | | | | | | 747 | 744 | 742 | 737 | 733 | 748 | 745 | 740 | 733 | 728 |
| Benzene (% v) | | | | | | 1.01 | 1.01 | 1.01 | 0.98 | 0.97 | 1.02 | 1.01 | 0.97 | 0.90 | 0.89 |

TABLE 10c iB5 Gasoline; Categories 3-5

| Components | Volatility classes w/ RON98 | | | | | Volatility classes w/ RON95 | | | | | Volatility classes w/ RON91 | | | | |
|---|---|---|---|---|---|---|---|---|---|---|---|---|---|---|---|
| | A | B | C | D | E | A | B | C | D | E | A | B | C | D | E |
| $C_4$ Bio-butanes | n.b. | n.b. | n.b. | n.b. | n.b. | n.b. | 3% | 6% | 9% | 14% | 2% | 5% | 8% | 11% | 16% |
| $C_{5/6}$ Bio-Isomerate | n.b. | n.b. | n.b. | n.b. | n.b. | n.b. | 35% | 31% | 27% | 20% | 22% | 18% | 13% | 9% | 2% |
| $C_{5-10}$ Bio-Naphtha | n.b. | n.b. | n.b. | n.b. | n.b. | n.b. | 0% | 2% | 3% | 5% | 14% | 16% | 17% | 19% | 21% |
| $C_{5-10}$ Bio-Reformate | n.b. | n.b. | n.b. | n.b. | n.b. | n.b. | 56% | 56% | 56% | 56% | 56% | 56% | 56% | 56% | 56% |
| iso-Butanol | n.b. | n.b. | n.b. | n.b. | n.b. | n.b. | 5% | 5% | 5% | 5% | 5% | 5% | 5% | 5% | 5% |
| RON | | | | | | | 95.0 | 95.0 | 95.0 | 95.0 | 91.0 | 91.0 | 91.0 | 91.0 | 91.0 |
| MON | | | | | | | 85.5 | 85.4 | 85.4 | 85.3 | 83.2 | 83.2 | 83.1 | 83.0 | 82.8 |
| Aromatics (% v) | | | | | | | 35 | 35 | 35 | 35 | 35 | 35 | 35 | 35 | 35 |
| Olefins (% v) | | | | | | | 2 | 3 | 3 | 4 | 2 | 3 | 3 | 4 | 4 |
| RVP (kPa) | | | | | | | 70 | 80 | 90 | 105 | 60 | 70 | 80 | 90 | 105 |
| E70 (% v) | | | | | | | 37 | 37 | 37 | 37 | 31 | 30 | 30 | 30 | 30 |
| E100 (% v) | | | | | | | 62 | 61 | 61 | 60 | 58 | 57 | 57 | 56 | 55 |
| E150 (% v) | | | | | | | 86 | 86 | 86 | 86 | 85 | 85 | 85 | 85 | 85 |
| Density (kg/m$^3$) | | | | | | | 735 | 733 | 731 | 727 | 738 | 736 | 734 | 732 | 728 |
| Benzene (% v) | | | | | | | 0.89 | 0.89 | 0.89 | 0.89 | 0.89 | 0.89 | 0.89 | 0.89 | 0.89 |

TABLE 10d iB10 Gasoline; Category 1

| Components | Volatility classes w/ RON98 | | | | | Volatility classes w/ RON95 | | |
|---|---|---|---|---|---|---|---|---|
| | A | B | C | D | E | A | B | C |
| $C_4$ Bio-butanes | 4% | 7% | 9% | 11% | 16% | 4% | 7% | 9% |
| $C_{5/6}$ Bio-Isomerate | 12% | 8% | 12% | 11% | 6% | 7% | 3% | 8% |
| $C_{5-10}$ Bio-Naphtha | 1% | 2% | 1% | 1% | 3% | 11% | 12% | 10% |
| $C_{5-10}$ Bio-Reformate | 73% | 73% | 68% | 66% | 65% | 68% | 68% | 63% |
| iso-Butanol | 10% | 10% | 10% | 10% | 10% | 10% | 10% | 10% |
| RON | 98.0 | 98.0 | 98.0 | 98.0 | 98.0 | 95.0 | 95.0 | 95.0 |
| MON | 86.6 | 86.6 | 86.6 | 86.6 | 86.6 | 85.1 | 85.1 | 85.1 |
| Aromatics (% v) | 45 | 45 | 42 | 41 | 41 | 42 | 42 | 39 |
| Olefins (% v) | 3 | 3 | 3 | 4 | 5 | 3 | 3 | 3 |
| RVP (kPa) | 60 | 70 | 80 | 90 | 105 | 60 | 70 | 80 |
| E70 (% v) | 20 | 21 | 25 | 27 | 27 | 20 | 20 | 25 |
| E100 (% v) | 50 | 50 | 54 | 55 | 55 | 51 | 51 | 55 |
| E150 (% v) | 82 | 82 | 83 | 84 | 84 | 83 | 83 | 84 |
| Density (kg/m$^3$) | 762 | 760 | 752 | 748 | 743 | 757 | 755 | 747 |
| Benzene (% v) | 1.15 | 1.14 | 1.07 | 1.04 | 1.03 | 1.07 | 1.07 | 0.99 |

| Components | Volatility classes w/ RON95 | | Volatility classes w/ RON91 | | | | |
|---|---|---|---|---|---|---|---|
| | D | E | A | B | C | D | E |
| $C_4$ Bio-butanes | 12% | 16% | 5% | 7% | 10% | 12% | 16% |
| $C_{5/6}$ Bio-Isomerate | 4% | 0% | 1% | 0% | 2% | 0% | 0% |
| $C_{5-10}$ Bio-Naphtha | 12% | 12% | 22% | 23% | 22% | 23% | 23% |
| $C_{5-10}$ Bio-Reformate | 62% | 61% | 61% | 60% | 56% | 55% | 51% |
| iso-Butanol | 10% | 10% | 10% | 10% | 10% | 10% | 10% |
| RON | 95.0 | 95.2 | 91.0 | 91.0 | 91.0 | 91.0 | 91.0 |
| MON | 85.0 | 85.0 | 82.9 | 82.8 | 82.8 | 82.7 | 82.6 |
| Aromatics (% v) | 39 | 38 | 38 | 37 | 35 | 34 | 31 |
| Olefins (% v) | 4 | 5 | 3 | 3 | 3 | 4 | 4 |
| RVP (kPa) | 90 | 105 | 60 | 70 | 80 | 90 | 105 |
| E70 (% v) | 25 | 26 | 20 | 21 | 25 | 26 | 30 |
| E100 (% v) | 55 | 55 | 53 | 54 | 57 | 58 | 61 |
| E150 (% v) | 84 | 84 | 83 | 84 | 85 | 85 | 86 |
| Density (kg/m$^3$) | 744 | 739 | 751 | 746 | 740 | 736 | 728 |
| Benzene (% v) | 0.98 | 0.96 | 0.96 | 0.94 | 0.88 | 0.86 | 0.79 |

TABLE 10e iB10 Gasoline; Category 2

| | Volatility classes w/ RON98 | | | | | Volatility classes w/ RON95 | | | | | Volatility classes w/ RON91 | | | | |
|---|---|---|---|---|---|---|---|---|---|---|---|---|---|---|---|
| Components | A | B | C | D | E | A | B | C | D | E | A | B | C | D | E |
| $C_4$ Bio-butanes | n.b. | n.b. | n.b. | 11% | 16% | 4% | 6% | 9% | 12% | 16% | 5% | 7% | 10% | 12% | 16% |
| $C_{5/6}$ Bio-Isomerate | n.b. | n.b. | n.b. | 14% | 7% | 13% | 9% | 8% | 4% | 0% | 1% | 0% | 2% | 0% | 0% |
| $C_{5-10}$ Bio-Naphtha | n.b. | n.b. | n.b. | 0% | 3% | 9% | 10% | 10% | 12% | 12% | 22% | 23% | 22% | 23% | 23% |
| $C_{5-10}$ Bio-Reformate | n.b. | n.b. | n.b. | 64% | 64% | 64% | 64% | 63% | 62% | 61% | 61% | 60% | 56% | 55% | 51% |
| iso-Butanol | n.b. | n.b. | n.b. | 10% | 10% | 10% | 10% | 10% | 10% | 10% | 10% | 10% | 10% | 10% | 10% |
| RON | | | | 98.0 | 98.0 | 95.0 | 95.0 | 95.0 | 95.0 | 95.2 | 91.0 | 91.0 | 91.0 | 91.0 | 91.0 |
| MON | | | | 86.6 | 86.6 | 85.1 | 85.1 | 85.1 | 85.0 | 85.0 | 82.9 | 82.8 | 82.8 | 82.7 | 82.6 |
| Aromatics (% v) | | | | 40 | 40 | 40 | 40 | 39 | 39 | 38 | 38 | 37 | 35 | 34 | 31 |
| Olefins (% v) | | | | 4 | 5 | 2 | 3 | 3 | 4 | 5 | 3 | 3 | 3 | 4 | 4 |
| RVP (kPa) | | | | 90 | 105 | 60 | 70 | 80 | 90 | 105 | 60 | 70 | 80 | 90 | 105 |
| E70 (% v) | | | | 29 | 28 | 24 | 23 | 25 | 25 | 26 | 20 | 21 | 25 | 26 | 30 |
| E100 (% v) | | | | 57 | 56 | 55 | 54 | 55 | 55 | 55 | 53 | 54 | 57 | 58 | 61 |
| E150 (% v) | | | | 84 | 84 | 84 | 84 | 84 | 84 | 84 | 83 | 84 | 85 | 85 | 86 |
| Density (kg/m³) | | | | 746 | 742 | 753 | 751 | 747 | 744 | 739 | 751 | 746 | 740 | 736 | 728 |
| Benzene (% v) | | | | 1.01 | 1.01 | 1.01 | 1.01 | 0.99 | 0.98 | 0.96 | 0.96 | 0.94 | 0.88 | 0.86 | 0.79 |

TABLE 10f iB10 Gasoline; Categories 3-5

| | Volatility classes w/ RON98 | | | | | Volatility classes w/ RON95 | | | | | Volatility classes w/ RON91 | | | | |
|---|---|---|---|---|---|---|---|---|---|---|---|---|---|---|---|
| Components | A | B | C | D | E | A | B | C | D | E | A | B | C | D | E |
| $C_4$ Bio-butanes | n.b. | n.b. | n.b. | n.b. | n.b. | 2% | 5% | 8% | 11% | 15% | 4% | 7% | 10% | 12% | 16% |
| $C_{5/6}$ Bio-Isomerate | n.b. | n.b. | n.b. | n.b. | n.b. | 28% | 24% | 19% | 15% | 8% | 10% | 6% | 2% | 0% | 0% |
| $C_{5-10}$ Bio-Naphtha | n.b. | n.b. | n.b. | n.b. | n.b. | 4% | 5% | 7% | 8% | 10% | 20% | 21% | 22% | 23% | 23% |
| $C_{5-10}$ Bio-Reformate | n.b. | n.b. | n.b. | n.b. | n.b. | 56% | 56% | 56% | 56% | 56% | 56% | 56% | 56% | 55% | 51% |
| iso-Butanol | n.b. | n.b. | n.b. | n.b. | n.b. | 10% | 10% | 10% | 10% | 10% | 10% | 10% | 10% | 10% | 10% |
| RON | | | | | | 95.0 | 95.0 | 95.0 | 95.0 | 95.1 | 91.0 | 91.0 | 91.0 | 91.0 | 91.0 |
| MON | | | | | | 85.3 | 85.2 | 85.1 | 85.1 | 85.1 | 82.9 | 82.9 | 82.8 | 82.7 | 82.6 |
| Aromatics (% v) | | | | | | 35 | 35 | 35 | 35 | 35 | 35 | 35 | 35 | 34 | 31 |
| Olefins (% v) | | | | | | 2 | 2 | 3 | 4 | 4 | 2 | 3 | 3 | 4 | 4 |
| RVP (kPa) | | | | | | 60 | 70 | 80 | 90 | 105 | 60 | 70 | 80 | 90 | 105 |
| E70 (% v) | | | | | | 32 | 32 | 31 | 31 | 31 | 25 | 25 | 25 | 26 | 30 |
| E100 (% v) | | | | | | 62 | 62 | 61 | 61 | 60 | 58 | 57 | 57 | 58 | 61 |
| E150 (% v) | | | | | | 86 | 86 | 86 | 86 | 86 | 85 | 85 | 85 | 85 | 86 |
| Density (kg/m³) | | | | | | 744 | 742 | 740 | 737 | 733 | 745 | 743 | 740 | 736 | 728 |
| Benzene (% v) | | | | | | 0.89 | 0.89 | 0.89 | 0.89 | 0.89 | 0.89 | 0.89 | 0.88 | 0.86 | 0.79 |

TABLE 10g iB20 Gasoline; Category 1

| | Volatility classes w/ RON98 | | | | | Volatility classes w/ RON95 | | |
|---|---|---|---|---|---|---|---|---|
| Components | A | B | C | D | E | A | B | C |
| $C_4$ Bio-butanes | 5% | 8% | 9% | 12% | 17% | 5% | 8% | 10% |
| $C_{5/6}$ Bio-Isomerate | 7% | 4% | 8% | 4% | 0% | 4% | 0% | 5% |
| $C_{5-10}$ Bio-Naphtha | 5% | 7% | 5% | 6% | 8% | 14% | 14% | 13% |
| $C_{5-10}$ Bio-Reformate | 62% | 62% | 57% | 57% | 56% | 58% | 58% | 53% |
| iso-Butanol | 20% | 20% | 20% | 20% | 20% | 20% | 20% | 20% |

TABLE 10g-continued iB20 Gasoline; Category 1

| | | | | | | | | |
|---|---|---|---|---|---|---|---|---|
| RON | 98.0 | 98.0 | 98.0 | 98.0 | 98.0 | 95.4 | 95.5 | 95.5 |
| MON | 86.5 | 86.4 | 86.4 | 86.4 | 86.4 | 85.0 | 85.0 | 85.0 |
| Aromatics (% v) | 39 | 39 | 35 | 35 | 35 | 36 | 36 | 33 |
| Olefins (% v) | 3 | 3 | 3 | 4 | 5 | 3 | 3 | 3 |
| RVP (kPa) | 60 | 70 | 80 | 90 | 105 | 60 | 70 | 80 |
| E70 (% v) | 20 | 20 | 25 | 25 | 26 | 20 | 20 | 25 |
| E100 (% v) | 60 | 60 | 64 | 63 | 64 | 61 | 61 | 65 |
| E150 (% v) | 84 | 84 | 85 | 85 | 86 | 85 | 85 | 86 |
| Density (kg/m$^3$) | 763 | 761 | 753 | 750 | 745 | 759 | 756 | 748 |
| Benzene (% v) | 0.98 | 0.98 | 0.90 | 0.90 | 0.87 | 0.91 | 0.90 | 0.83 |

| | Volatility classes w/ RON95 | | Volatility classes w/ RON91 | | | | |
|---|---|---|---|---|---|---|---|
| Components | D | E | A | B | C | D | E |
| $C_4$ Bio-butanes | 13% | 17% | 5% | 8% | 10% | 13% | 17% |
| $C_{5/6}$ Bio-Isomerate | 1% | 0% | 0% | 0% | 0% | 0% | 0% |
| $C_{5-10}$ Bio-Naphtha | 14% | 14% | 26% | 26% | 26% | 26% | 21% |
| $C_{5-10}$ Bio-Reformate | 53% | 49% | 48% | 46% | 44% | 41% | 42% |
| iso-Butanol | 20% | 20% | 20% | 20% | 20% | 20% | 20% |
| RON | 95.6 | 95.7 | 91.0 | 91.0 | 91.0 | 91.0 | 93.0 |
| MON | 85.0 | 85.0 | 82.4 | 82.3 | 82.2 | 82.1 | 83.3 |
| Aromatics (% v) | 33 | 31 | 30 | 29 | 27 | 25 | 26 |
| Olefins (% v) | 4 | 4 | 2 | 3 | 3 | 3 | 4 |
| RVP (kPa) | 90 | 105 | 60 | 70 | 80 | 90 | 105 |
| E70 (% v) | 25 | 28 | 22 | 24 | 26 | 28 | 30 |
| E100 (% v) | 65 | 67 | 65 | 66 | 68 | 70 | 70 |
| E150 (% v) | 86 | 87 | 86 | 87 | 87 | 88 | 88 |
| Density (kg/m$^3$) | 746 | 738 | 749 | 744 | 739 | 734 | 731 |
| Benzene (% v) | 0.83 | 0.78 | 0.76 | 0.72 | 0.68 | 0.64 | 0.66 |

TABLE 10h iB20 Gasoline; Category 2

| | Volatility classes w/ RON98 | | | | | Volatility classes w/ RON95 | | |
|---|---|---|---|---|---|---|---|---|
| Components | A | B | C | D | E | A | B | C |
| $C_4$ Bio-butanes | 5% | 8% | 9% | 12% | 17% | 5% | 8% | 10% |
| $C_{5/6}$ Bio-Isomerate | 7% | 4% | 8% | 4% | 0% | 4% | 0% | 5% |
| $C_{5-10}$ Bio-Naphtha | 5% | 7% | 5% | 6% | 8% | 14% | 14% | 13% |
| $C_{5-10}$ Bio-Reformate | 62% | 62% | 57% | 57% | 56% | 58% | 58% | 53% |
| iso-Butanol | 20% | 20% | 20% | 20% | 20% | 20% | 20% | 20% |
| RON | 98.0 | 98.0 | 98.0 | 98.0 | 98.0 | 95.4 | 95.5 | 95.5 |
| MON | 86.5 | 86.4 | 86.4 | 86.4 | 86.4 | 85.0 | 85.0 | 85.0 |
| Aromatics (% v) | 39 | 39 | 35 | 35 | 35 | 36 | 36 | 33 |
| Olefins (% v) | 3 | 3 | 3 | 4 | 5 | 3 | 3 | 3 |
| RVP (kPa) | 60 | 70 | 80 | 90 | 105 | 60 | 70 | 80 |
| E70 (% v) | 20 | 20 | 25 | 25 | 26 | 20 | 20 | 25 |
| E100 (% v) | 60 | 60 | 64 | 63 | 64 | 61 | 61 | 65 |
| E150 (% v) | 84 | 84 | 85 | 85 | 86 | 85 | 85 | 86 |
| Density (kg/m$^3$) | 763 | 761 | 753 | 750 | 745 | 759 | 756 | 748 |
| Benzene (% v) | 0.98 | 0.98 | 0.90 | 0.90 | 0.87 | 0.91 | 0.90 | 0.83 |

| | Volatility classes w/ RON95 | | Volatility classes w/ RON91 | | | | |
|---|---|---|---|---|---|---|---|
| Components | D | E | A | B | C | D | E |
| $C_4$ Bio-butanes | 13% | 17% | 7% | 8% | 10% | 13% | 17% |
| $C_{5/6}$ Bio-Isomerate | 1% | 0% | 3% | 0% | 0% | 0% | 0% |
| $C_{5-10}$ Bio-Naphtha | 14% | 14% | 25% | 25% | 25% | 25% | 21% |
| $C_{5-10}$ Bio-Reformate | 53% | 49% | 45% | 47% | 45% | 43% | 42% |
| iso-Butanol | 20% | 20% | 20% | 20% | 20% | 20% | 20% |
| RON | 95.6 | 95.7 | 91.3 | 91.5 | 91.5 | 91.6 | 93.0 |
| MON | 85.0 | 85.0 | 82.5 | 82.6 | 82.5 | 82.5 | 83.3 |
| Aromatics (% v) | 33 | 31 | 28 | 29 | 28 | 26 | 26 |
| Olefins (% v) | 4 | 4 | 3 | 3 | 3 | 3 | 4 |
| RVP (kPa) | 90 | 105 | 70 | 70 | 80 | 90 | 105 |

TABLE 10h-continued

| iB20 Gasoline; Category 2 | | | | | | | |
|---|---|---|---|---|---|---|---|
| E70 (% v) | 25 | 28 | 25 | 23 | 26 | 28 | 30 |
| E100 (% v) | 65 | 67 | 67 | 66 | 68 | 69 | 70 |
| E150 (% v) | 86 | 87 | 87 | 86 | 87 | 88 | 88 |
| Density (kg/m$^3$) | 746 | 738 | 743 | 746 | 740 | 735 | 731 |
| Benzene (% v) | 0.83 | 0.78 | 0.71 | 0.74 | 0.70 | 0.67 | 0.66 |

TABLE 10i iB20 Gasoline; Categories 3-5

| Components | Volatility classes w/ RON98 | | | | | Volatility classes w/ RON95 | | |
|---|---|---|---|---|---|---|---|---|
|  | A | B | C | D | E | A | B | C |
| C$_4$ Bio-Butanes | n.b. | 6% | 9% | 12% | 17% | 5% | 8% | 10% |
| C$_{5/6}$ Bio-Isomerate | n.b. | 14% | 10% | 5% | 0% | 6% | 2% | 5% |
| C$_{5-10}$ Bio-Naphtha | n.b. | 3% | 5% | 6% | 8% | 13% | 14% | 13% |
| C$_{5-10}$ Bio-Reformate | n.b. | 56% | 56% | 56% | 56% | 56% | 56% | 53% |
| iso-Butanol | n.b. | 20% | 20% | 20% | 20% | 20% | 20% | 20% |
| RON |  | 98.0 | 98.0 | 98.0 | 98.0 | 95.4 | 95.5 | 95.5 |
| MON |  | 86.5 | 86.5 | 86.4 | 86.4 | 85.0 | 85.1 | 85.0 |
| Aromatics (% v) |  | 35 | 35 | 35 | 35 | 35 | 35 | 33 |
| Olefins (% v) |  | 3 | 3 | 4 | 5 | 2 | 3 | 3 |
| RVP (kPa) |  | 70 | 80 | 90 | 105 | 60 | 70 | 80 |
| E70 (% v) |  | 26 | 26 | 26 | 26 | 21 | 21 | 25 |
| E100 (% v) |  | 65 | 65 | 64 | 64 | 62 | 62 | 65 |
| E150 (% v) |  | 86 | 86 | 86 | 86 | 85 | 85 | 86 |
| Density (kg/m$^3$) |  | 754 | 752 | 750 | 745 | 757 | 755 | 748 |
| Benzene (% v) |  | 0.89 | 0.89 | 0.89 | 0.87 | 0.89 | 0.89 | 0.83 |

| Components | Volatility classes w/ RON95 | | Volatility classes w/ RON91 | | | | |
|---|---|---|---|---|---|---|---|
|  | D | E | A | B | C | D | E |
| C$_4$ Bio-Butanes | 13% | 17% | 7% | 8% | 10% | 13% | 17% |
| C$_{5/6}$ Bio-Isomerate | 1% | 0% | 3% | 0% | 0% | 0% | 0% |
| C$_{5-10}$ Bio-Naphtha | 14% | 14% | 25% | 25% | 25% | 25% | 21% |
| C$_{5-10}$ Bio-Reformate | 53% | 49% | 45% | 47% | 45% | 43% | 42% |
| iso-Butanol | 20% | 20% | 20% | 20% | 20% | 20% | 20% |
| RON | 95.6 | 95.7 | 91.3 | 91.5 | 91.5 | 91.6 | 93.0 |
| MON | 85.0 | 85.0 | 82.5 | 82.6 | 82.5 | 82.5 | 83.3 |
| Aromatics (% v) | 33 | 31 | 28 | 29 | 28 | 26 | 26 |
| Olefins (% v) | 4 | 4 | 3 | 3 | 3 | 3 | 4 |
| RVP (kPa) | 90 | 105 | 70 | 70 | 80 | 90 | 105 |
| E70 (% v) | 25 | 28 | 25 | 23 | 26 | 28 | 30 |
| E100 (% v) | 65 | 67 | 67 | 66 | 68 | 69 | 70 |
| E150 (% v) | 86 | 87 | 87 | 86 | 87 | 88 | 88 |
| Density (kg/m$^3$) | 746 | 738 | 743 | 746 | 740 | 735 | 731 |
| Benzene (% v) | 0.83 | 0.78 | 0.71 | 0.74 | 0.70 | 0.67 | 0.66 |

TABLE 11

| Component | Type of unleaded gasoline | | | | | | | | |
|---|---|---|---|---|---|---|---|---|---|
|  | E5 | E10 | E20 | nB5 | nB10 | nB20 | iB5 | iB10 | iB20 |
| Bio-butanes (% v) | 0-15 | 0-15 | 1-13 | 1-16 | 3-17 | 3-20 | 2-17 | 2-18 | 6-21 |
| Bio-isomerate (% v) | 0-26 | 0-16 | 0-6 | 7-31 | 1-33 | 2-27 | 1-37 | 0-31 | 0-18 |
| Bio-naphtha (% v) | 1-27 | 6-34 | 16-32 | 1-19 | 1-22 | 0-23 | 0-22 | 0-26 | 4-33 |
| Bio-reformate (% v) | 59-80 | 53-76 | 46-65 | 58-72 | 60-75 | 56-74 | 59-73 | 56-81 | 51-78 |

That which is claimed is:

1. A gasoline fuel formulation comprising: 60% v/v or more of a combination of
   (a) a biologically-derived alcohol at a concentration of from 0.1% to 30% v/v, by volume of the gasoline fuel formulation; and
   (b) a mixture of C4 to C12 hydrocarbon fuel components comprising
   aromatic hydrocarbons, wherein the mixture of C4 to C12 hydrocarbon fuel components are derived from a catalytic conversion of a biologically-derived oxygenate component comprising a $C_1+O_{1-3}$.

2. The gasoline fuel formulation of claim 1, further comprising less than 30% v/v of a non-biologically-derived fuel component.

3. The gasoline fuel formulation of claim 1, wherein the biologically-derived alcohol comprises one or more of ethanol, n-propanol, isopropanol, n-butanol, isobutanol, and t-butanol.

4. The gasoline fuel formulation of claim 1, wherein the mixture of $C_4$ to $C_{12}$ hydrocarbon fuel components further comprises:
   (1) a high octane hydrocarbon fuel component, comprising one or more hydrocarbons selected from $C_5$ to $C_{12}$ hydrocarbons and mixtures thereof, which is the product of a catalytic conversion of a biologically-derived oxygenate component, and which contains in the range of from 40 to 80% v/v of aromatic hydrocarbons; and
   (2) one or more of:
   a. a low octane hydrocarbon fuel component, comprising one or more hydrocarbons selected from $C_5$ to $C_{10}$ hydrocarbons and mixtures thereof, which is the product of a catalytic conversion of a biologically-derived oxygenate component, and which contains in the range of from 75% to 100% v/v of paraffinic hydrocarbons and in the range of from 0% v/v to 20% v/v of aromatic hydrocarbons,
   b. a high octane isomerised hydrocarbon fuel component, comprising one or more biologically-derived hydrocarbons selected from $C_5$ and $C_6$ hydrocarbons and mixtures thereof, which contains 60% v/v or more of isoparaffinic hydrocarbons and saturated cyclic hydrocarbons and 5% v/v or less of aromatic hydrocarbons, and
   c. a $C_4$ hydrocarbon fuel component which comprises a biologically-derived $C_4$ hydrocarbon or mixture thereof.

5. The gasoline fuel formulation of claim 4, wherein the gasoline fuel formulation comprises each of the components (1), (2a), (2b) and (2c).

6. The gasoline fuel formulation of claim 1, wherein the catalytic conversion of the biologically-derived oxygenate component comprises an aqueous phase reforming (APR) process.

7. The gasoline fuel formulation of claim 4, wherein the catalytic conversion of the biologically-derived oxygenate component comprises a catalytic condensation to form the high octane hydrocarbon fuel component.

8. The gasoline fuel formulation of claim 4, wherein the catalytic conversion of the biologically-derived oxygenate component comprises dehydration, oligomerisation and/or hydrotreatment to form the low octane hydrocarbon fuel component.

9. The gasoline fuel formulation of claim 1, wherein the biologically-derived alcohol is selected from $C_1$ to $C_4$ aliphatic alcohols.

10. The gasoline fuel formulation of claim 1, wherein the concentration of the biologically-derived alcohol in the fuel formulation is from 5% to 30% v/v, by volume of the gasoline fuel formulation.

11. A method for producing a gasoline fuel formulation, which method comprises combining together:
    (a) a biologically-derived alcohol at a concentration of from 0.1% to 30% v/v, by volume of the gasoline fuel formulation; and
    (b) a mixture of $C_4$ to $C_{12}$ hydrocarbon fuel components comprising aromatic hydrocarbons wherein the mixture of $C_4$ to $C_{12}$ hydrocarbon fuel components are derived from catalytic conversion of a biologically-derived oxygenate component comprising a $C_1+O_{1-3}$, in order to produce a gasoline fuel formulation that contains 60% v/v or more of the combination of (a) and (b) and from 0.1 to 30% v/v of the biologically-derived alcohol (a).

12. The method of claim 11, comprising:
    (i) subjecting a biologically-derived oxygenate component, optionally following a catalytic deoxygenation process, to a catalytic condensation process in order to produce either a high octane hydrocarbon fuel component (1) comprising one or more hydrocarbons selected from C5 to C12 hydrocarbons and mixtures thereof, which contains in the range of from 40 to 80% v/v or a precursor thereto which additionally contains one or more C4 hydrocarbons;
    (ii) subjecting a biologically-derived oxygenate component, optionally following a catalytic deoxygenation process, to a dehydration, oligomerisation and/or hydrotreatment process in order to produce the low octane hydrocarbon fuel component (2a) comprising one or more hydrocarbons selected from C5 to C10 hydrocarbons and mixtures thereof, which contains in the range of from 75% to 100% v/v of paraffinic hydrocarbons and in the range of from 0% v/v to 20% v/v of aromatic hydrocarbons; and
    (iii) mixing together the component (1) which results from step (i) and the component (2a) which results from step (ii), either before, after or at the same time as combining them with the biologically-derived alcohol (a).

13. A method of operating an internal combustion engine, and/or a vehicle which is driven by an internal combustion engine, which method involves introducing into a combustion chamber of the engine a gasoline fuel formulation according to claim 1.

* * * * *